United States Patent
Prasad

(10) Patent No.: US 8,769,431 B1
(45) Date of Patent: Jul. 1, 2014

(54) METHOD OF SINGLE-HANDED SOFTWARE OPERATION OF LARGE FORM FACTOR MOBILE ELECTRONIC DEVICES

(71) Applicant: Roy Varada Prasad, Los Gatos, CA (US)

(72) Inventor: Roy Varada Prasad, Los Gatos, CA (US)

( * ) Notice: Subject to any disclaimer, the term of this patent is extended or adjusted under 35 U.S.C. 154(b) by 0 days.

(21) Appl. No.: 13/854,052

(22) Filed: Mar. 30, 2013

Related U.S. Application Data

(60) Provisional application No. 61/771,035, filed on Feb. 28, 2013.

(51) Int. Cl.
  *G06F 3/048* (2013.01)
  *G06F 3/14* (2006.01)

(52) U.S. Cl.
  CPC ..................... *G06F 3/048* (2013.01)
  USPC .......... 715/788; 715/764; 715/778; 715/800; 715/801; 715/864

(58) Field of Classification Search
  CPC .................... G06F 3/0488; G06F 3/04886
  See application file for complete search history.

(56) References Cited

U.S. PATENT DOCUMENTS

| | | | |
|---|---|---|---|
| 5,936,614 A | 8/1999 | An et al. | |
| 6,466,198 B1 | 10/2002 | Feinstein | |
| 8,239,784 B2* | 8/2012 | Hotelling et al. | 715/830 |
| 2005/0140661 A1 | 6/2005 | Collins | |
| 2006/0055678 A1 | 3/2006 | Kleihorst et al. | |
| 2006/0085757 A1 | 4/2006 | Andre et al. | |
| 2006/0197750 A1* | 9/2006 | Kerr et al. | 345/173 |
| 2009/0303187 A1* | 12/2009 | Pallakoff | 345/169 |
| 2009/0322687 A1 | 12/2009 | Duncan et al. | |
| 2010/0182264 A1 | 7/2010 | Hahn et al. | |
| 2010/0211920 A1* | 8/2010 | Westerman et al. | 715/863 |
| 2010/0269039 A1* | 10/2010 | Pahlavan et al. | 715/702 |
| 2010/0295798 A1* | 11/2010 | Nicholson et al. | 345/173 |
| 2011/0169749 A1* | 7/2011 | Ganey et al. | 345/173 |
| 2011/0304557 A1* | 12/2011 | Wilburn et al. | 345/173 |
| 2012/0212418 A1 | 8/2012 | Shiota | |
| 2012/0265803 A1* | 10/2012 | Ha et al. | 709/203 |
| 2012/0266079 A1* | 10/2012 | Lee et al. | 715/744 |

(Continued)

FOREIGN PATENT DOCUMENTS

WO  WO2012024022 A2 * 2/2012

OTHER PUBLICATIONS

OneHanded (Galaxy Note), May 24, 2012, 1 page.*

(Continued)

*Primary Examiner* — Matt Kim
*Assistant Examiner* — Yongjia Pan
(74) *Attorney, Agent, or Firm* — Jerry R. Potts

(57) ABSTRACT

In a large form-factor mobile electronic device having a touchscreen for receiving user thumb input actions via an operating system desktop to facilitate user-software interactions, a method of enabling single-handed user-software interactions, comprising the steps of: generating a single-handed utilization zone; positioning said single-handed utilization zone at a current detected thumb location on the touchscreen; rendering a proxy desktop within said zone, said proxy desktop providing substantially the same functionality of the operating system desktop of the large form-factor mobile electronic device and being conformed substantially in shape and size to a small form factor mobile electronic device to facilitate user familiarity with thumb stroke actions with the rendered touch screen desktop; and rendering an application interface within said zone upon receiving a generate application interface request.

16 Claims, 55 Drawing Sheets

(56) References Cited

U.S. PATENT DOCUMENTS

| | | | |
|---|---|---|---|
| 2013/0018939 A1* | 1/2013 | Chawla et al. | 709/203 |
| 2013/0033434 A1 | 2/2013 | Richardson et al. | |
| 2013/0038564 A1* | 2/2013 | Ho | 345/174 |
| 2013/0127738 A1* | 5/2013 | Miller et al. | 345/173 |

OTHER PUBLICATIONS

ThumbSpace: Generalized One-Handed Input for Touchscreen-Based Mobile Devices, available at: http://hcil2.cs.umd.edu/trs/2007-03/2007-03.pdf by Amy Karlson and B. B. Bederson.

Youtube, LLC. 2009 San Bruno, California. Dasher on iPhone [online] Youtube.com, available at: http://www.youtube.com/watch?v=ED_w_HMAuP4.

Cavendish Laboratory, Department of Energy and Climate Change. 2011 London, England. Dasher [online] Bitt. Org, available at: http://www.bitt.org/software/dasher/index.htm.

Innoventions' RotoView 2012—The intuitive Display Navigation Solution for Hand Held Devices [online] rotoview.com, available at: http://www.rotoview.com/white_paper.htm.

M.Ugimoto, K.Takahashi, 1996, Single Hand Key Card for Mobile Devices, http:sigchi.org/chi96/proceedings/demos/Sugimoto_txt.htm.

A.Karlson, B.Bederson, 2007, Generalized One-Handed Input for Touchscreen-Based Mobile Devices, http//hcil2.cx.umd.edu/trs/2007-03/2007.03.pdf.

Youtube, LLC. 2009 San Bruno, California. Dasher on iPhone [online] Youtube.com, available at: http://www.youtube.com/watch?v=ED_w_HMAuP4 [Accessed Feb. 28, 2013].

Inference Group, Cavendish Laboratory, Cambridge, Department of Energy and Climate Change. 2011 London, England. Dasher [online] Bitt.Org, available at: http://www.bItt.org/software/dasher/index.htm [Accessed Feb. 28, 2013].

Innoventions, Inc. 2012. Houston, Texas. Innoventions' RotoView—The intuitive Display Navigation Solution for Hand Held Devices [online] rotoview.com, available at: http://www.rotoview.com/white_paper.htm [Accessed Feb. 28, 2013].

Masakatsu Sugimoto, Kimiyo Takahashi. 1996. Josakada, Iiyama, Nagano, Japan. SHK: Single Hand Key Card for Mobile Devices [online] sigchi.org, available at: http://www.sigchi.org/chi96/proceedings/demos/Sugimoto/ms_txt.htm. [Accessed Feb. 28, 2013].

Amy I. Karlson and Benjamin B. Bederson, Human-Computer Interaction Lab, Department of Computer Science, University of Maryland. 2007 College Park, Maryland, ThumbSpace: Generalized One-Handed Input for Touchsceen-Based Mobile Devices [online] HCIL2.Cs.UMD/EDU, available at: http://hcil2.cs.umd.edu/trs/2007-03/2007-03.pdf.

\* cited by examiner

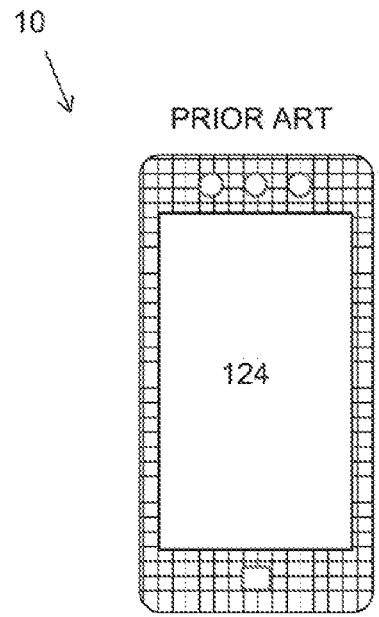
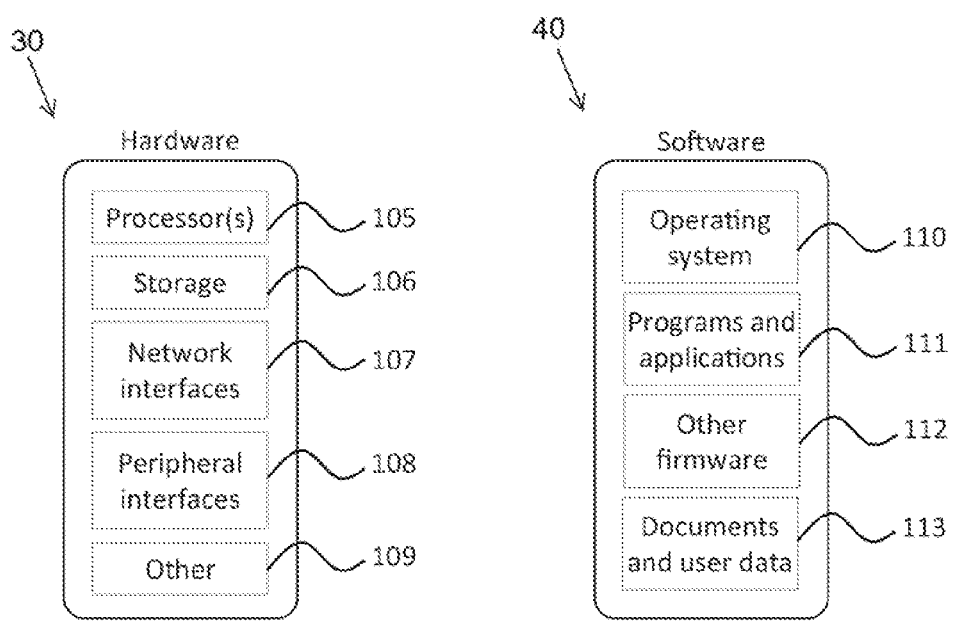

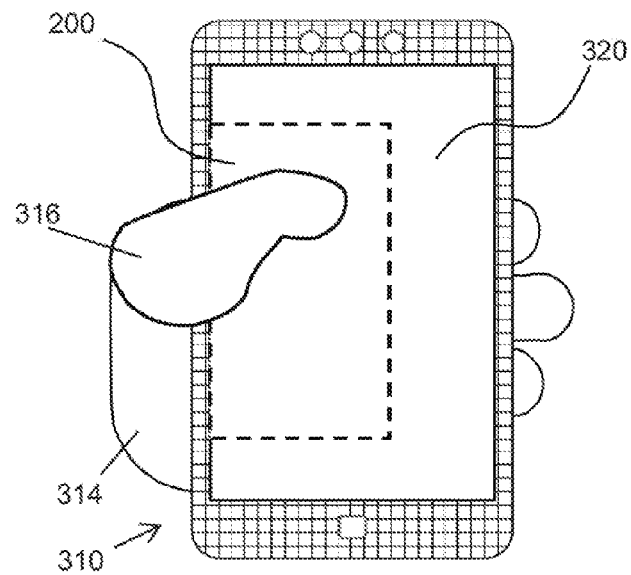
FIG. 3
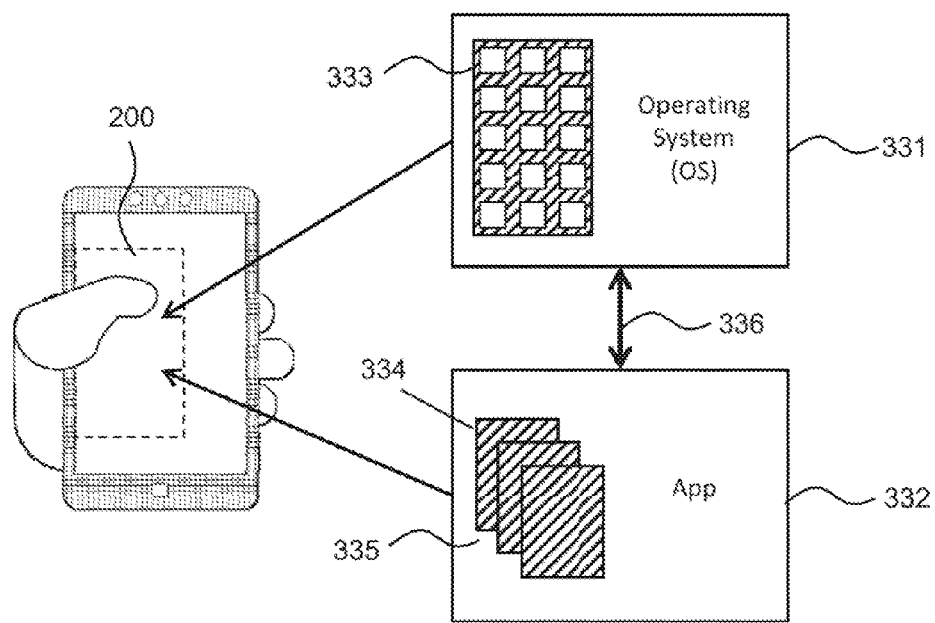

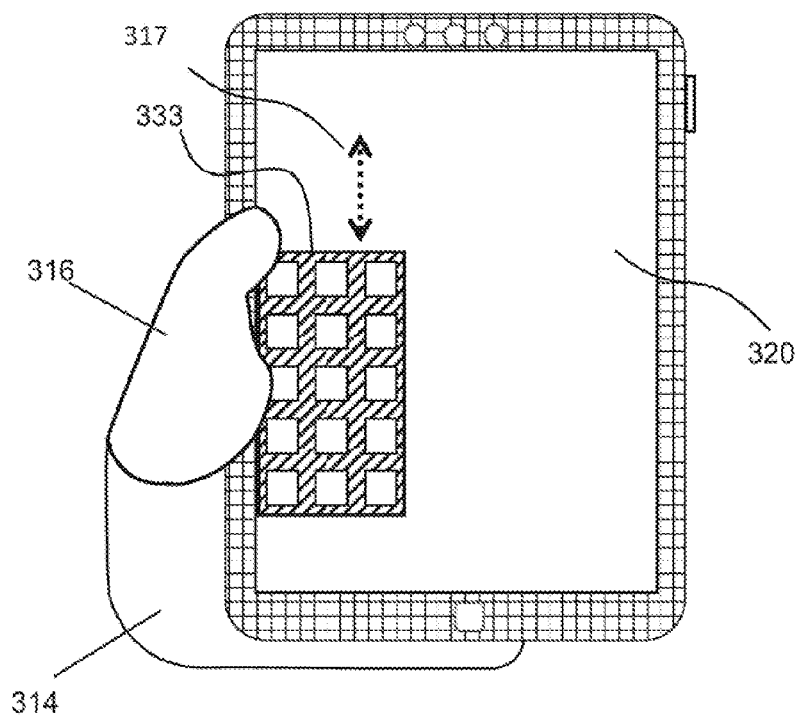

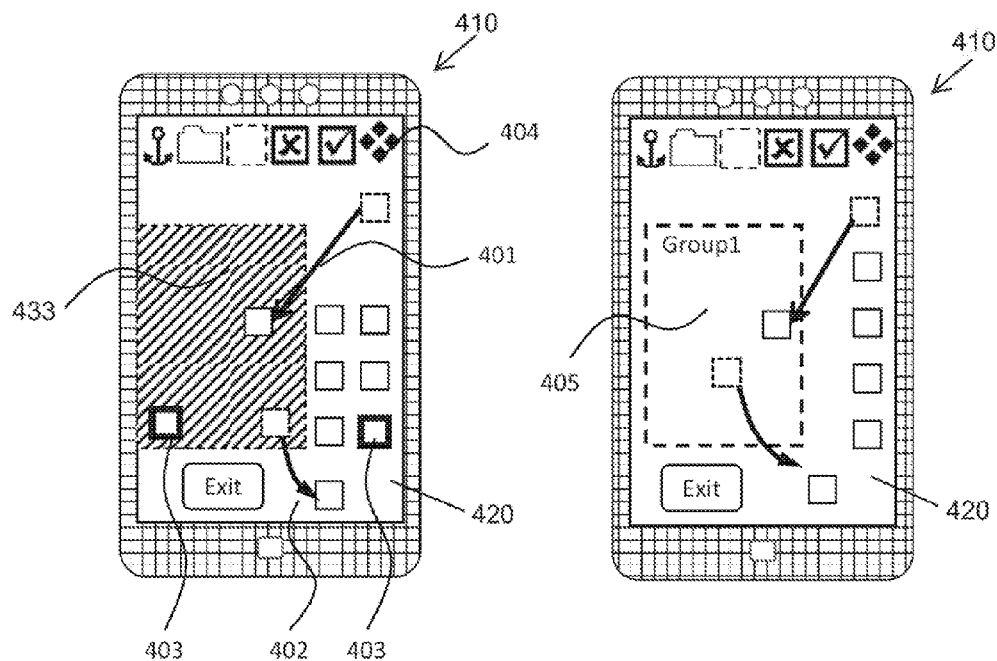
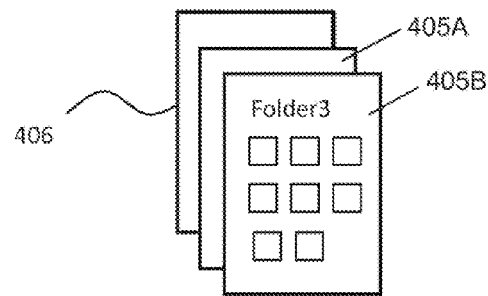
FIG. 4A
FIG. 4B
FIG. 4C

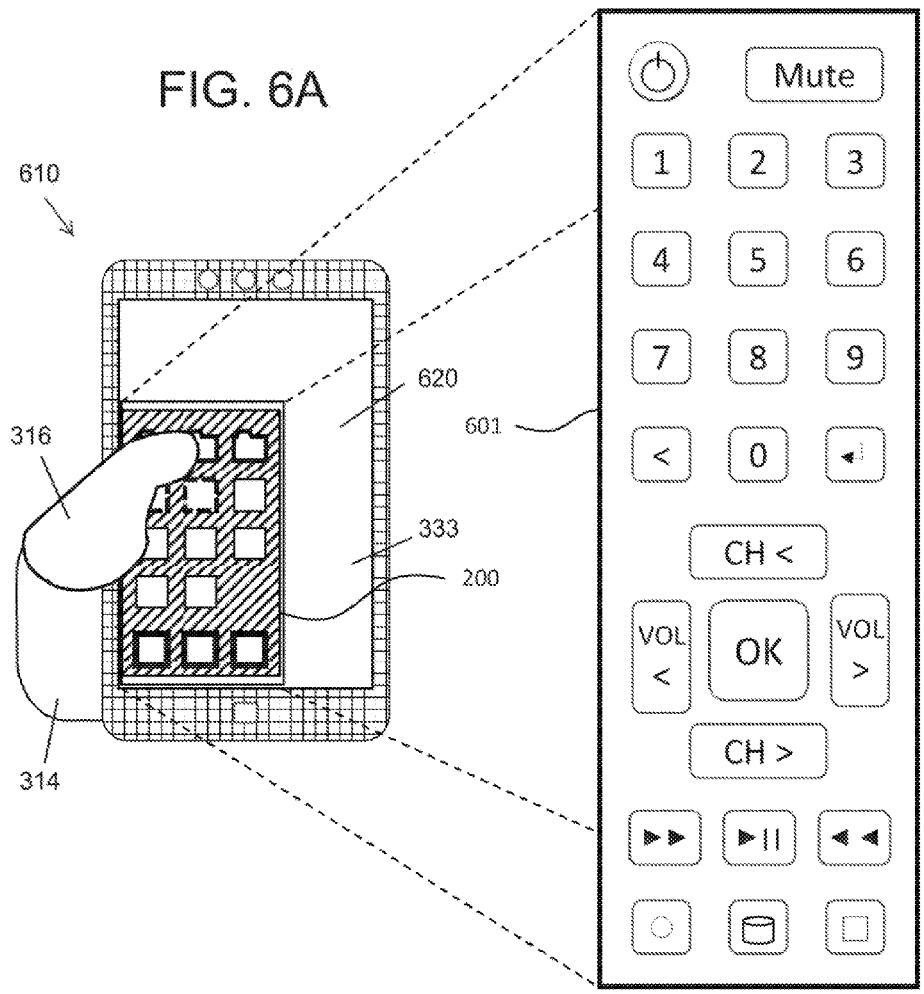

| Profile name | Profile | W | H | Px | Py |
|---|---|---|---|---|---|
| Profile-1 | Standard #1 | 56 | 94 | 10 | 15 |
| Profile-2 | Standard #2 | 63 | 100 | 8 | 12 |
| Profile-3 | Standard #3 | 63 | 100 | 12 | 16 |
| Profile-4 | Standard #4 | 50 | 88 | 8 | 12 |
| Profile-5 | Standard #5 | 50 | 88 | 12 | 16 |

Etc.   706

| Profile name | Profile | W | H | Px | Py |
|---|---|---|---|---|---|
| Roy, Normal | Custom #1 | 65 | 106 | 8 | 12 |
| Roy, Gloves | Custom #2 | 65 | 106 | 15 | 20 |
| Mala | Standard #1 | 56 | 94 | 10 | 15 |
| Anita | Custom #3 | 60 | 88 | 9 | 11 |
| Arun | Standard #2 | 63 | 100 | 8 | 12 |

Etc.

FIG. 7F

METHOD OF SINGLE-HANDED SOFTWARE OPERATION OF LARGE FORM FACTOR MOBILE ELECTRONIC DEVICES

RELATED APPLICATIONS

This nonprovisional utility patent application claims benefit of U.S. provisional patent application Ser. No. 61/771,036, Entitled, "Method for Enabling One-Handed Operation of Large Form Factors Electronic Devices," by Roy Varada Prasad, filed on Feb. 28, 2013.

FIELD OF THE INVENTION

The present invention relates in general to the manner in which a user of a mobile electronic device interacts with the operating system software of the device and more particularly it relates to a method of single-handed software operations with the operating system and application software associated with a large form factor mobile electronic device being held in one hand of a user.

BACKGROUND

The present day mobile phones have grown in scope from being simple cellular telephones to smart phones that are multi-functional devices at the convergence of several large industries, including telecommunications, networking, computer, consumer electronics, digital media, electronic commerce, and software. Consequently, the smart phones of today are built with a wide range of capabilities such as internet browsing, email, instant messaging, GPS navigation, photography, video conferencing, e-book reading, video playback, radio, and hundreds of thousands of software applications that provide entertainment, education, utility and productivity. In fact, the traditional cellular voice telephony has become just one of a very large number of functions available on modern day mobile or hand held electronic devices.

Most, if not all such modern day mobile devices are built with touch-sensitive screens, and designed to be held in the palm of one hand and supported by the fingers on that hand, which frees the thumb to interact with the touch screen to act as an input mechanism to the operating system software of the device and any other programs or applications running on the device. The thumb can be used as an input device which can be used to make a variety of gestures, such as touch or tap an area of the screen, touch and hold an object, drag an object, double-tap, swipe in various directions, hover, or draw out a pattern. An application program (app) or the operating system (OS) of the device can be designed to work with such inputs as a component of their user interface.

Of course, whatever action is performed by the thumb of the hand in which the device is being held can also be performed by the thumb or another finger on the other hand or even by another user, or other means. Also, many of the applications on smart phones do require or prefer the use of two hands. However, routine tasks, such as turning on a device, entering a security password, answering an incoming phone call, making an outgoing phone call, configuring many of the functions on the device, and running many of the applications require nothing more than the thumb of the hand in which the device is held, which makes them usable with one hand by and large. That makes these devices extremely easy and convenient to use.

With all the new uses playing an increasingly dominant role, there is growing pressure on smart phone makers to use larger screens that are capable of showing more data or richer content. Advances in display and battery technologies are enabling devices with larger screens with more resolution that are also lighter in weight and can run for longer times. However, the larger the screen, the farther a phone moves away from its compact form factor and the convenience of being used with one hand. For this reason, many manufacturers are reluctant to make phones with very large screens. While there are smart phones with five inch diagonal screens such as the Samsung Galaxy® that are very popular indeed, many users find them frustrating because they are too big to use with one hand.

At the same time, tablets have grown into an enormous market in recent years. The original iPad from Apple was launched with a 10" diagonal screen, and many new notebook computers are being designed as hybrid devices that can double as tablets with 10" to 11" screens. Since the original iPad, the industry has extended the tablet footprint to smaller form factors in the 7" to 8" inch screen sizes. The smaller tablets are increasingly headed in the direction of smart phones, resulting in a new category of devices sometimes called "phablets". With their smaller form-factor, there is a natural tendency to use them like smart phones, so their large size relative to phones makes them cumbersome to use with one hand.

Thus, there is a need to not lose the convenience of one-handed operation of smart phones, as they grow large in their screen size, and at the same time, to gain the convenience of one-handed operation of tablets, or at least the smaller form-factor tablets, as they find uses that were once the exclusive domain of smart phones.

There are similar trends towards offering larger screen sizes for digital media players such as the iPod Touch®, as they become a part of the form factor continuum of smart phones, phablets and tablets. The growing convergence between all these devices is a natural consequence of these devices being built on a common OS such as Android® from Google, Inc., iOS® from Apple, Inc., Windows®-8 from Microsoft, Inc., etc. This practically assures that all devices, regardless of their form factor, that use the same operating system can provide a similar user experience.

For the purpose herein, all the above devices are referred to as "mobile devices", although they could be operated while being connected to a power source, or tethered to or plugged into other equipment.

Mobile devices are now increasingly finding use as control panels for equipment (e.g., automobiles or machinery), front-ends for transactional systems (e.g., point of sale or service terminals), and as devices for dedicated uses (e.g., e-book readers or gaming consoles). A point of sale terminal can be built in a small form factor (e.g., with an Apple iPod Touch® with an added credit card reader), while a point of service terminal might require a larger form factor to display more information (e.g., a package delivery or field service solution built with a tablet). It is often desirable to hold such a device in one hand and operate it as much as possible with the thumb of the hand in which the device is being held, while freeing up the other hand for other uses (e.g., to swipe a credit card, or carry a package, or to simply hold on for support).

Thus, there is a broader need in the industry to make larger form factor mobile devices as usable as practicable with one hand.

Now, it must be pointed out that there are times when two hands are needed to operate even small form-factor devices. Even a very small phone with only a 1.5" or 2" screen sometimes requires the use of both hands (e.g., when one has to type in text). The point is, by and large, the smaller form-factor devices are designed to be both held and operated with one hand, while the larger form-factor devices almost necessitate the use of both hands, one to hold and the other to use, or sometimes both hands to hold and use at the same time. Thus, in this context, single-handed usability does not mean the total elimination of ever having to use both hands. Rather, it means the ability to both hold and use larger form-factor devices with one hand to essentially the same degree to which smaller form-factor devices could be both held and used at the same time with one hand.

Also, for the purposes herein, using or operating a mobile device refers to using the software on the device by means of the touch-sensitive display or screen and the thumb of a user's hand in which the device is held. Any use of the device that requires a tool such as a stylus or a keyboard, any operation of physical controls on the device, such as buttons and switches on the device, are beyond the scope of the present invention.

Although the weight of a large tablet such as the Apple iPad® with its 10" screen makes it difficult to both hold and use it with one hand, smaller tablets such as the Amazon Kindle Fire® or the Apple iPad Mini) with their 7-8" screens are sufficiently light in weight to both hold and operate with one hand. In fact, it is rather cumbersome to use one of these with two hands if a user is used to a standard sized iPad. However, if a smaller tablet could be mostly used with one hand, it would be a far more convenient form factor than a 10" tablet. Realizing this and finding a solution for such use is a major breakthrough implemented in accordance with the present invention as disclosed hereinafter, where the solution is extendible to large-screen smart phones and other hand held electronic devices which utilize a touch screen panel as a user input device.

SUMMARY OF THE INVENTION

The present invention essentially simulates a small form factor user experience on a larger form factor mobile device by concentrating the user inputs and controls to the extent practicable into a smaller area on the screen that can be naturally and comfortably covered by the thumb of the hand in which the device is being held. This area is referred to herein as a single-handed usability zone or SHUZ.

The central idea is that in a small form-factor device, the screen of the device simply does not exist beyond the reach of the thumb in which the device is held. So in a larger form factor device, if the screen area outside the reach of the thumb of the hand in which the device is held were made to be not necessary to interact with the software on device, then the device would be usable with one hand essentially to the same degree as a smaller form factor device could be used with one hand.

Additionally, the present invention delivers a number of other benefits which address both certain deficiencies in mobile devices today, as well as certain capabilities that will likely be required in the future to make using mobile devices a more comfortable, productive and safer experience.

These innovations are achieved by incorporating a SHUZ methodology and process into the master control program or OS of the device, and implementing in software the necessary OS functions and services to SHUZ-enable the apps running on the device.

As a first aspect the present invention provides the ability for the user of a large form factor mobile device to interact with the OS from within a SHUZ to the extent necessary for the user to operate the device with one hand to the same degree as the user would be able operate a small form-factor device with one hand. The SHUZ would in essence, become a proxy for the desktop of the device, and act as much of a portal between the user and the machine as the full desktop of the device would be.

In an embodiment of the first aspect, all the necessary OS commands and device interaction the user would have from the standard desktop made available through a miniature proxy desktop contained in a SHUZ. This includes configuring the device, browsing the system, launching apps, opening documents, etc. Except for the smaller physical size, the proxy desktop (referred to herein as SHUZ-DT) would look very much like the standard desktop, and provide substantially the same functionality as the standard desktop. The typical desktop contains a set of actionable icons which when tapped, result in an action such as a dialog box popping up, an app being run, or a file or folder being opened. The present invention allows the user to move some or all the contents of the standard desktop to a SHUZ-DT, and later, access them as he or she would have accessed them from the standard desktop. This enables single-handed access to the desktop even with a large form factor device but using the same thumb stroke actions commonly used and understood by a user of a small form factor device. Using the thumb to scroll within the SHUZ-DT, there would be no practical limit to the number of objects that could be placed within the SHUZ-DT.

A second aspect the present invention provides users of large form factor mobile devices the ability to interact with an app on the device via a SHUZ as far as practicable, to run the app with one hand to the same degree as they would be able to run it with a small form-factor device with one hand.

In an embodiment of the second aspect, an app substantially channels all its user interactions via a dialog box or a control panel placed within a SHUZ, referred to herein as the SHUZ application interface (SHUZ-AI). The app might indeed utilize the entire available size of the physical display for presenting its output. For the purposes herein, an app includes any software that runs on the device, compiled or interpretive, and includes any OS functions or utilities that are used by the users. The OS would provide the software infrastructure and OS services that can be used by apps for the SHUZ-AI, and communicate in real time the information needed (e.g., location, orientation and size of the SHUZ), in order that the apps can confine their user interactions to within the SHUZ-AI. Exactly how that user interaction would visually appear to the user would be up to the designer of an individual app. However, the infrastructure for rendering the SHUZ-AI and obtaining the user inputs would be provided by the OS. By adding the right functions and services to the OS, the majority of the heavy-lifting to SHUZ-enable apps can be performed by the OS, which makes implementation straight forward for apps developers. The maker of the large form factor mobile device OS would need only to provide the appropriate software development tools and programming interfaces so that developers can build SHUZ-aware programs. Alternatively, the OS could also make available the necessary internal functions and services to enable middleware programs to SHUZ-enable the mobile device and apps running on it.

A third aspect the present invention provides the ability for a user of a mobile device to extensively customize and personalize a SHUZ-DT with respect to its shape, size, visual appearance, contents and accessibility of the contents. This enables an optimal usage experience to every individual user.

In an embodiment of the third aspect of the present invention, a set of software functions and features are added to the OS of a device to enable users to personalize a SHUZ that best fits their individual usage. The OS would then save such personalization data as a user profile utilized for interacting with the user, and also for communicating salient aspects of the profile to any SHUZ-enabled software running on the device.

In another embodiment of the third aspect of the present invention, the most basic customization is the visual appearance of the SHUZ-DT for attributes such as its color, border, shape (e.g., sharp or rounded corners), and any number of visual effects that could be provided (e.g., 3-D looks).

In yet another embodiment of the third aspect of the present invention, the overall size of the SHUZ may be customized as a function of the length of the thumb of the user, as well as the screen movement area reachable by the thumb of the user. The SHUZ is typically rectangular shape in shape, but its width and height may be customized to satisfy the usage of an individual user. The SHUZ could also be of an irregular shape.

In still yet another embodiment of the third aspect of the present invention, users may populate the SHUZ-DT with whatever apps they most frequently use. This allows users to make the mobile device work for them. Some users might use their mobile device primarily for voice telephony, while others may prefer instant messaging or email or for some other use. Organizing the SHUZ-DT with specific apps lets each individual user use the device in a way that best fits his or her needs.

In yet another embodiment of the third aspect of the present invention, the user may anchor certain icons in the SHUZ-DT at certain locations within the SHUZ-DT. That way, the user can force certain apps to always show up in fixed locations within the SHUZ-DT, while letting the OS to automatically reorder the sequence in which icons are presented within the SHUZ window based on usage frequency or some other metrics.

In another embodiment of the third aspect of the present invention, the user may adjust the horizontal and vertical pitch of the icons within the SHUZ-DT. One of the problems with mobile devices today is that the device form factor does not map well to the size or range of thumb movement of the user. For instance, a petite woman with a small hand and slim fingers might find a 5" Samsung Galaxy attractive, because she reads a lot, and would like a larger display with more pixels. However, she might find it very inconvenient to use given the characteristics of her hands, so she might be forced to buy a much smaller mobile device with a 3.5" screen. Or a heavily built male plumber with large hands might really prefer a very compact 3" smart phone for portability reasons, but may be forced to buy a six inch mobile phone because the icons and commands in the compact phone are just too tightly packed for his oversized fingers. Thus, there is a substantial direct correlation between the characteristics of a user's hands and the mobile device that user finds comfortable to use. As a result, both these individuals would end up making a sub-optimal purchase decision. The present invention essentially decouples the size of a mobile device from the physical attributes of a user's hands. This unique and novel method is not concerned with the physical size of the device, but rather, directed to a virtual size and a layout organization that presents the content the user needs to quickly and easily reach with his or her mobile device. In this regard, by adjusting the pitch and size of the icons within the SHUZ-DT, the petite woman who is an avid reader or the plumber with his oversized hands could get the form factor they really prefer, and use them very comfortably by mapping the devices to their specific hands.

In an embodiment of the third aspect of the present invention, users may save usage profiles, and select a specific profile as needed. For instance, mobile devices are often shared between people, e.g., husband and wife, or parent and child, with each user with his or her own individual needs while using the same device. It is also possible that the same user might need a different user experience at different times. For instance, a mail or package delivery man who wears heavy gloves during winter months may want a "fat finger friendly" accommodation by the device while being outdoors during the winter months, while reverting back to a "normal" user experience at other times. The present invention develops the notion of customized usage-specific profiles that can be easily created, edited, copied, saved and applied.

In another embodiment of the third aspect of the present invention, based on typical thumb size demographics (length, thickness, range of motion), a mobile device maker may provide a set of standard user profiles that will work for a majority of users. This will allow a device maker to set a factory default profile, and also let users pick a standard profile that might fit them well enough.

As a fourth aspect the present invention provides the ability for a SHUZ to be automatically and intelligently located as appropriate in a given context anywhere on the screen of a mobile device in the right orientation, based on an estimation of the location of the thumb of the user's hand in which the device is being held, or optionally, always at a fixed location on the screen, and automatically be adjusted based on the orientation of the device. This works for both the SHUZ-DT and the SHUZ-AI.

In an embodiment of the fourth aspect, the SHUZ may be placed anywhere on the screen, as appropriate to a given context, such that it is conveniently placed and ready for use with the thumb of the hand in which the device is being held. This applies to both a SHUZ-DT, as well as a SHUZ-based user interface used by an app. For the purposes herein, when the term SHUZ is used in isolation, it could mean either a SHUZ-DT or a user interface dialog box or menu used by an app that is placed in a SHUZ-AI. The concept of auto placement of a SHUZ provides instant and convenient way to use a device with one hand, for either interacting with the OS or for running an app. There are a number of ways to estimate with reasonable accuracy the position of the thumb of the hand holding the device, and this can be used to let a user hold a device that is most comfortable to him or her, and using the device in a very intuitive and efficient way by having the controls under his or her thumb.

In another embodiment of the fourth aspect of the present invention, there is no concept of a mobile device for left-handed or right-handed people. Small form factor devices are small enough to be operated with either hand, although even here, there are subtle biases towards people who are right handed. For instance, the little camera icon on the iPhone-5 appears on the right edge of the screen, where it is more easily accessed by the left thumb, but is awkward to access for a user who holds the device with his or her right hand. It becomes a bigger problem when the form factor is larger. The present invention provides a solution by being able to place the SHUZ on either side of the screen, so it no longer matters whether a user is left-handed or right-handed.

A fifth aspect the present invention provides the ability to organize information on a mobile device using a hierarchical or distributed schema, and efficiently navigate through it with single-handed operation by means of overlapping windows over a SHUZ.

In an embodiment of the fifth aspect of the present invention, a comprehensive hierarchical directory system could be implemented on a mobile device to organize the content, and easily accessed via the SHUZ paradigm. Today, desktop and notebook computers provide extensive capabilities for organizing vast amounts of data in a hierarchical system of folders or directories. As mobile devices become increasingly more powerful in terms of their computing and storage capabilities, users will store far more apps and data files that they will need to organize better and access efficiently. The present invention provides an elegant solution to navigate through any complex hierarchy by means of overlapping windows within a SHUZ-DT that the user can spawn or close with simple gestures of the thumb of the hand holding the device.

In another embodiment of the fifth aspect of the present invention, data can be organized into groups. In this regard, the idea of access by group is unique and novel. A group is different from a folder in that an item (e.g., a file or a program) may belong to more than one group. For example, a photo called DSC1234.jpg may belong to several groups called "Landscapes", "Canada", "Nikon D800", "Family Vacation 2013", and so forth. This provides for a different kind of organization and access to information.

In yet another embodiment of the fifth aspect of the present invention, an app on a mobile device may use a SHUZ-AI to provide an arbitrarily complex, hierarchical menu structure. Today, mobile device apps are much simpler than the powerful software programs that run on desktop or high-end notebook computers. As mobile devices become computationally more powerful, they will be capable of running more sophisticated applications that will also require more complex menu structures than what is found in typical mobile phone or tablet apps today.

A sixth aspect the present invention provides a method of customizing a mobile electronic device desktop, comprising the steps of: generating a single-handed utilization zone for user operating system and program application interactions; determining the location of a hand holding device thumb of a user resting naturally and comfortably on the mobile electronic device desktop; rendering invisibly the single-handed utilization zone on the mobile electronic device desktop at about the determined location of the hand holding device thumb of the user; and rendering visibly on the mobile electronic desktop within an area occupied by the single-handed utilization zone a user customized single-handed utilization zone desktop; wherein said single-handed utilization zone desktop has displayed therein a plurality of actionable icons to facilitate user operating system and program application interactions using substantially only the hand holding device thumb of the user now resting naturally and comfortably on the single-handed zone desktop.

A seventh aspect the present invention provides a method of customizing a mobile electronic device desktop, comprising the steps of: rendering visibly on the mobile electronic desktop within an area occupied by an operating system generated single-handed utilization zone, a single-handed utilization zone desktop having a plurality of actionable icons arranged with a horizontal pitch and a vertical pitch customized in accordance with a user specific profile defining the physical attributes of a hand holding device thumb of a user of the mobile electronic device desktop.

An eighth aspect the present invention provides in a large form-factor mobile electronic device having a touchscreen for receiving user thumb input actions via an operating system desktop to facilitate user-software interactions, a method of enabling single-handed user-software interactions, comprising the steps of: generating a single-handed utilization zone; positioning said single-handed utilization zone at a current detected thumb location on the touchscreen; and rendering a proxy desktop within said zone, said proxy desktop providing substantially the same functionality of the operating system desktop of the large form-factor mobile electronic device.

In an embodiment of the eight aspect of the present invention, the proxy desktop automatically operates in a foreground mode of operation; and in a default mode of operation the proxy desktop substantially conforms in shape, size, appearance, and content to a small form-factor mobile electronic device desktop.

In another embodiment of the eighth aspect of the present invention proxy desktop may be customized with respect to shape, size, appearance, location, content, or accessibility of content to facilitate providing a personalized user experience.

In yet another embodiment of the eighth aspect of the present invention current detected thumb location is tracked on the touchscreen and updated to provide another current detected thumb location each time the thumb of a user is relocated on the touchscreen to automatically position the single-handed utilization zone at about another current detected thumb location with context-aware intelligence.

In still yet another embodiment of the eighth aspect of the present invention current detected thumb location is tracked on the touchscreen by inference.

In still yet another embodiment of the eighth aspect of the present invention the current detected thumb location is tracked on the touchscreen each time the thumb of a user is relocated on the touchscreen.

In yet another embodiment of the eighth aspect of the present invention the method of enabling further comprises displaying in a foreground mode of operation an application program in response to a user initiated desktop program activation request; and wherein the proxy desktop automatically operates on the large form factor electronic device in a background mode of operation.

In another embodiment of the eighth aspect of the present invention the method of enabling further comprises rendering a single-handed utilization zone application interface on the touch sensitive screen within single-handed utilization zone, where the step of rendering the application interface is initiated in response to a user request to bring the single-handed utilization zone application interface to a foreground position on the touchscreen for application program-user software interaction or in response to an application program request to bring the single-handed utilization zone application interface to the foreground position for application program-user software interaction.

In an embodiment of the eighth aspect of the present invention the method of enabling further comprises providing access to an operating system with a software development infrastructure having single-handed usability zone capability to facilitate development and implementation of a single-handed usability zone desktop on the large form factor mobile electronic device; providing access to a plurality of operating system services to a plurality of application programs to facilitate development and implementation of a single-handed usability zone application interface on the large form factor mobile electronic device for each individual one of said plurality of application programs; and providing access to a plurality of operating system services and software routines to middleware programs which can facilitate development and implementation of a single-handed usability zone application interface on the large form factor mobile electronic device for each individual one of said plurality of application programs.

In another embodiment of the eighth aspect of the present invention the single-handed utilization zone facilitates a hierarchical schema using a plurality of overlapping windows within the single-handed utilization zone to efficiently navigate through at least one folder or at least one group to locate a specific document or program within the proxy desktop by user navigation using only the thumb of the device-holding hand of the user.

In still another embodiment of the eighth aspect of the present invention the single-handed utilization zone facilitates using only the thumb of the device-holding hand of the user to navigate through a multi-level program menu using a plurality of overlapping windows within said single-handed utilization zone, wherein each individual level of said menu is presented as an overlapping window with actionable submenus.

In still yet another embodiment of the eighth aspect of the present invention the single-handed utilization zone functions as a portal to provide a hierarchical organization of information arranged in ordered overlapping windows from a bottom hierarchical level to a top hierarchical level; and wherein each hierarchy level displayed in a foreground mode of operating closes upon a user initiated closing request, bringing a prior hierarchy level to said foreground mode of operation until said user closing request closes said top hierarchical level, automatically bringing said touch screen desktop to the foreground mode of operation to facilitate user-operating system software interaction.

In yet another embodiment of the eighth aspect of the present invention the hierarchical organization of information is an organization of hierarchical folders.

In another embodiment of the eighth aspect of the present invention the hierarchical organization of information is an organization of hierarchical of groups.

In still another embodiment of the eighth aspect of the present invention the hierarchical organization of information is an organization of menus.

In yet another embodiment of the eighth aspect the present invention further comprises providing access to an operating system with a software development infrastructure having single-handed usability zone capability to facilitate development and implementation of a single-handed usability zone desktop on the large form factor mobile electronic device; and providing access to a plurality of operating system services and a plurality of program applications to facilitate development and implementation of a single-handed usability zone application interface on the large form factor mobile electronic device for each individual one of said plurality of program applications.

In yet another embodiment of the eighth aspect the present invention the large form-factor mobile electronic device is a hand held device including: a smart phone, a tablet, a notebook computer, a hybrid computer, an electronic book reader, a digital media player, or a special-purpose computer; and wherein each hand held device includes a mobile operating system.

In a ninth aspect of the present invention, a method of customizing a mobile electronic device desktop, comprises the steps of: positioning a single-handed utilization zone on the mobile electronic device desktop at about a determined location of the thumb of a device holding user; and rendering on the mobile electronic desktop within an area occupied by the single-handed utilization zone a user customized proxy desktop.

In an embodiment of the ninth aspect of the present invention the step of positioning includes: generating a single-handed utilization zone for user operating system and application program interactions; and determining the location of a hand holding device thumb of a user resting naturally and comfortably on the mobile electronic device desktop.

In another embodiment of the ninth aspect of the present invention the step of rendering includes: displaying within said user customized single-handed utilization zone desktop a plurality of actionable icons to facilitate user operating system interactions using substantially only the hand holding device thumb of the user.

In yet another embodiment of the ninth aspect of the present invention the plurality of actionable icons are arranged within the proxy desktop with a horizontal pitch and a vertical pitch which are customized in accordance with a user-customized usage specific profile defining the physical attributes of the thumb of the user.

In still yet another embodiment of the ninth aspect of the present invention the physical attributes include at least a length dimension and a breadth dimension of the hand holding device thumb of the user.

In a tenth aspect of the present invention a method of customizing comprises the steps of: rendering on the mobile electronic desktop within an area occupied by an operating system generated single-handed utilization zone, a proxy desktop having a plurality of actionable icons arranged with a horizontal pitch and a vertical pitch customized in accordance with a user specific profile defining the thumb attributes of the user of the mobile electronic device desktop.

In an embodiment of the tenth aspect of the present invention single-handed utilization zone facilitates a hierarchical schema using a plurality of overlapping windows within said single-handed utilization zone to efficiently navigate through at least one folder or at least one group to locate a specific document or program within said proxy desktop by user navigation using only the thumb of the device-holding hand of the user.

BRIEF DESCRIPTION OF THE DRAWINGS

The above mentioned features and steps of the invention and the manner of attaining them will become apparent, and the invention itself will be best understood by reference to the following description of the embodiments of the invention in conjunction with the accompanying drawings wherein:

FIG. 1A-B are schematic diagrams of a prior art small form factor mobile device illustrating its various component parts and software;

FIGS. 4A-C shows schematically how a SHUZ-DT may be organized for efficient one-handed use;

FIGS. 7A-M shows schematically a methodology and a software infrastructure that can be easily implemented to SHUZ-enable a mobile device;

DETAILED DESCRIPTION OF THE PRESENT INVENTION

Figure 2A:
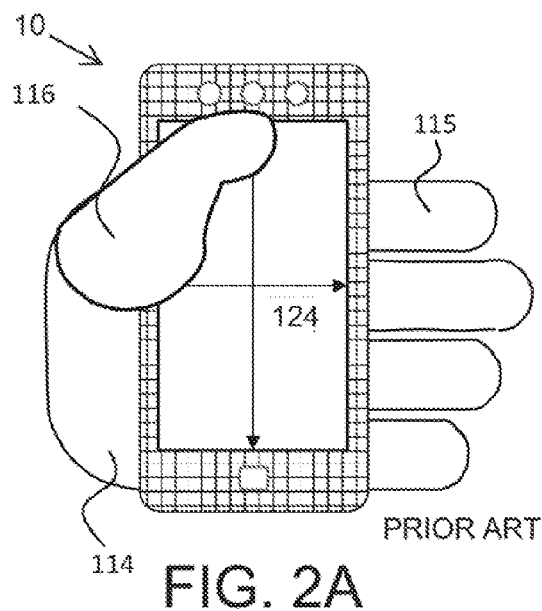
FIGS. 2A-B shows schematically how a prior art small form factor mobile device is typically used.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from either the spirit or scope of the invention.

In addition, the present patent specification uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Before describing the present invention, it may be beneficial to briefly consider the structure and operation of a prior art small form factor mobile device 10 as best seen in FIGS. 1A-B. In this regard, the small form factor mobile device 10 is sufficiently small and compact to be easily held in the hand of a user (FIG. 2A). The mobile device 10 generally includes a flat hollow case housing, which is adapted to be easily carried by the user. Sufficient space is provided within the hollow interior of the housing for the mounting of hardware indicated generally at 30 in FIG. 1B. The hardware 30 includes: (1) one or more processors 105 which could be either standard microprocessors or application-specific systems on a chip (SoC) that include one or more processor cores and other functions, such as graphics and peripheral interfaces; (2) storage devices 106 which may include one or more of flash memory, DRAM or other memory technologies; (3) network interfaces 107 to facilitate mobile communications, such as Ethernet/WiFi, BlueTooth, cellular network, near-field communications (NFC); (4) peripheral device interfaces 108 for interfacing to both internal peripherals such as microphone, speaker, camera, and touch-screen display indicated generally at 124, as well as external devices such as headphones, computers, or other devices; and (5) other hardware as needed, such as a gyroscope or other devices as appropriate for a specific set of uses.

The software, indicated generally at 40 (FIG. 1B), which is stored on the storage devices 106 of the mobile device 10 also reflects the fact that the mobile device 10 is effectively a micro-computer. In this regard, the software 40 generally includes a master control program or operating system 110 stored in non-volatile memory; a variety of software programs 111 including system utilities, manufacturer-provided programs, and very commonly, third-party applications; other firmware, drivers, software, configuration data or other files 112 used by the operating system or other programs, and are needed to make the overall system work or be maintainable; and user-specific data and document files indicated generally at 113.

The prior art mobile device 10, as best seen in FIG. 2A, is typically utilized by a user holding the device 10 in his or her palm or hand 114 while at the same time supporting the device 10 with his or her fingers, indicated generally at 115. In this hand holding configuration, the thumb 116 of the user is free to move freely across the touch screen 124 of the device 10. The thumb 116 of the user therefore functions as an input mechanism to interface with the device 10 and its software. The original Apple iPhone® was designed such that most, if not all of the area of the screen of the device was completely, naturally and comfortably accessible by a majority of expected users. Even today, the smaller form factor mobile devices are built in this manner.

Figure 2B:
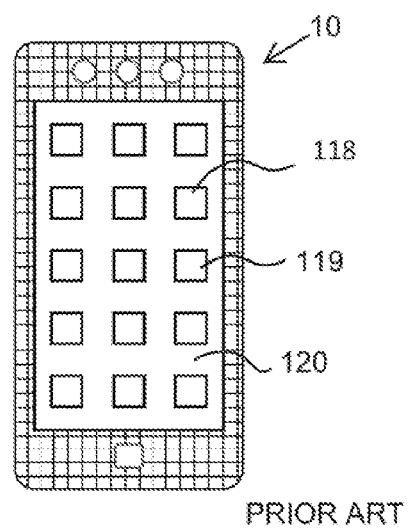

When the small form factor mobile device 10 is turned on, it provide a typical user interface consisting of a desktop 120 as best seen in FIG. 2B. The desktop 120 presents to the user an array of actionable graphical icons, such as icons 118 and 119 respectively. Each of the icons represents a program, a displayed control feature, or a document. Some systems allow icons to also be folders which contain a set of icons of actual programs or links. The icons within the folders may be graphical or text strings, although the modern preference is to use icons with visually intuitive graphics that relate to the underlying function. The size of the individual icons and the density of with which they are packed together on the desktop 120 is typically determined by the manufacturer of the device.

Tapping on an individual icon, such as icon 119 leads to a corresponding response from the operating system 110 which launches the program; this in turn, leads to an action such as the opening of a dialog box for the user to interact with. The program that is launched in this manner, is typically aware of the size of the touch screen 124, and operates within the available window, or provides a mechanism for scrolling or zooming in or out to view larger documents (e.g., a map or a large image). But the key user interactions with the program are usually contained to within the screen 124, and are accessible by the thumb 116 of the user holding the device 10. Frequently, the fingers or thumb of the other hand of a user may be used to input data (e.g., while typing text). But for the most part, the various programs can be run and operated with the thumb 116 and one hand of the user holding the mobile device 10 since the desktop 120 screen area is sufficiently small to allow the thumb 116 of the user to easily and conveniently cover any desktop icon, such as the desktop icon 119.

Figure 2C:
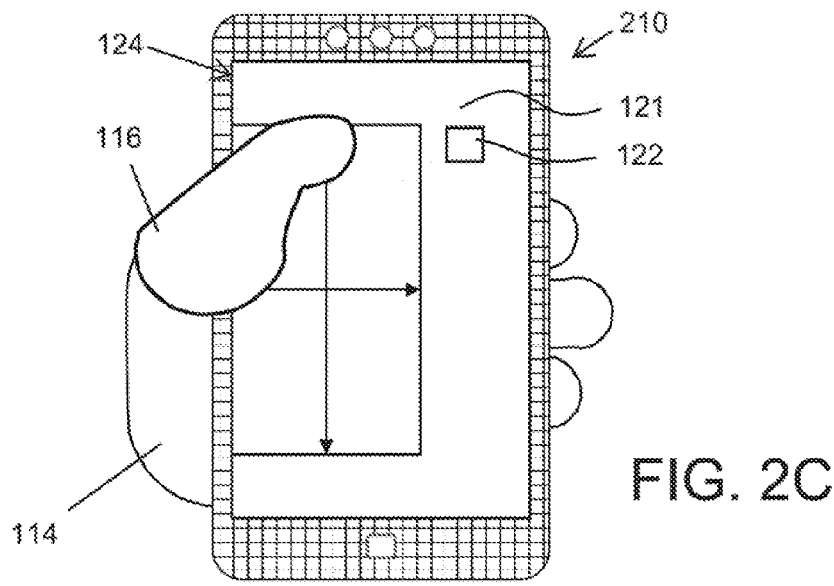
FIG. 2C shows schematically the problem with single-handed operation as related to a large form factor mobile device.

With increased data and media-oriented usage of mobile devices, the pressure has been rising on manufacturers to offer devices in larger form factors that use bigger display or touch screens. The use of a large form factor touch screen 124, as best seen in FIG. 2C, results in a wider desktop, with certain ones of the desktop icons, such as an icon 122, being spread out over a wider desktop area 121, and beyond the reach of the thumb 116 of the user holding the device 110. In this regard, in order to operate a wider screen mobile device, such as a large form factor electronic device 210, the user is required to use his or her other hand to reach icons beyond the normal reach of his or her thumb 116. Moreover, when an icon is actuated and a program launched, most, if not all launched programs will utilize the entire desktop area 121 of the touch screen 124 for interacting with the user. The display of the launched program on the desktop is typically done without any regard to addressing the problems associated with one-hand operability. Moreover, being forced to use two hands is not always convenient, and in some instances, not safe; for example, when a user is standing in a fast moving train, using a smart phone with one hand while the other hand is being used for support. As will be explained hereinafter in greater detail, a unique and novel method of enabling or customizing 1010 as disclosed herein solves these problems by providing access to an operating system with a software development infrastructure having single-handed usability zone capability that facilitates development and implementation of a single-handed usability zone desktop on a large form factor mobile electronic device; providing access to a plurality of operating system services to a plurality of application programs that facilitate development and implementation of a single-handed usability zone application interface on the large form factor mobile electronic device for each individual one of the plurality of application programs; and providing access to a plurality of operating system services and software routines to middleware programs which can facilitate development and implementation of a single-handed usability zone application interface on the large form factor mobile electronic device for each individual one of said plurality of application programs.

Figure 3A:
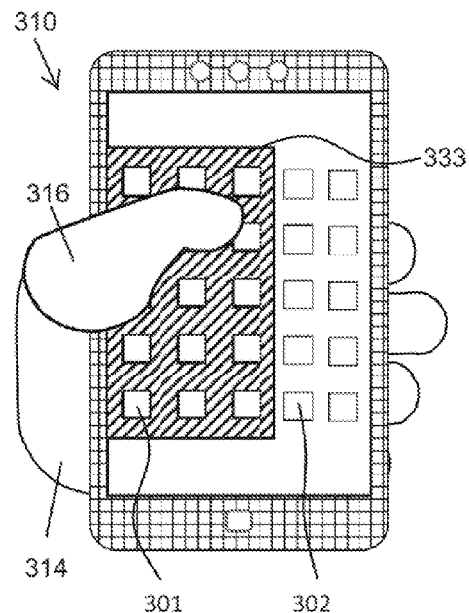
FIGS. 3A-Q schematically illustrates how a SHUZ-DT may be personalized to suit individual physical needs, and how a SHUZ-DT or a SHUZ-AI may be automatically and intelligently placed on a mobile device display screen in a context-dependent manner.
Figure 3B:
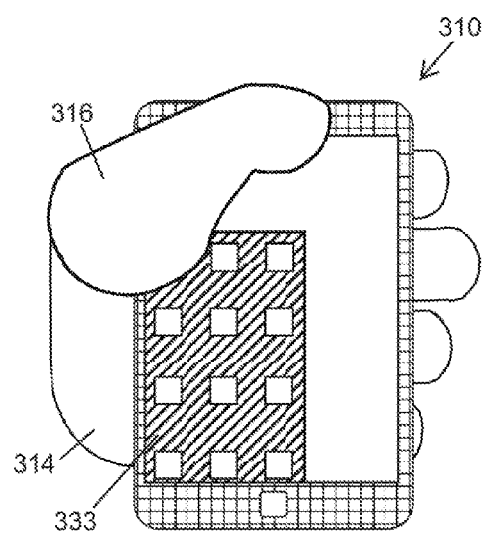
FIG. 3 is a schematic illustration of a large form factor mobile device adapted for single handed operation, which apparatus software is constructed in accordance with the present invention.
Figure 3C:
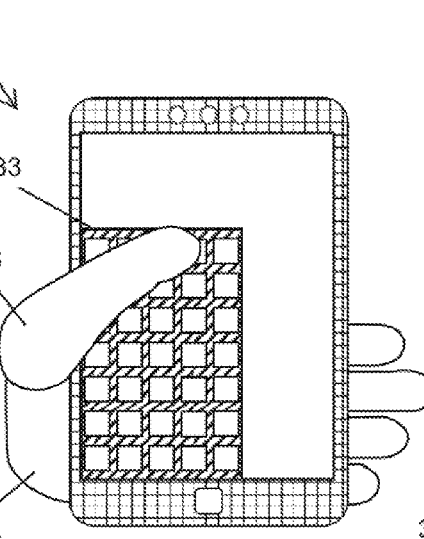
Figure 3D:
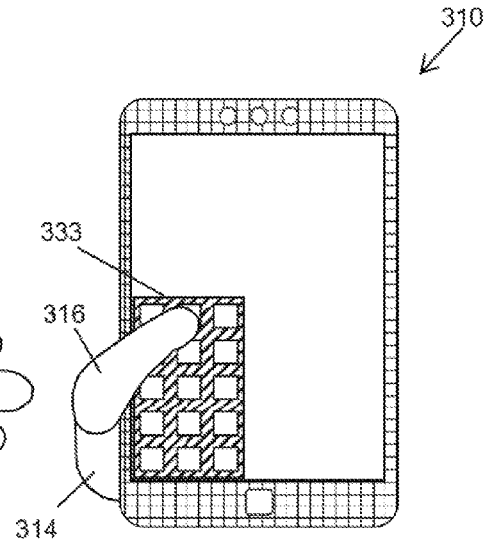
Figure 3E:
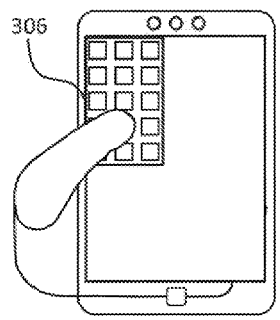
Figure 3F:
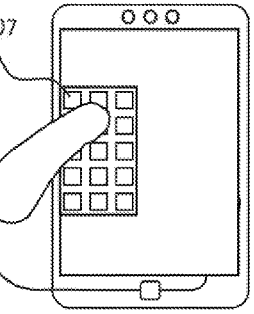
Figure 3G:
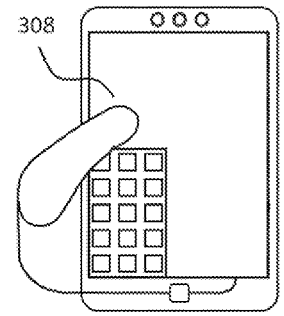
Figure 3H:
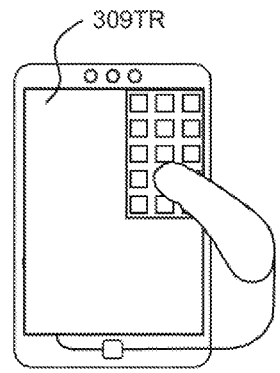
Figure 3I:
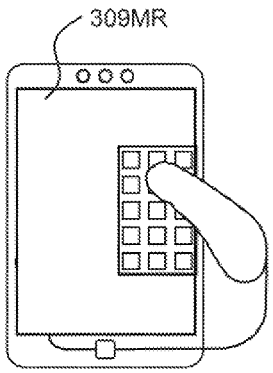
Figure 3J:
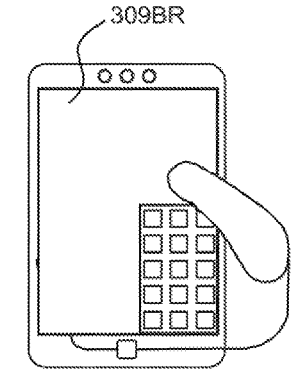
Figure 3K:
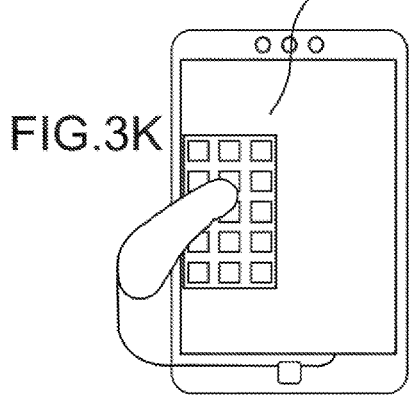
Figure 3L:
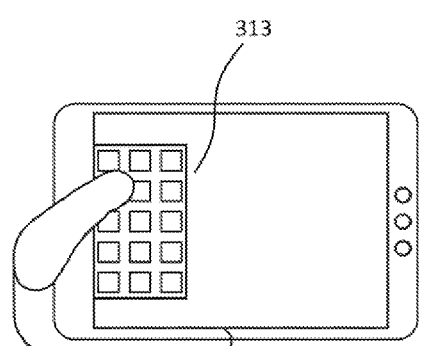
Figure 3N:
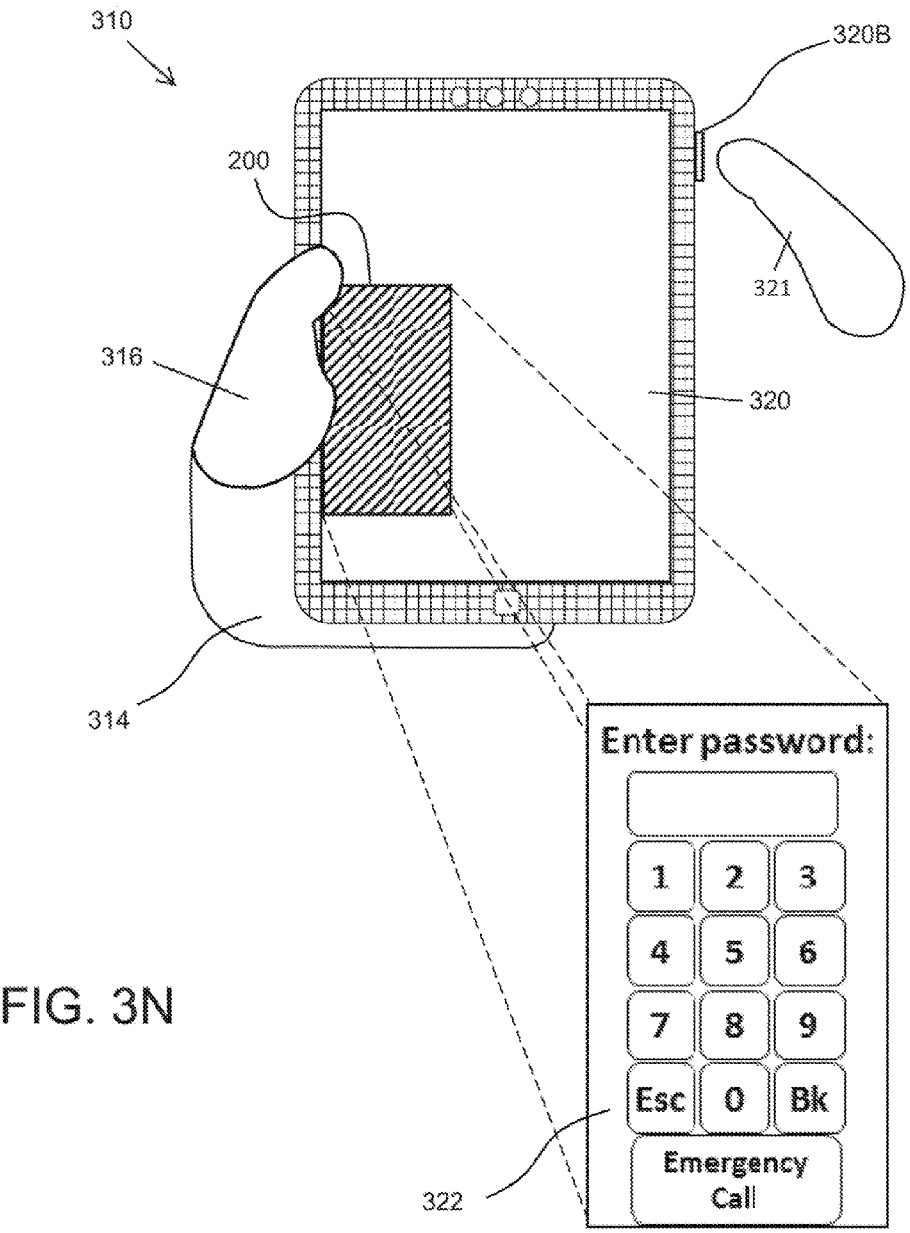
Figure 3:
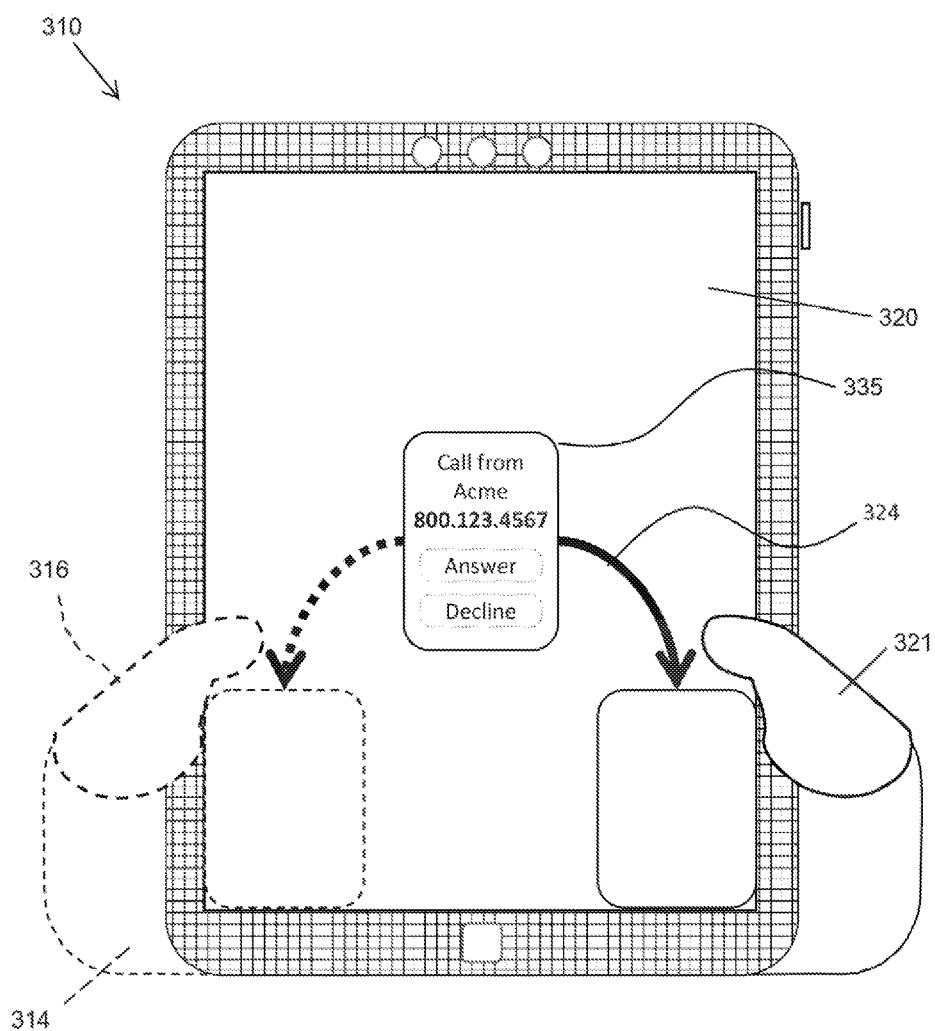

Referring now to the drawings and more particularly to FIG. 3, there is illustrated a large form factor mobile device 310, which is constructed in accordance with the present invention. As will be explained hereinafter in greater detail, the method of enabling 1010 transforms and customizes the desktop 320 of the large form factor device 310 to provide a single-handed usability zone 200 which facilitates simulating a touch screen area with dimensions of a small form factor mobile device, such as the small form factor mobile device 10. For brevity purposes, the single-handed usability zone 200 will be referred to hereinafter simply as the SHUZ 200. As the SHUZ 200 is normally not visible to the user, for clarity of understanding the present invention, the SHUZ 200 from time to time herein will be depicted either as a hashed line or dotted line border, but this will only be done for clarification purposes.

As best seen in FIG. 3, by setting aside the SHUZ 200 on a specific desktop area 320 of a large form factor mobile device touch screen, indicated generally at 314, a user is provided software interactions in an desktop area which can be naturally and comfortably accessed by the thumb of the device user to facilitate single-handed operation of the large form factor device 310. In short then, the method of enabling 1010 facilitates single handed operation of the system and application software of the large form factor mobile device 310, to the same degree as a smaller form factor device could be used with one hand. This is an important and unique approach as most, if not all mobile device users are very familiar with the thumb stroke technique utilized on a small form factor device 10, and accordingly, little or no new mechanical stroke techniques are required to be learned by the user.

In summary then, the SHUZ 200 is simply a designated screen area which is utilized by both (1) the system operating system software or simply hereinafter the OS 331; and (2) any available program apps indicated generally at 332 which may run on the mobile device 310. When no app is running on the mobile device 310, the OS 331 will present the user a miniaturized proxy desktop within this designated screen area, which from time to time is simply referred to as a proxy desktop or a SHUZ-DT 333. The SHUZ-DT 333 for the most part will contain some or all of the icons that would have been displayed on the regular desktop area 320 of the mobile device 310 along with a customized set of icons, such as a customized icon 334, thereby enabling the user to interact with the OS 331 and apps 332 of the large form factor device 310.

It should be noted by those skilled in the art, that when an individual app is running on the device 310, for example app 334, it may use some or all of the touch screen area 320, which may or may not cover the SHUZ-DT 333. This same covering interaction is exactly as one would find in a desktop or laptop computer system. More particularly, when an app is running on a desktop or laptop computer, it will normally consume the whole of the desktop screen area 320, that is, unless the user changes its screen area dimensions. In this regard, whenever an app, such as the app 334, needs to interact with a user (e.g. to present to the user a dialog box or menu selection items), the app 334 under control of the method of enabling 1010, will present its user interface, (indicated generally at 335) to the user within the screen area occupied by the SHUZ-DT 333. Hereinafter, for convenience, such a user application interface will simply be referred to as a SHUZ-AI 335.

Whenever a user has completed his or her interaction with the app 334, for example when the user exists a menu item, closes a dialog box, or otherwise exits the app, the SHUZ-AI 335 disappears, and the area of the screen it occupied is restored to whatever existed before the SHUZ-AI 335 was invoked. From the foregoing, it should be understood that user-OS interactions will be via the SHUZ-DT 333 for the most part, which is effectively a mini desktop that acts as a proxy for the normal or usual desktop. The OS-user interaction will require two-handed manipulation only in very rare situations, if at all. In this regard, the user-app interactions will be via a SHUZ-AI 335, which will be an app-provided user interface dialog box or control panel that will always be confined to a SHUZ 200 as far as practicable, and extended to two handed use only when absolutely necessary due to the programming requirements of the app being utilized. A key element of the SHUZ paradigm is the infrastructure and services provided by the OS to the apps both for software development and in real-time operation.

Considering the SHUZ-DT 333 in greater detail, whenever the device 310 is idle or not running an app, the SHUZ-DT 333 simply looks like and acts as a smaller desktop, showing the user its contents. But when an app is run, the SHUZ 200 appears as a single-handed utilization zone-application interface, such as the SHUZ-AI 335. In a multi-tasking OS, the SHUZ 200 can be used for the application interface of the app currently in focus. The OS 331 manages the use and content of the SHUZ 200. When all apps are closed, the SHUZ 200 returns back to its default SHUZ-DT 333 appearance.

Since users have a wide range of thumb sizes and range of thumb movement, and since mobile devices are made in a wide range of screen sizes and resolutions, and mobile devices can also be used in different orientations, the present invention provides for a SHUZ 200 to be a dynamic area that can be personalized to individual users, and used by software in a context-dependent way.

Figure 10:
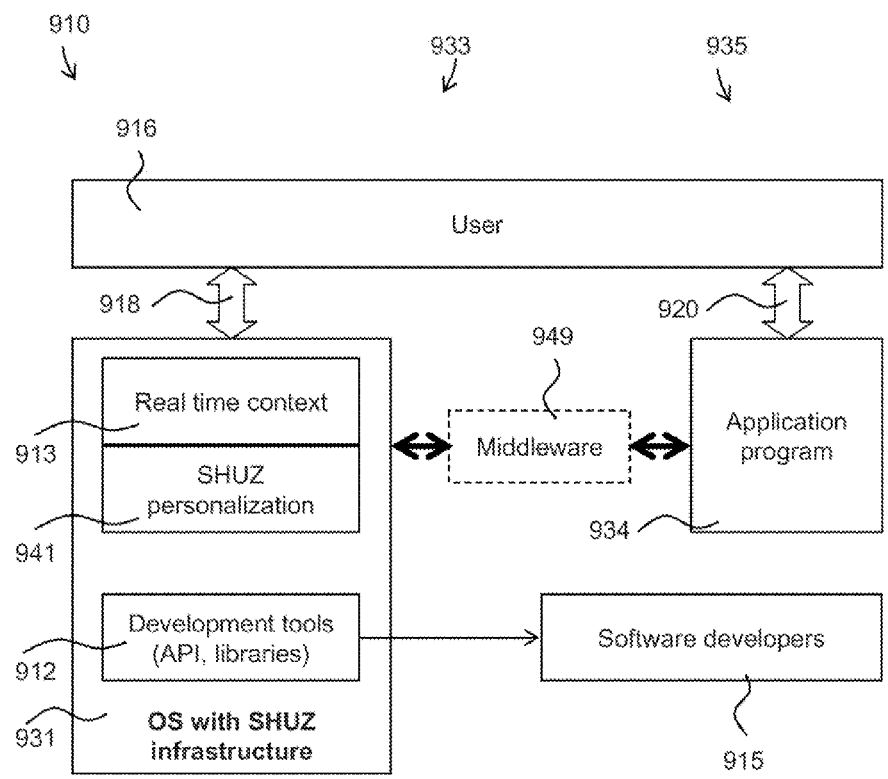
FIG. 10 is a diagrammatic implementation of a SHUZ methodology.

Referring now to FIG. 10, there is illustrated a diagrammatic implementation of a SHUZ methodology, which involves several interrelated elements. First, it starts with adding into a resident operating system 331 of a device 910 a set of functions and feature enhancements to provide the software infrastructure necessary to support a SHUZ 200 paradigm. Such a SHUZ-aware OS is referred to herein as a SHUZ-OS 931. Second, it involves the SHUZ-OS 931 being continually aware of the user profile and any SHUZ personalization currently in use 941 and the real-time context 913 as it applies to SHUZ 200, such as the current location of the thumb of the device-holding hand of the user and the orientation of the device. Third, it involves the SHUZ-OS 931 using the SHUZ profile and personalization in use 941 and real-time context 913 for its own interactions 918 with the user 916 via a SHUZ DT 933. Fourth, it involves the SHUZ-OS 931 using the real time information 913 and 941 to enable an application program 934 to interact 920 with a user 916 via a SHUZ-AI 935. Fifth, it involves making available to software developers 915 the necessary development tools 912 to author application programs with SHUZ 200 awareness. Some or substantially all of the SHUZ 200 paradigm could also be enabled by middleware programs 949 that have access to the internal operations of an OS 331. In summary then, the SHUZ methodology provides access to an operating system with a software development infrastructure having single-handed usability zone capability 931 that facilitates development and implementation of a single-handed usability zone desktop on a large form factor mobile electronic device; providing access to a plurality of operating system services to a plurality of application programs that facilitate development and implementation of a single-handed usability zone application interface on the large form factor mobile electronic device for each individual one of the plurality of application programs; and providing access to a plurality of operating system services and software routines to middleware programs which can facilitate development and implementation of a single-handed usability zone application interface on the large form factor mobile electronic device for each individual one of said plurality of application programs.

Considering now the customization of the SHUZ-DT 333 in greater detail with reference to FIGS. 3A-3T, the SHUZ-DT 333 is the most basic interaction between the user and the device 310, and for a personalized user experience, it can be extensively customized with respect to respect to its visual appearance, shape, size, contents, accessibility of the contents and placement. The set up menu in the device 310 can easily provide the mechanism for all these customizations. For example, referring to FIG. 3A, the SHUZ-DT 333 could have its own color, border, or other artistic attributes (e.g., sharp or rounded corners, 3-D effects, etc.) which could be configured by the user via a set up menu. The SHUZ-DT 333 could be populated with a subset of the desktop icons, such as an icon 301 that will be most frequently accessed, leaving the less frequently used apps or documents, such as an icon 302 on the regular desktop of the device 310. Of course, a user could choose to move all of the standard desktop content into a SHUZ-DT 333 if so desired.

As another example, with reference to FIGS. 3B-D, the size of the SHUZ 200, the size of the icons in the SHUZ-DT 333, and the density of the placement of icons may be personalized to best suit an individual user's thumb length, thickness and range of movement. Depending on whether a user has a long or short thumb, a fat or thin thumb, and a large or small range of thumb movement, a SHUZ 200 and the resulting SHUZ-DT 333 could be made larger or smaller as best seen in FIGS. 3B to 3D, and the density of icons packed into a SHUZ-DT 333 could be more as best seen in FIG. 3C or less as best seen in FIG. 3B. This is achieved by providing the user the ability to personalize the vertical and horizontal pitch of the icons to best match the range of thumb movement, the thumb length and the thumb thickness for the individual user.

Considering the customization in still greater detail with reference to FIGS. 3E-L, the SHUZ 200 can also be placed at different locations on the screen, for both SHUZ-DT 333 and SHUZ-AI 335 usage. Depending on how a mobile device feels in an individual user's hands, the user may opt to have the SHUZ 200 be placed at a top area 306 of the regular desktop screen 320, in a middle area 307 of the desktop 320, or in a bottom area 308 of the desktop screen 320.

Depending on whether the device 310 will be held by the user primarily with the left hand as best seen in FIGS. 3E-G or the right hand as best seen in FIGS. 3H-J, the SHUZ 200 can be placed at different locations on the screen, such as a top right side 309TR, a middle right side 309MR or a bottom right side 309BR. The contents of the SHUZ 200 can also be automatically oriented right based on whether the user is holding the device in a portrait orientation 312 or a landscape 313 orientation as best seen in FIG. 3K and FIG. 3L respectively.

Referring now to FIG. 3M, it can be noted that there are a number of ways by which a reasonable estimate could be made as to the location of the thumb of a user's hand holding a mobile device, especially if it is known if the user holds the device with his or her left or right hand. That information is easily obtained during a set up process. Thus, the SHUZ-OS 931 can continually track the position of the thumb, and automatically and intelligently place the SHUZ 200 in close proximity to the thumb 316 of a user in a context-dependent way, and keep the SHUZ 200 aligned with the thumb 316 to keep up with movements of the thumb as indicated by a movement line 317. If the SHUZ 200 were to be misplaced, a simple protocol could be set up such that a double tap anywhere on the touch screen 320 always identifies the position of the thumb to the SHUZ-OS 931, and pops up the SHUZ-DT 333 in close proximity to the thumb 316, or just under the thumb 316 for easy access. In the event the user's thumb 316 is too close to the bottom edge of the screen 320, the SHUZ 200 can be placed so that its bottom edge aligns with the lower edge of the screen 320. That might result in the SHUZ 200 being placed directly under the user's thumb 316. Again, a simple usage protocol can be used to ensure icons are not inadvertently selected, resulting in apps being launched, or other unintended actions. A simple protocol could be that the SHUZ 200 might be placed under the user's thumb 316, but no icons in a SHUZ-DT 333 or actionable menu or user interface items in a SHUZ-AI 335 will be selected until the thumb 316 is lifted up. That way, the next touch of the screen 320 can be safely interpreted as an intentional selection by the user. Even when an app is running and utilizing the full screen 320, the SHUZ-DT 333 could be invoked with a clearly defined protocol, such as a double tap on the screen 320. So the OS 331 can set aside a gesture like a double tap on the screen 320 in any context as a request by the user for the SHUZ-DT 333 to appear.

Figure 3P:
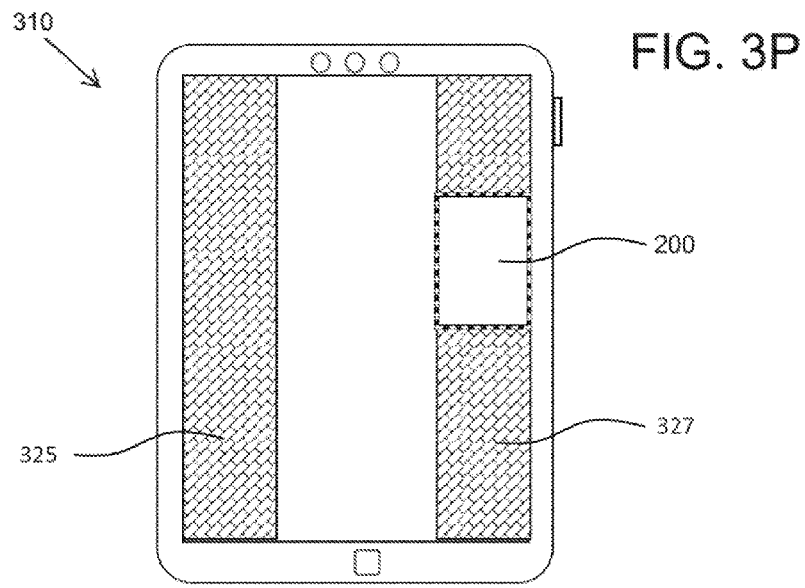

Referring now to FIGS. 3N-P, any apps running on the device 310, including OS utilities can also use automatic placement of a SHUZ 200 for their SHUZ-AI, such as a SHUZ-AI indicted generally at 335. A wake up routine on a mobile device is a good example. When the mobile device 310 is off or idling in a standby state, a user typically picks up the device with one hand 319 and presses a start or wake up button 320B (FIG. 3N) with a finger 321 of the other hand. A typical response to such a manual action is for a login screen 322 to appear in the SHUZ 200, which includes a dialog box asking for the user to enter his or her password. This login screen 322 in this regard, is made available as a SHUZ-AI 335 in the immediate area of the thumb 316 of the hand that is holding the device 310 as best seen in FIG. 3N for a single-handed log in process.

As best seen in FIG. 3 O, auto-placement of the SHUZ 200 can also address whether the user is left-handed or right-handed. For instance, if a phone call comes in, the device 310 can initially display the SHUZ-sized dialog box with a call to action 323 at the center of the screen 320. When the user picks up the device 310, the dialog box can be presented in the SHUZ by relocating it to either side of the screen 320 as indicated by a direction line 324, depending on which hand the user used to pick up the device 310. Thus, both right handed individuals and left handed individuals can use the device 310 with one hand and equal comfort.

Figure 3Q:
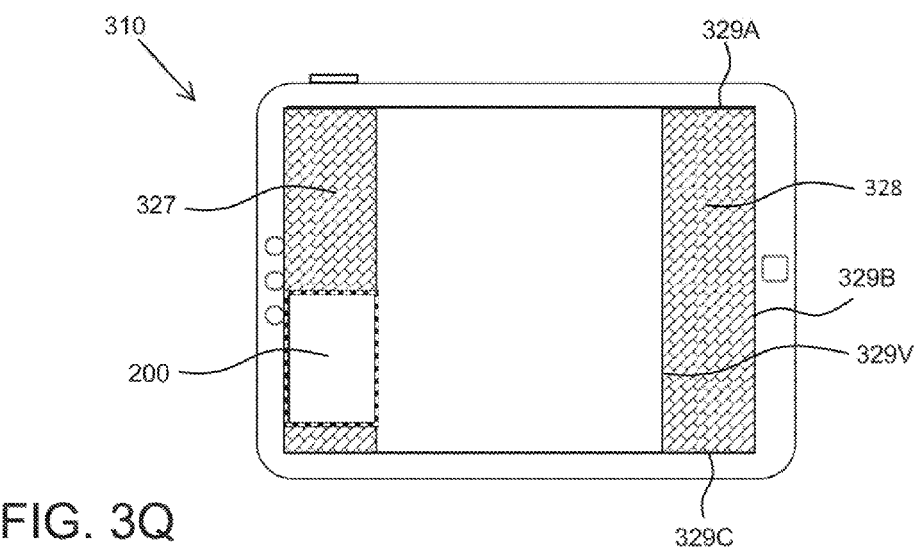

In summary then, there are well defined regions on the screen 320 of a large form factor mobile device 310 where the SHUZ 200 could be placed, depending on whether the device 310 is being held in the portrait mode 325 (FIG. 3Q) in the left hand of a user or in a landscape mode 326 in the left hand of a user, or in a portrait mode 327 in the right hand of the user or in a landscape mode 328 in the right hand of the user. The upper edge of these regions will bound the upper edge of the SHUZ 200, and the lower edge of these regions will bound the lower edge of the SHUZ 200. This ensures that a part of the SHUZ-DT 333 or a SHUZ-AI 335 does not disappear above or below the screen 320. For a given device, three edges of a SHUZ placement region, indicated generally at 329A, 329B, and 329C respectively would be bound by the edges of the screen area 320. The one variable edge, indicated at 329V would be the one towards the center of the screen area 320, and the location of this edge would be based on the usage profile. In all cases, the contents of SHUZ 200 would be rendered in the correct orientation to be readable by the user.

Referring now to the drawings and more particularly to FIGS. 4A-C, the manner of setting up a SHUZ 200 on a mobile device will be described. In this regard, setting up a SHUZ 200 on a mobile device, such as a mobile device 410 can be easily provided via a set up menu on the device or a set up wizard that lets a user personalize a SHUZ-DT 333 for size, visual appearance (e.g., colors, border, 3-D effects, or other design attributes), etc. Since the setup is an infrequent procedure, the user can use both hands to do it.

Referring to FIG. 4A, in a SHUZ-DT 333 setup mode, a user may start with a default SHUZ-DT 433 that the device was shipped with. The user can either use a factory default size, which might be representative of a typical user profile, or select another standard size offered by the device maker as an option, or pick a size or shape that is completely customized to the user's needs. The initial SHUZ-DT 433 may have some icons that were provided by the device maker as a factory default. These might consist of some of the obvious and commonly used functions, such as phone, email, instant messaging, calendar, etc. Less frequently used icons could be on the standard desktop.

The user can modify the contents in the SHUZ-DT 433 by simply dragging and dropping icons from the standard desktop 420 into the SHUZ-DT 433 as indicated by a drag and drop line 401. In the alternative, the user may also drag icons out of the SHUZ-DT 333 and dropping via another drag and drop line 402 them into the standard desktop area 420. When icons are thus moved, they can be automatically rearranged for neatness of appearance. Mobile devices already have the capability to rearrange icons (e.g., when a new app is installed or an app is deleted). Since the SHUZ-DT 433 can be scrolled, there is really no limit to how many icons may be placed into the SHUZ-DT 433. In fact, the entire content on the standard desktop may be moved into the SHUZ-DT 433, if that is what a user wants.

The user can anchor certain icons, such as the icon 403 in specific places, both within the SHUZ-DT 433 as well as on the standard desktop 420. This allows the user to fix the location of specific icons, so they are not inadvertently moved either by the user or by the OS any time it rearranges the icons. A menu of options, indicated generally at 404 can be easily provided during the setup process to let the user identify which icons must be anchored, or for selecting any other options.

The user may create groups of items and place them within the SHUZ-DT 433. A group may be created by opening a group window 405 (FIG. 4B) and dragging and dropping icons from either the SHUZ-DT 333 or from the standard desktop 418 of the device 410 into the group window 405. Since an item may belong to more than one group, a pointer to the actual item (e.g., an image file or an app) is saved in the group window 405. The actual item still remains at its original location. Moving an item out of a group window simply deletes the pointer in the group. Once created, the group can be given a name, assigned a graphical icon and saved, and later, accessed, edited or deleted.

The user may also create folders and place them within the SHUZ-DT 333. A folder, such as a folder 405A (FIG. 4C) is created in a similar way as a group, by opening a folder window and moving items into it from either the SHUZ-DT 433 or from the standard desktop 420. The difference between a folder and a group is that when an item is moved into a folder, the icon is actually moved away from its original location into the folder, so the icon will not appear in any other place. In addition, folders can be hierarchical as generally indicated at 406 (FIG. 4C), meaning they may contain other folders, which in turn may contain more folders, such as a folder 405B. There is no set limit to the number of levels of hierarchy.

Once the SHUZ-DT 433 customizations are complete, the user simply exits the setup mode, and at this point, the SHUZ-DT 433 is ready to use. The user can modify the SHUZ-DT 433 at any time, of course. The user may also create more than one version of the SHUZ-DT 433, such as a SHUZ-DT 333 for example, and deploy a previously saved SHUZ-DT 433 as the current SHUZ-DT 333. This is very useful if there are more than one individual who will be using the device.

Once the SHUZ setup is complete, a user can start using a large form factor mobile device with a single hand to practically the same degree to which the user could have used a small form factor mobile device with one hand. In fact, the SHUZ paradigm allows a significantly more personalized and comfortable usability by mapping the device to an individual user, as well as eliminating the left handed/right handed issue.

Referring now to FIGS. 5A-D, a user 316 would have complete access to all the software and data on a mobile device, such as the mobile device 510 via the SHUZ-DT 333 by scrolling within it as indicated generally by scrolling lines 501. The contents of the SHUZ-DT 333 would typically consist of, as best seen in FIG. 58B, folders 502, groups 503, and individual items 505 such as programs, documents or links. Some of the icons in a SHUZ-DT 333 could be anchored items 504 which do not change their position while the user is scrolling within the SHUZ-DT 333.

Figure 5A:
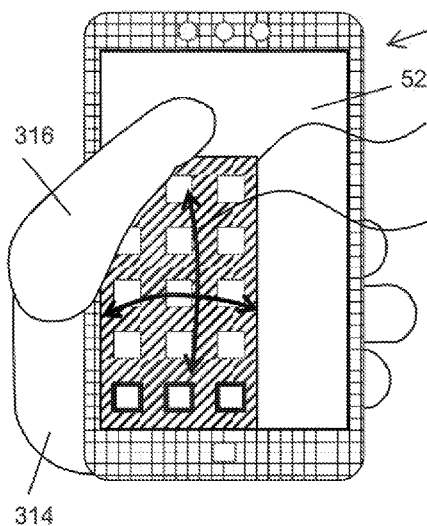
FIGS. 5A-D shows schematically how a user may utilize a SHUZ-DT to navigate in order to efficiently access programs and documents.
Figure 5B:
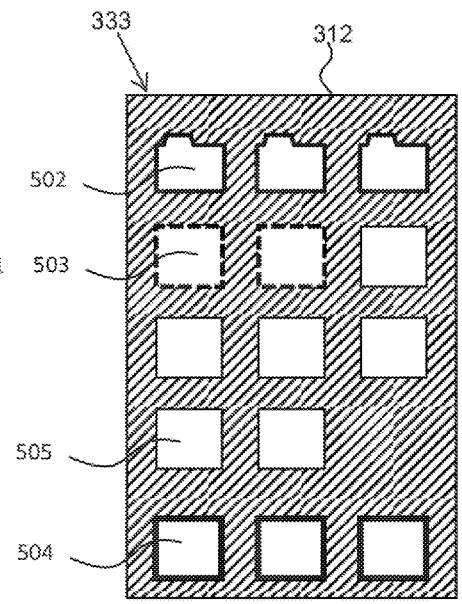
Figure 5C:
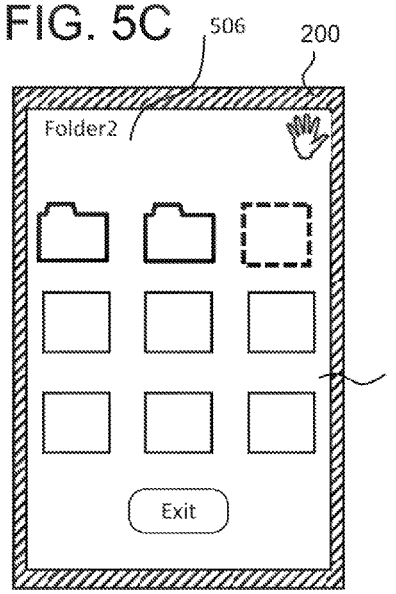
Figure 5D:
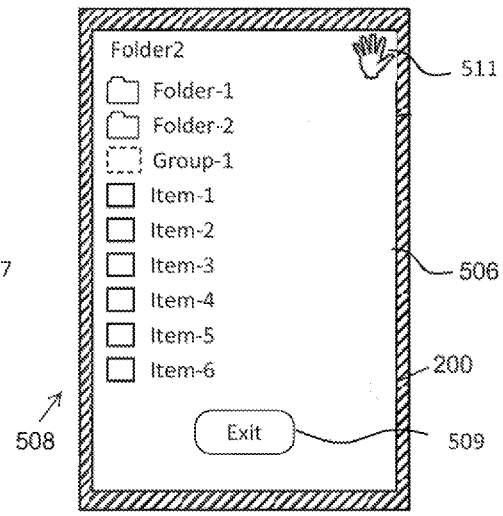

Using folders and groups in the SHUZ-DT 333 is very easy. The user simply taps a folder icon, for example folder icon 502 for instance, to open a folder window indicated generally at 506 (FIG. 5C). The folder window 506 is approximately the same size as the SHUZ 200 (FIG. 5B). The folder window 506 simply overlaps the SHUZ 200, and thereby, provides the same one-handed access as the SHUZ-DT 333. The folder window 506 reveals its contents indicated generally at 507, which would look similar to the SHUZ-DT 333 or it could be listed with file names as in a more traditional computer directory listing 508 as best seen in FIG. 5D.

Folder and group windows, such as the folder window 506, can support scrolling as well, which therefore means there are no hard limits to the number of items that a folder or group might contain. Selecting an item within a folder window that is also a folder will simply open another overlapping folder window. The user can close a currently open folder return to the previous level of hierarchy by tapping an exit button 509, for instance. A more elegant solution as best seen in FIG. 5D, is for the user to make the folder window 506 slightly smaller than the SHUZ 200 and place it over the SHUZ 200 such that the user can cross the boundary of the folder window 506 from inside out with his or her thumb to close the window 506.

Although folders in the SHUZ paradigm are intended for single-handed use, they can always be made available for two-handed use. By providing the means to drag a folder window with either hand, a handle icon 511 (FIG. 5D), for instance, may be covered by a finger on the other hand of a user to cause the folder window 506 to be moved to a different part of the screen 520 (FIG. 5A) by a simple finger movement. This allows for folder windows and the SHUZ-DT 333 to be all open and visible at the same time. This process makes it very easy to modify the contents of folders by simply dragging and dropping items from one folder to another, as one would do with a traditional computer.

Referring now to FIG. 6A, when the user runs an app 601 on a large form factor device 610 and the app 601 has a small footprint (meaning it does not need the entire screen 620 of the large form factor device 610) the entire app 601 may be run more or less within the screen area defined approximately by the SHUZ 200 as a SHUZ-AI. Thus, for example a user selects the app 601 from the SHUZ-DT 333 which causes the SHUZ-AI for the app 601 to then to occupy the screen area defined by the SHUZ 200, which in turn, forces the SHUZ-DT 333 to the background and no longer visible to the user. The SHUZ-AI is especially valuable to legacy apps that were written for small form factor devices. Many mobile device apps are authored by small entrepreneurs who simply do not have the budget to keep rewriting their programs for larger screen sizes, whether or not their apps need them. The SHUZ-AI enables these legacy apps to run on larger form factor devices with minimal changes to the apps. In essence, the legacy apps would still appear to be running on the small form factor mobile devices for which they were intended, anyway.

Figure 6B:
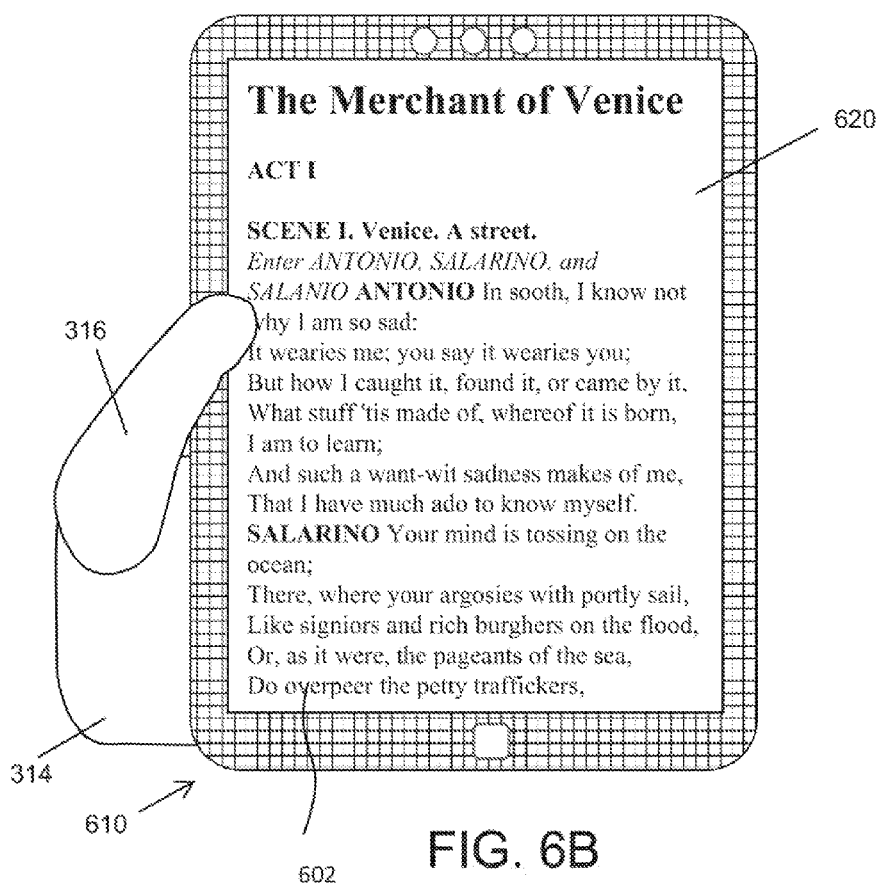
FIGS. 6A-I shows schematically examples of how a SHUZ-AI may be used by the apps on a mobile device to provide single-handed usability.
Figure 6C:
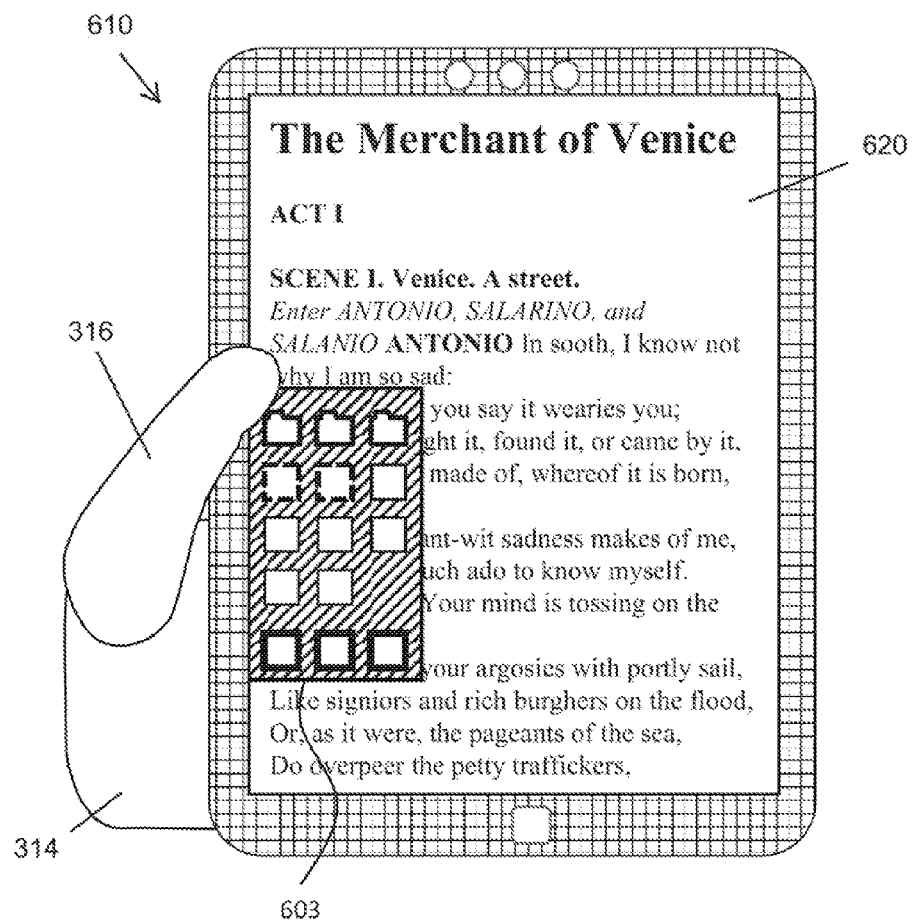
Figure 6D:
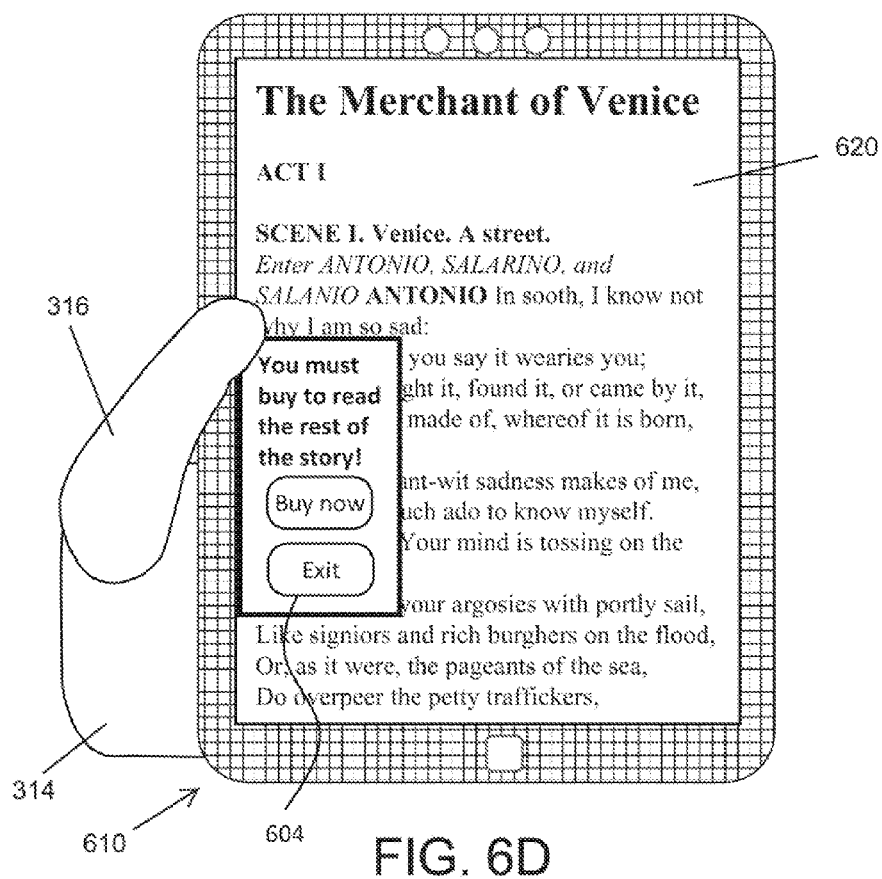

When an app, such as an app 602 as best seen in FIG. 6B, is launched and the app 602 functionally can make use of the full native resolution of a large screen 620, it could run in a maximized mode that takes up the entire screen 620. This action is substantially similar to an app running in a maximized window on a desktop or laptop computer. When such an app is running, a simple usage protocol can be established for single handed use. A gesture such as a double tap anywhere on the screen 620 can be set aside to always be interpreted by the SHUZ-OS 931 as a request for a SHUZ-DT 333 to be displayed as a pop up window 603 as best seen in FIG. 6C. This would allow the user to multitask, without having to exit or minimize the currently running app 602.

When an app, such as the app 602 needs to interact with the user 316, the app 602 channels as much of its user interface as practicable through a SHUZ-AI 335, which appears as a pop up dialog box 604 as best seen in FIG. 6O. The appearance, content and design of the SHUZ-AI 335 would be entirely controlled by the publisher of the app, but its overall dimensions would be confined to the dimensions of the SHUZ 200 as specified by the SHUZ-OS 931.

Figure 6E:
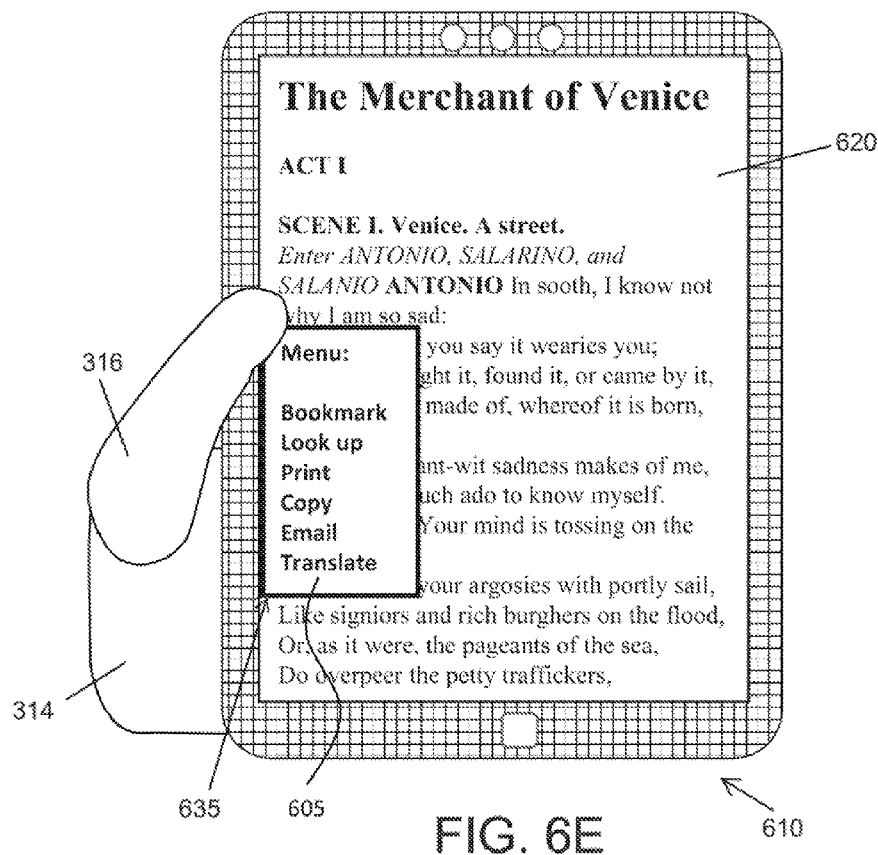

When the user 316 needs to access the controls for the app 602, for example to access a program's menu 605 (FIG. 6E), it can again be achieved via the SHUZ-AI 335. A simple method would be for the user to make a thumb gesture such as drawing the letter M on the screen 620 to get the app 602 to present its menu 605 in a SHUZ-AI indicated generally at 635.

Figure 6H:
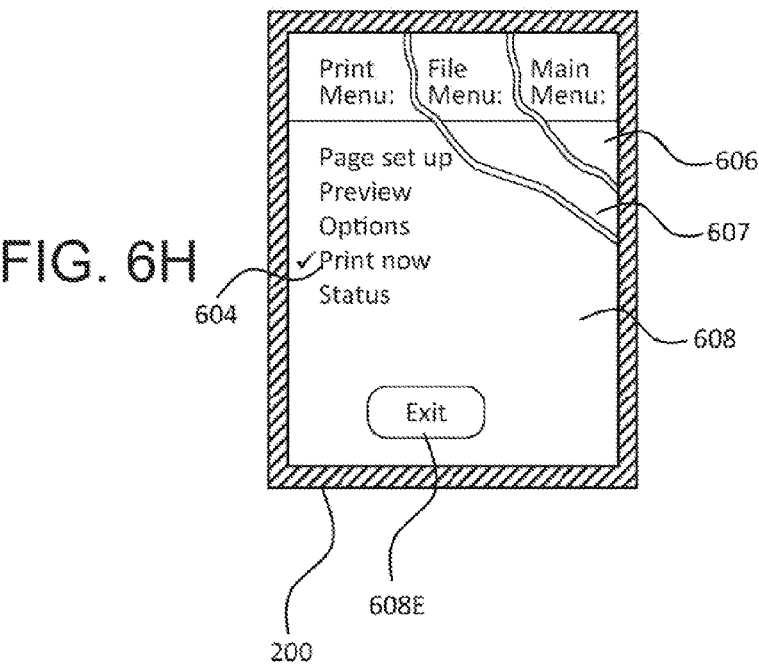
Figures 6F, 6G:
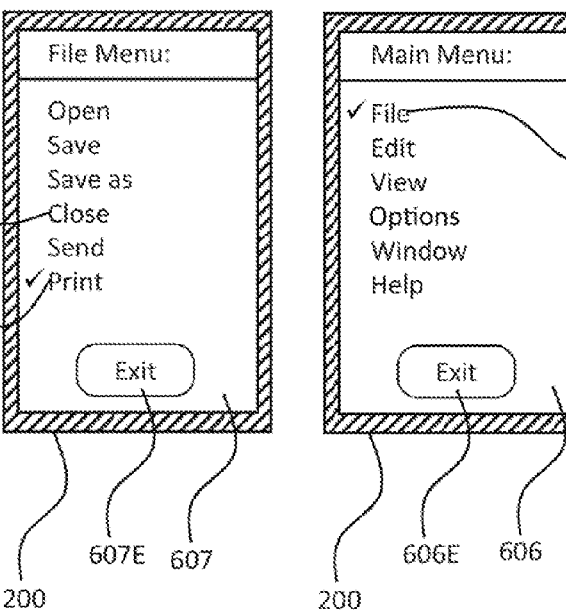

The same method used for navigating through folders in a SHUZ-DT 333 can support a menu hierarchy of arbitrary complexity through a SHUZ-AI 335. An app, for example, could have a multi-level menu comprising a main menu 606, a file menu 607, and a print menu 609 as best seen in FIG. 6H, which menus 606, 607 and 608 may be presented as overlapping menu windows in the SHUZ 200 as best seen in FIG. 6H. In this overlapping structure folder navigating can be easily achieved. For example, if the app was initially in the main menu 606 (FIG. 6F), the file menu 607 would be accessed by the user tapping his or her thumb on the file indicator 606F. In response to this thumb action, the app would open the file menu window 607 (FIG. 6G), which would overlap and hide the main menu 606 as best seen in FIG. 6H. Now, while the file menu window 607 is open and displayed, the user determines to initiate a print action, and does so by tapping the print indicator 607P in the file menu 607. In response to this thumb action, the app would open the print menu window 608 (FIG. 6H), which would overlap and hide the file menu 607. While the print menu window 608 is open and displayed the user could then initiate a print document action by tapping his or her thumb on the print now indicator 608P. The SHUZ-AI in response to this action would cause the selected file to be printed. The user could exit the current menu level by either tapping a dedicated exit button, such as an exit button 608E, 607E or 606E or a menu choice, such as a close file indicator 607C (FIG. 6G). A more intuitive interface could be provided by making the SHUZ-AI slightly smaller in size than the SHUZ 200, so crossing the border of the SHUZ-AI from inside out 609 (FIG. 6H) can be interpreted by the app as an exit from the current level of the menu hierarchy.

Figure 6:
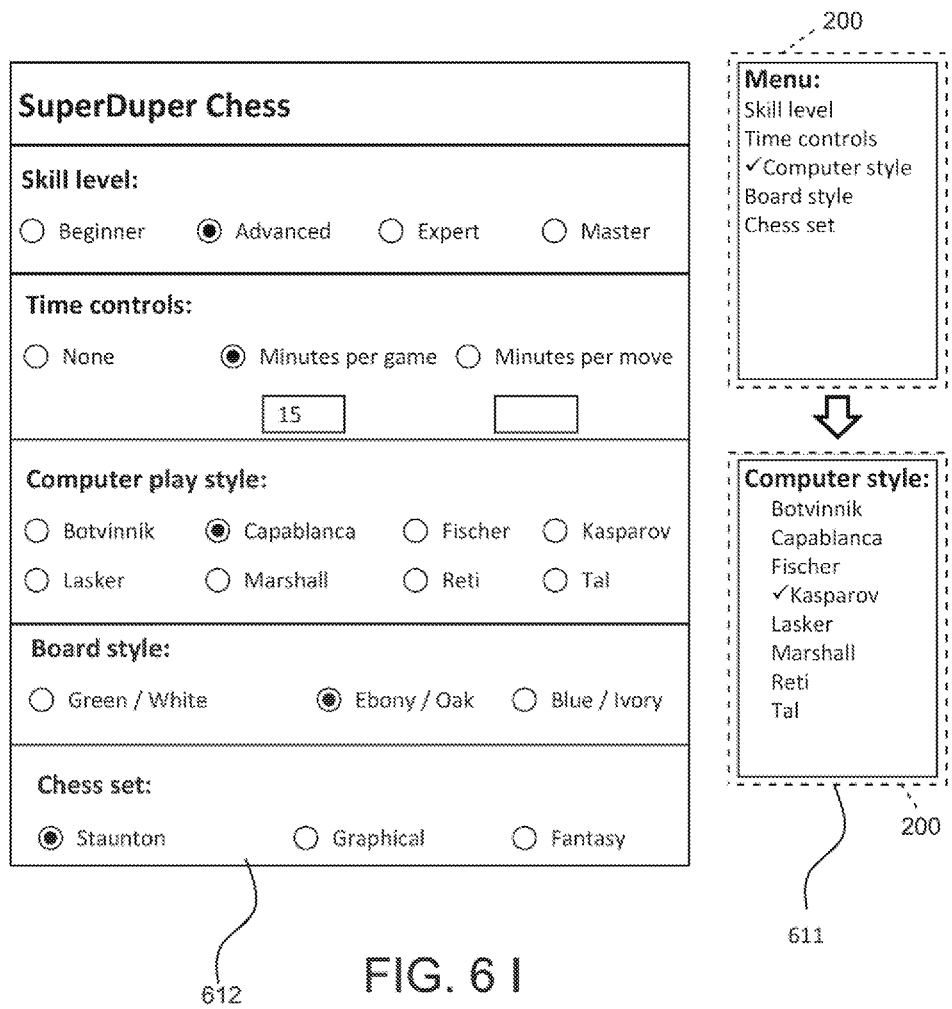

Software developers can also organize the user interfaces of their application programs to take advantage of a SHUZ-AI 335 to enable single-handed use of their apps. A large-area user interface that is designed in a desktop style usage 612 (FIG. 6 I) can often be redesigned for one-handed usability using a hierarchical menu paradigm 611 and SHUZ-AI 335.

A SHUZ 200 methodology is now described in sufficient detail that software engineers with typical skills in the development of an operating system, such as the OS 331 for mobile devices would find it easy to follow and implement a SHUZ 200 paradigm in a variety of creative ways.

Figures 7A, 7B:
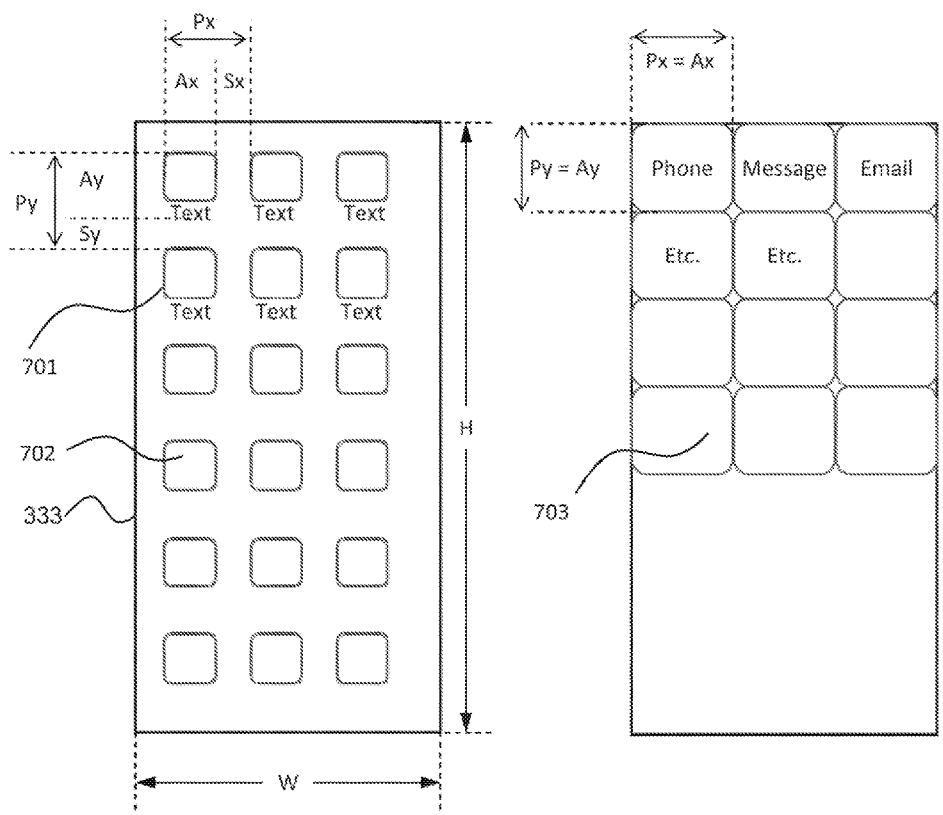

As best seen in FIGS. 7A-B, a SHUZ-DT 333 is populated with the exact same icons that would normally be seen on the normal desktop 320 (FIG. 3) of a large form factor electronic device 310. Some icons use graphical symbols with text under them, for example the icon 701. Other icons use graphics only, such as the icon 702. While still other icon may utilized graphics with text embedded inside them, such as the icon 703. The icons may be either pixel-level bit maps that always span a predefined number of pixels on a screen, for example screen 320 (FIG. 3), or they could be graphical objects defined in a meta-language that could be rendered at different sizes. In all cases, the icons are typically organized as a neat array on the desktop 320 with a uniform horizontal pitch (Px) and a uniform vertical pitch (Py).

A SHUZ-DT 333 can be customized in a number of ways for a personalized user experience. The SHUZ 200 width and height dimensions, W and H respectively, can be allowed to be adjusted within a range specific to an individual device. This accommodates a larger or smaller reach of a user's thumb. The horizontal and vertical pitch (Px, Py) of the placement of the icons within the SHUZ-DT 333 can be allowed to be changed to accommodate the girth of the user's thumb, or use with bare hands or while wearing gloves.

Figure 7C:
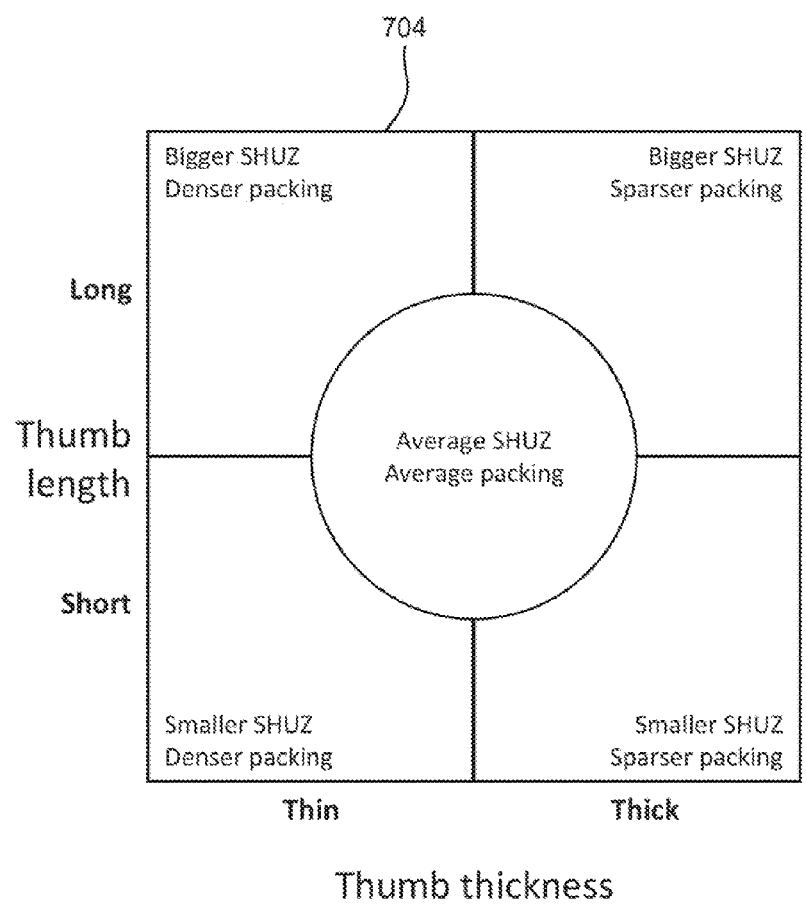
Figure 7D:
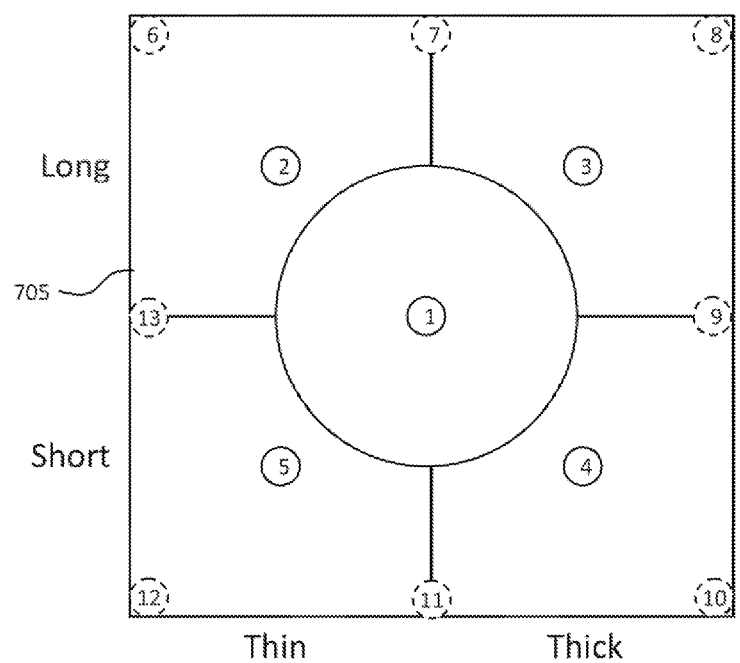

Based on a statistical sampling of people, most users can be classified into a standardized profile indicated generally at 704 as best seen in FIG. 7C. For instance, a range of 1.5" to 4.5" for the length and girth of a thumb would likely cover most likely users. Based on estimated demographics, a device maker could ship devices with a default factory setting for a thumb profile 705 (FIG. 7D) that is the most typical, and also providing additional standard profiles selectable by the user.

The most basic usage profile would include a profile name, width/height of the SHUZ 200 window associated with that profile, and the horizontal and vertical pitch for icon placement associated with that profile. Both standard profiles 706 (FIG. 7E) and personalized profiles 707 (FIG. 7F) would have the same data fields, but with differing values. Logically, it would make the most sense to deal with dimensions in physical units such as inches or millimeters. That way, users can relate to them, while letting the software figure out how many pixels the dimensions translate into, based on the screen size and native resolution of a specific device.

Figure 7G:
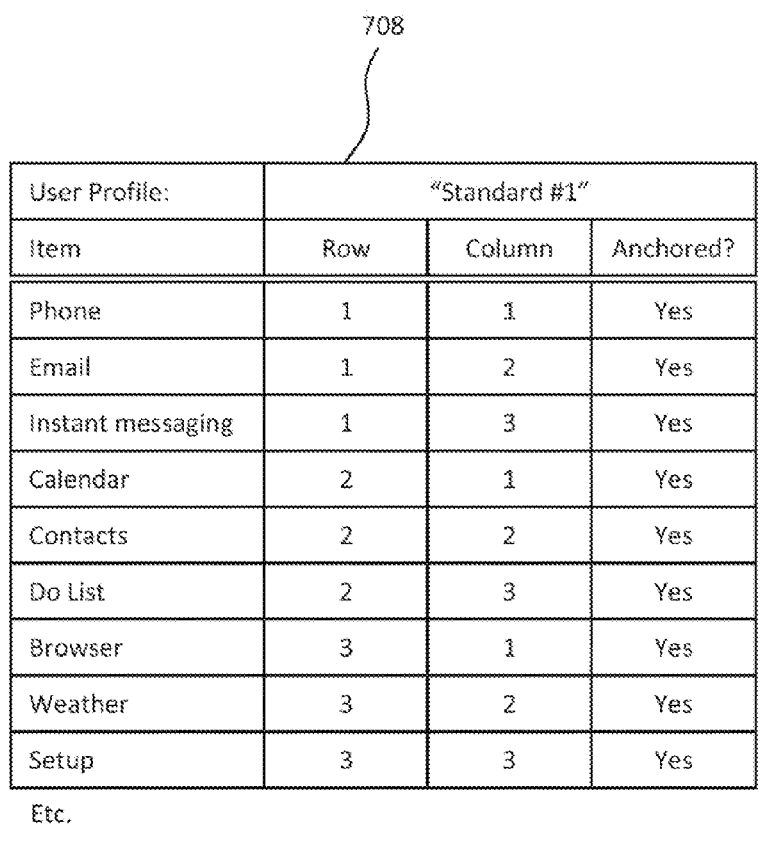
Figure 7H:
Figure 7I:
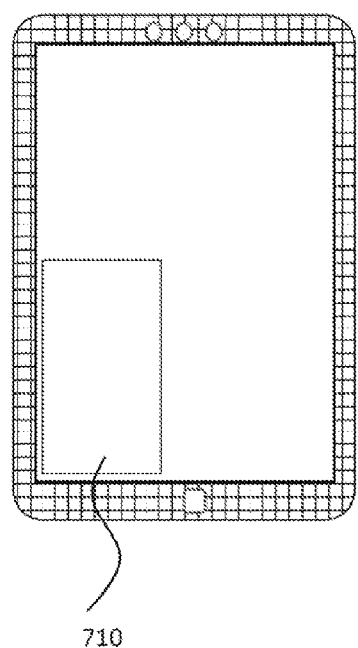

The next level of personalization consists of what content an individual user wants within the SHUZ-DT 333, and in what order. Again, the mobile device maker can ship a specific model with a factory default set of content 708 within the SHUZ-DT 333, which the user can modify as it fits his or her needs, for example with content 709 (FIG. 7H).

Figure 7J:
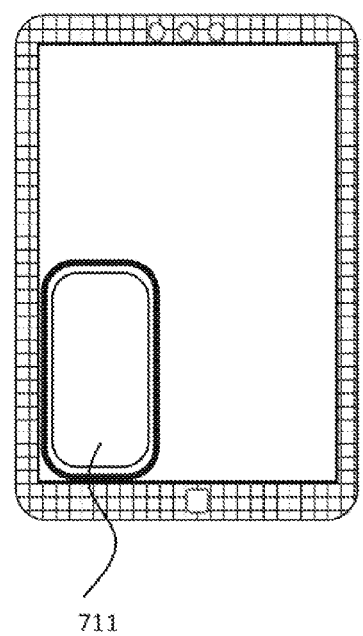

The visual appearance of the SHUZ-DT 333 can also be personalized. A device maker could ship a device with a default appearance 710 for the SHUZ-DT 333, and also provide the user the ability to modify a number of visual attributes, such as background color, gradient, border line style, line thickness, corner style (rounded or sharp), etc. as indicated at 711 (FIG. 7J) which the user can modify for a personalized look and feel.

Figure 7K:
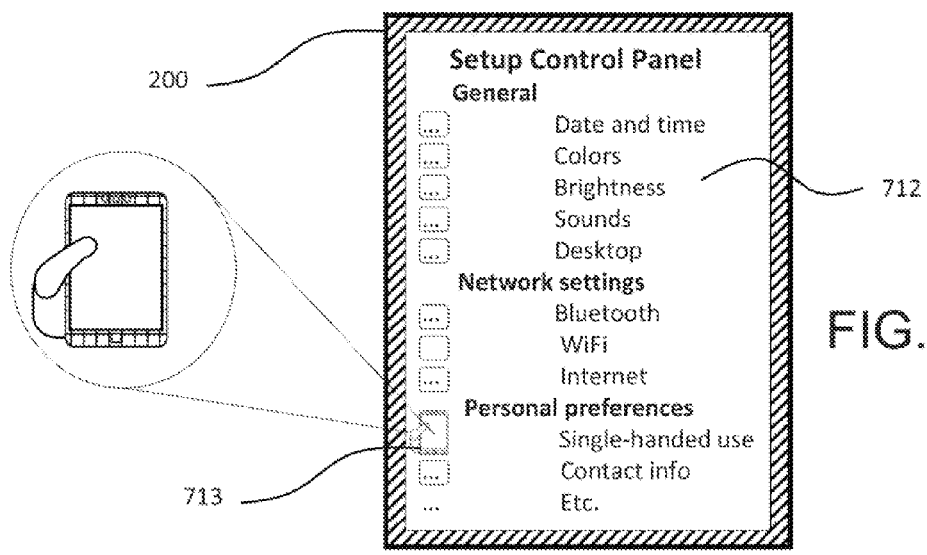
Figure 7L:
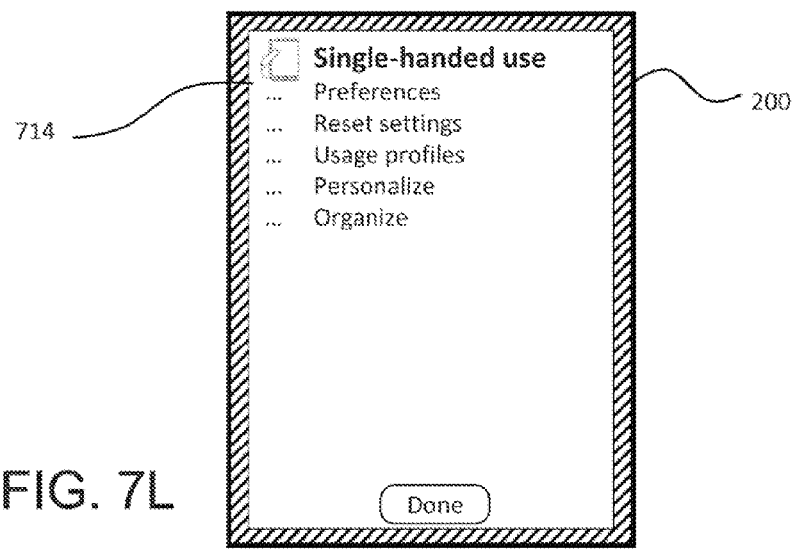

The configuration of a SHUZ 200 and SHUZ-DT 333 can be easily integrated into the same device setup method that is used by the OS to configure other functions and features on the device, such as a setup control panel 712 (FIG. 7K). Typically, this involves tapping a setup icon on the desktop which opens a control panel that provides a menu of items. Selecting one of the menu items then leads another screen that is specific to that item (e.g., WiFi settings). Configuration of SHUZ could easily be made an additional selection item in such a setup, such as a single-handed item 713 as best seen in FIG. 7K. Tapping the SHUZ 200 set up would lead to a SHUZ-specific page in which specific SHUZ-related options, indicated generally at 714 (FIG. 7L) would be provided for user selection.

Figure 7M:
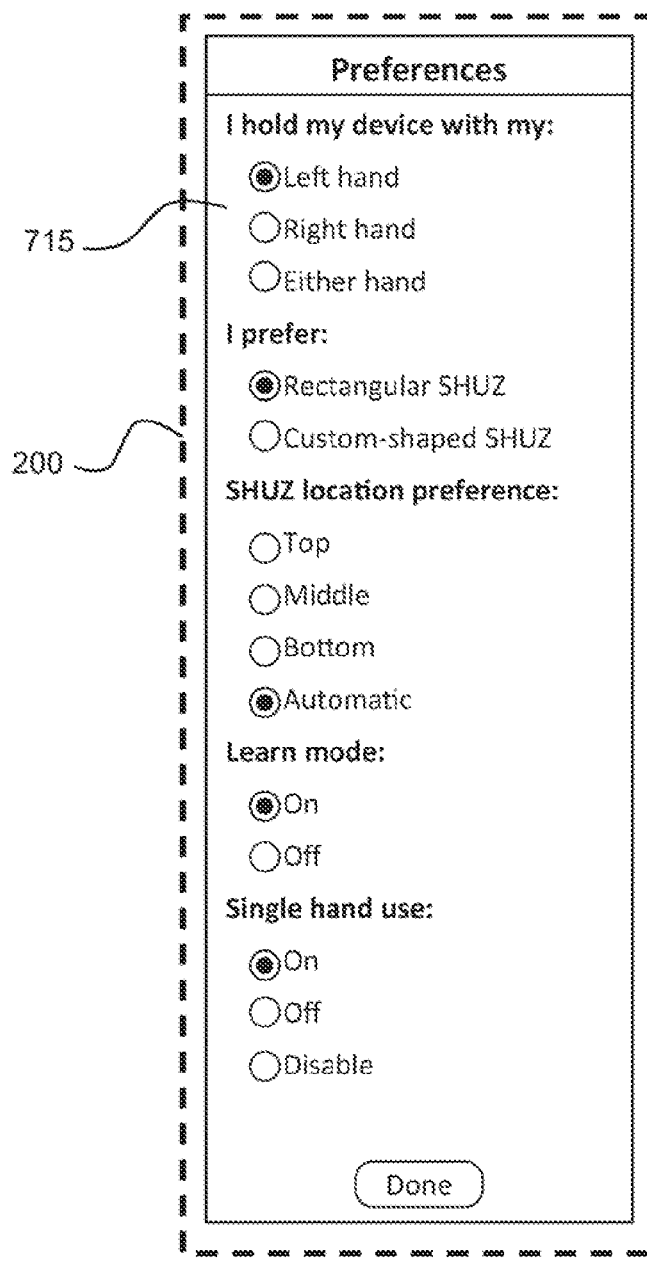

Some of a user's high-level preferences could be easily captured with a "Preferences" menu 715 as best seen in FIG. 7M and can be used to more intelligently automate aspects of single-handed usage to best serve an individual user's needs. The SHUZ-OS 931 could also offer a learn mode by which it keeps track of the content most frequently accessed within the SHUZ-DT 333 by the user, and over time, reorders icons within the SHUZ-DT 333 (except for items that are anchored by the user) to provide the most optimal usage experience.

Figure 8A:
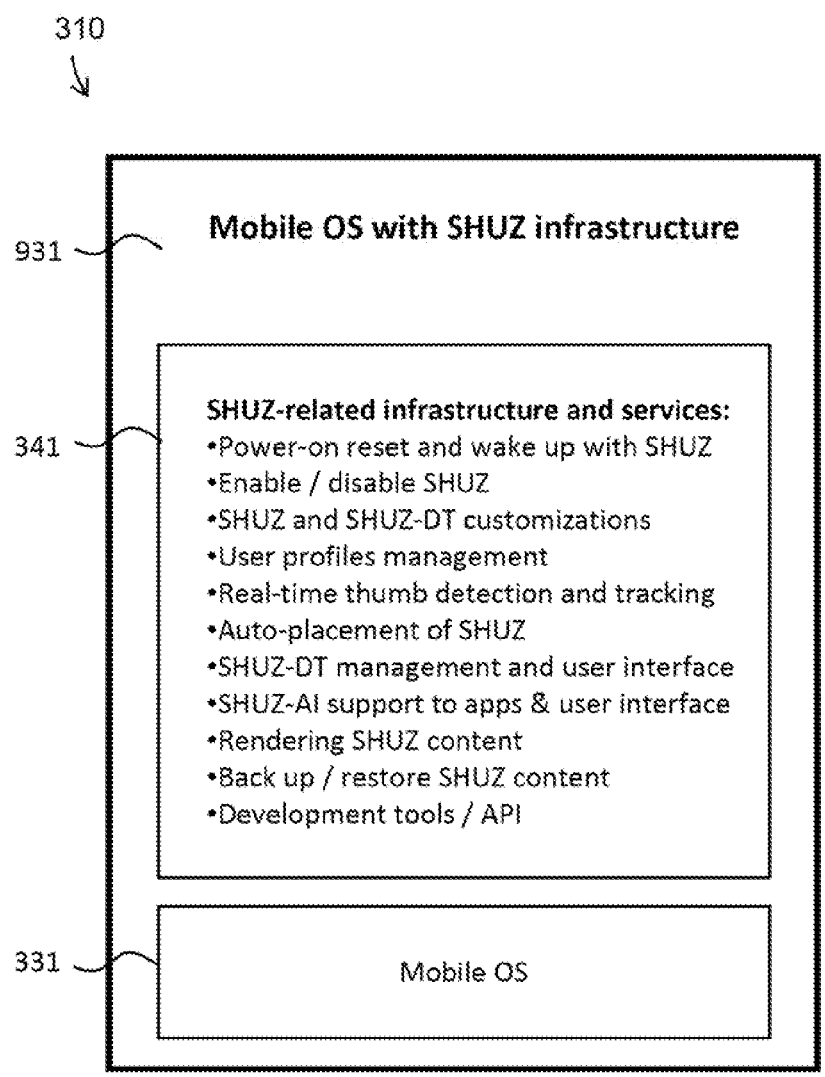
FIG. 8A is a schematic illustration of how the SHUZ enabling simulation software of the present invention may be implemented.
Figure 8B:
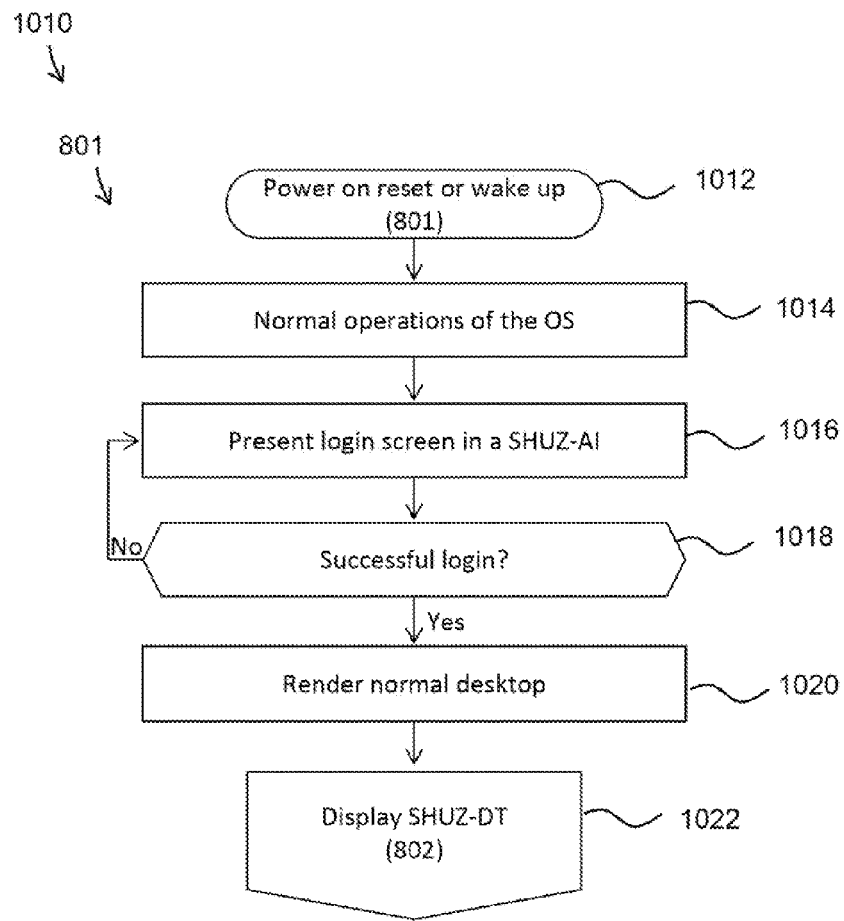
FIG. 8B-Z are high level flowcharts for various ones of the SHUZ enabling software processes which are constructed in accordance with a preferred embodiment of the present invention.
Figure 8C:
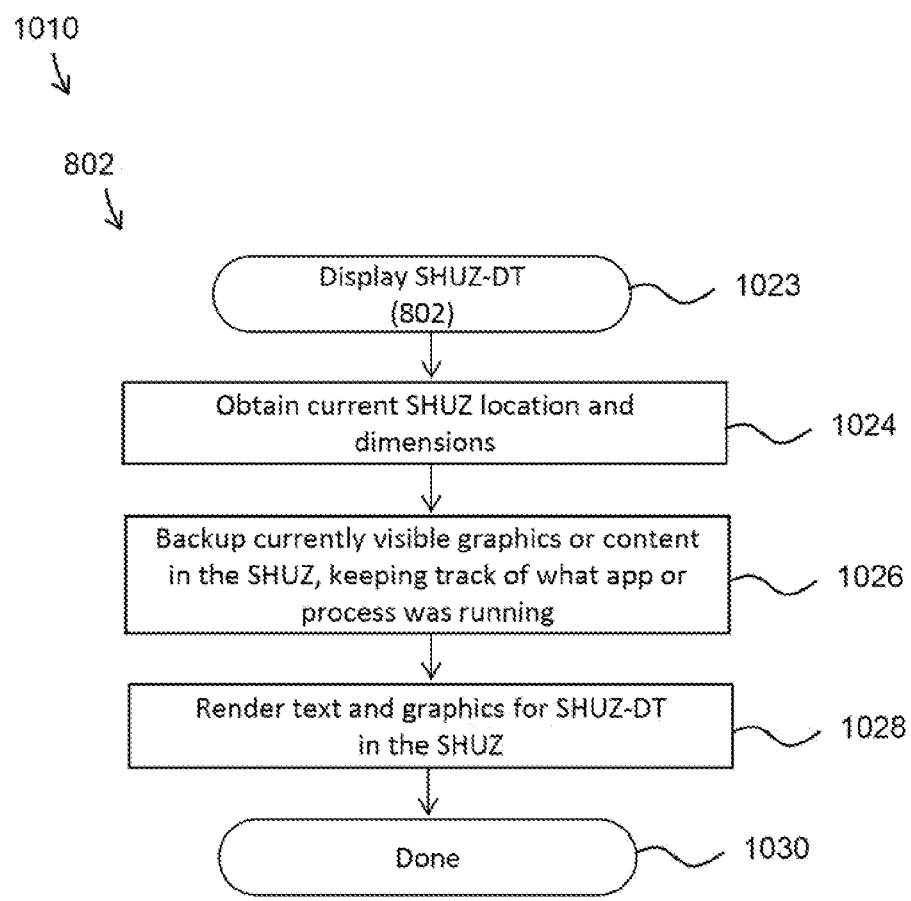
Figure 8D:
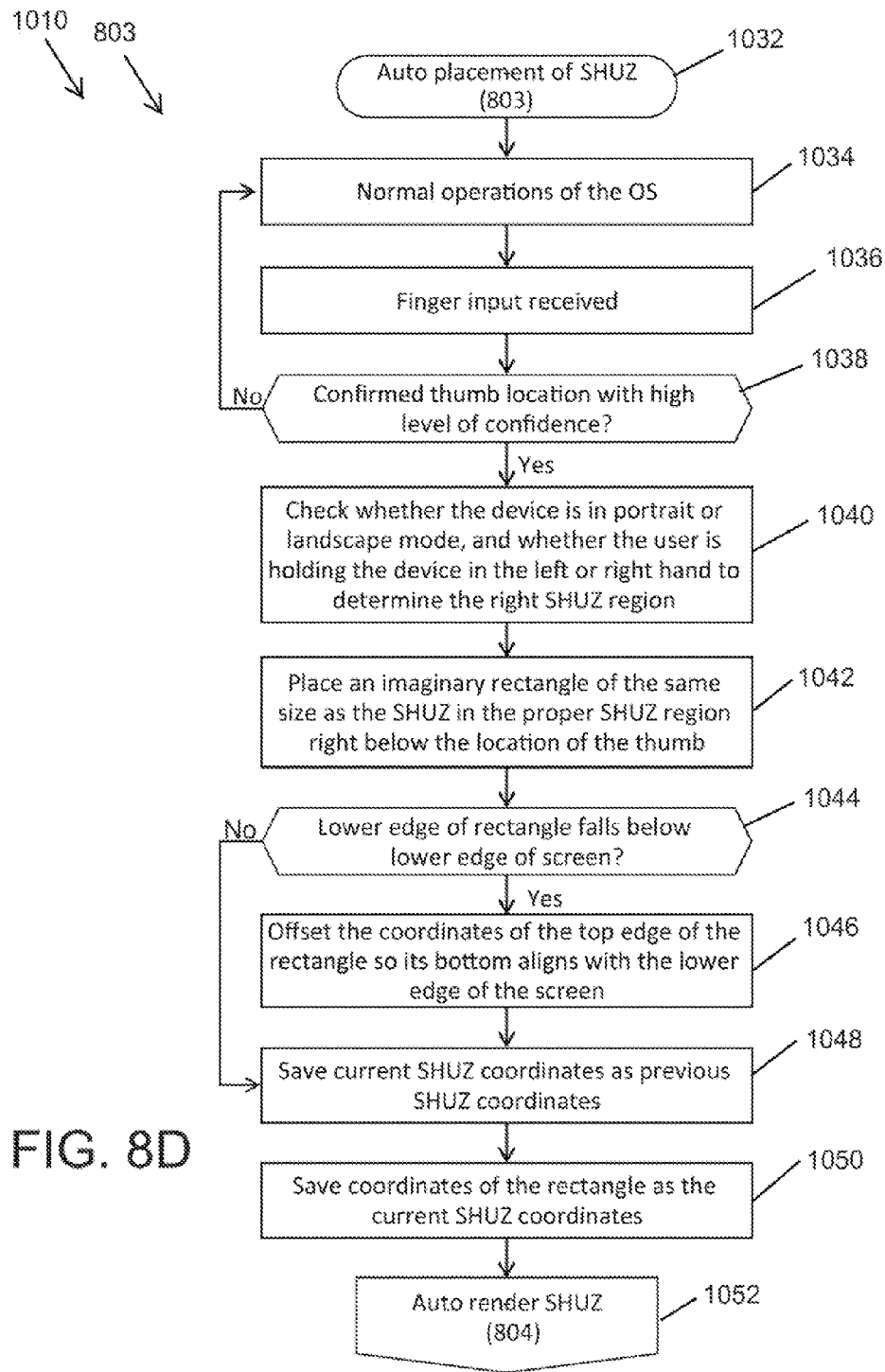
Figure 8E:
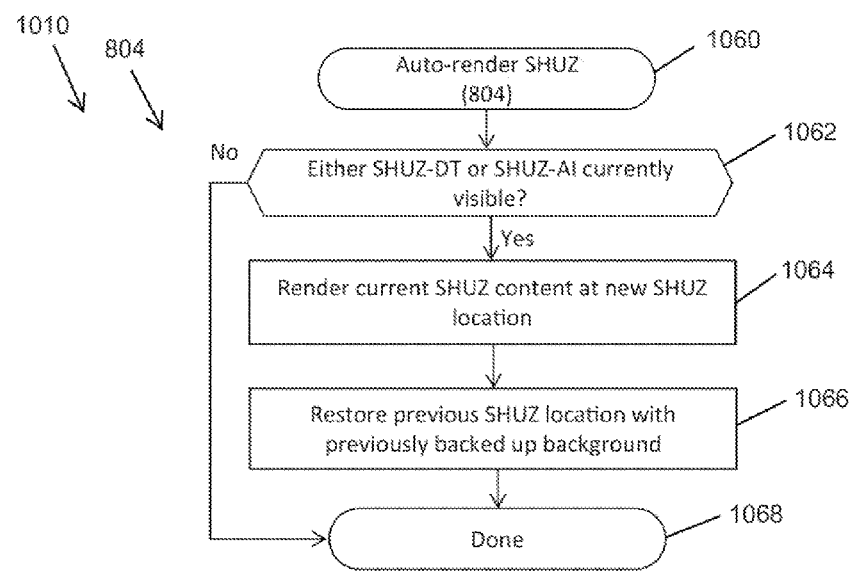
Figure 8F:
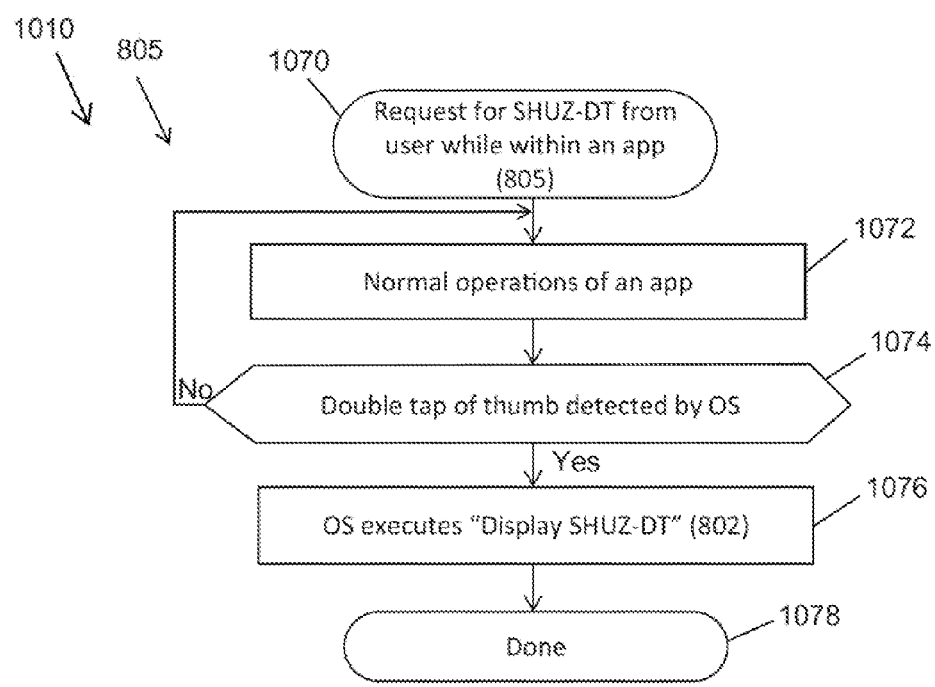
Figure 8G:
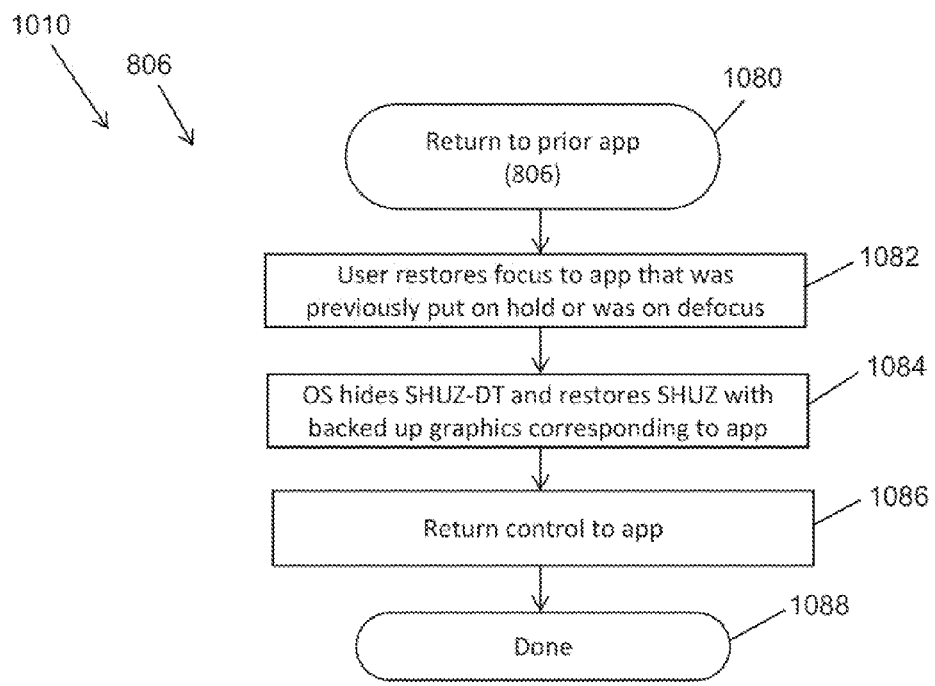
Figure 8H:
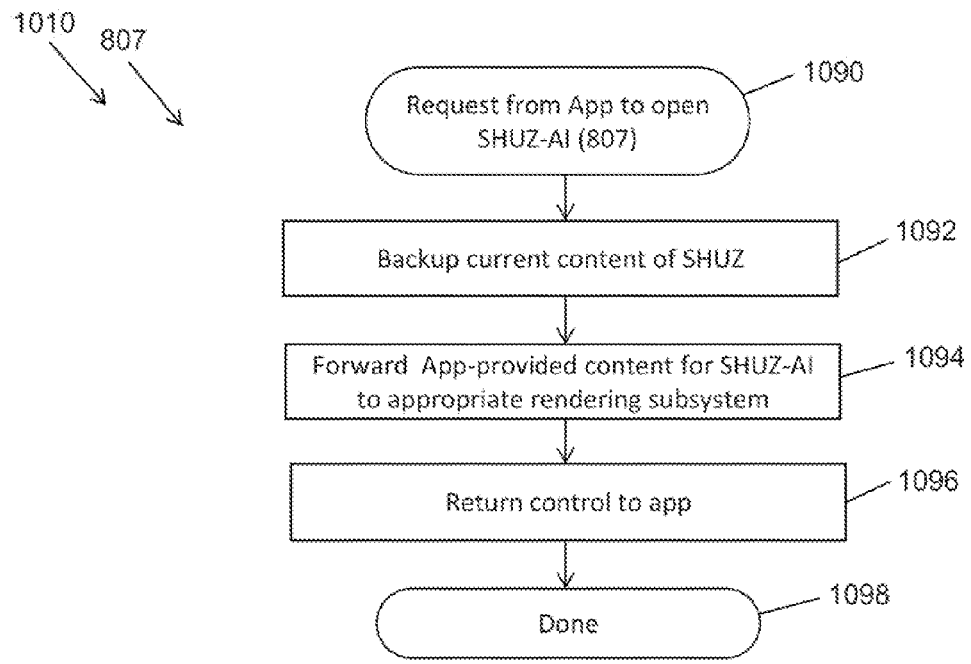
Figure 8:
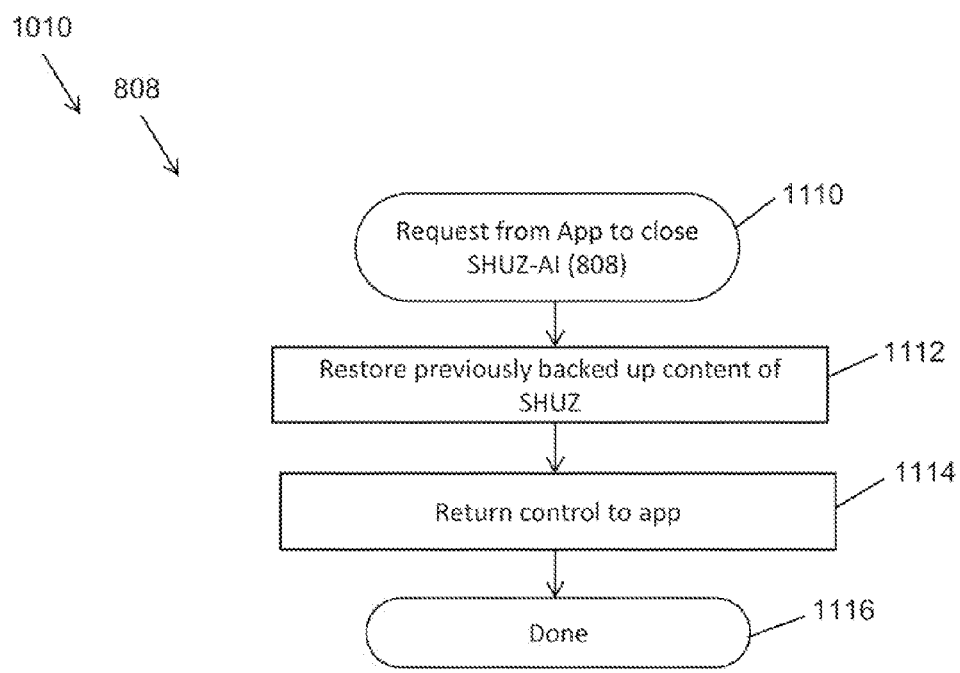

Considering now the method of enabling algorithm or method 1010 in greater detail with reference to FIG. 8, the method 1010 is illustrated in a number of flow charts are listed which describe in sufficient detail, the implementation of the various functions associated with implementing a SHUZ paradigm in a mobile device. These flowcharts are intended to explain the underlying logic of the functions at a conceptual level, and not intended to be detailed coding program steps. In this regard, reasonably experienced software engineers with typical skills in the field of developing operating systems for modern mobile devices will be able to quickly grasp the program logic from the disclosed flow charts and as a result generate robust code from them in many creative ways.

Referring now to FIGS. 8A to 8I, these specific flowcharts illustrate conceptually the essential OS service steps that would be used to SHUZ-enable apps. They would also be used by various OS utilities. More specifically, FIG. 8A shows a typical portfolio of SHUZ-related infrastructure and services 341 that can be added to a mobile operating system 331 to achieve a SHUZ-OS 931.

Before considering the implementation of the SHUZ-related OS services 341, and more particularly, the enabling and customizing method 1010 in greater detail, it should be understood by those skilled in the art that in the descriptions which follow, when a method 1010 is described as a method or as a program, that is not to imply that the method 1010 is a completely independent or distinct piece of software which operates with a mind of its own. Rather, the method 1010 becomes an integral part of the functions and features of an operating system OS 331, thereby making it a SHUZ-aware operating system SHUZ-OS 931. Those skilled in the art know that an operating system is just a collection of a large number of subroutines and programs. Depending on how an individual operating system is structured, some of the method 1010 could be implemented by modifying existing operating functions, while others will require new functions to be written. Also, when the different SHUZ-related OS services are described (for example "Display SHUZ-DT" as described immediately below) such services are being described as an integral part of the enabling program 1010 and not the operating system 331, even those a specific reference to the enabling program 1010 may not be mentioned in the detailed description.

Power on, Reset or Wake Up

Now, with reference to FIG. 8B, the SHUZ-OS 931 is initialized with a power on, reset, or wake up process 801 which begins with a start step 1012 that initiates action when power is applied to the mobile device 310, when a reset button actuation is detected or when a wake up signal is received. The program 1010 then advances to a normal operations step 1014 to facilitate the normal operations of the SHUZ-OS 931. The normal operations of the operating system 331 will not be described hereinafter in greater detail except for its interaction relative to the SHUZ-related OS services 341 as related to the enabling and customizing method 1010. In this regard, there are many different types of operating systems and each is well known to software engineers and programmers and requires no detailed explanation. That is, the coding and processes performed by such operating systems are well known to those skilled in the art and thus, do not need to be described in detail relative to this disclosure.

Continuing as best seen in FIG. 8B, from the power on start step 1012, the initiate process 801 enables the SHUZ-OS 931 to advance from the normal operations step 1014 to a login step 1016, during which the function of the SHUZ-OS 931 which is executing the login sequence presents the login user interface via a SHUZ-AI 335, and waits for the user to login in step 1018. Upon successful login, the control returns to the wake up sequence which proceeds to step 1020 in which the normal wakeup or boot up routines are completed, and the normal desktop of the device is rendered. Next, the sequence calls for the SHUZ-DT 333 to be displayed, by calling the Display SHUZ-DT 333 process 802 at step 1022 which will causes the SHUZ-DT 333 to be rendered and displayed over the normal desktop of the device.

Referring now to FIG. 8C, the display SHUZ-DT 333 process 802 proceeds from the initiate or call step 1022 (FIG. 8B) to a start step 1023 which advances immediately to an action step 1024. At action step 1024 the program 802 obtains the current default coordinates location for the SHUZ 200 and its current dimensions as displayed on the screen 320. Next, another action step 1026 is performed, which is a backup step 1026. The program 802 in this regard, causes the device 310 to backup up the currently visible graphics or content in the screen area occupied by the SHUZ 200, while at the same time keeping track of what app or process was running, if any, when the backup process was initiated.

Once the backup step 1026 has been completed, the program 802 proceeds to a rendering step 1028. The rendering step 1028 causes the text and graphics for the SHUZ-DT 333 to be rendered in the screen location area occupied by the invisible SHUZ 200. The SHUZ-DT 333 is now displayed on the screen 320 and is ready for interaction with the user. In this regard, the display of the SHUZ-DT 333 is complete and the SHUZ-OS 931 exits the display SHUZ-DT process 802 at a done or stop step 1030 to wait for the user to interact with the SHUZ-DT 333 so an auto-placement process 803 as best seen in FIG. 8D can be performed.

Auto-Placement of SHUZ

Referring now to FIG. 8D, the auto placement of SHUZ process 803 will now be described in greater detail. The auto-placement process 803 begins at a start step 1032 and proceeds to a normal operations step 1034, where the SHUZ-OS 931 is waiting for user interaction. User interaction occurs at step 1036, where the SHUZ-OS 931 detects via the touch screen 320, that a finger or thumb input from the user has been received. From the detect step 1036, the process 803 proceeds to a determination step 1038, where a determination is made whether the detected thumb location was confirmed with a high level of confidence. If not, the SHUZ-OS 931 ignores this input and returns to its normal operation at step 1034. However, if the finger input location is confirmed with a high level of confidence at step 1038, the SHUZ-OS 931 advances to a check step 1040. At step 1040, the process 803 checks whether the mobile device, such as a mobile device 310, is being held in a portrait or a landscape mode and whether the user is holding the device 310 in his or her left hand or right hand to facilitate determining the correct SHUZ 200 placement on the touch screen 320 with respect to which hand the user is holding the device 310 and in which operating mode— portrait mode 312 or landscape mode 313.

Next, the auto placement process 803 advances to an action step 1042 where an imaginary rectangle is placed in an area immediately adjacent the thumb location of the user, where the imaginary rectangle corresponds to the size of the SHUZ 200 in the proper SHUZ region (under the thumb of the user). The process 803 then proceeds to a decision or determination step 1044 to detect whether the lower edge of the imaginary rectangle falls below the lower edge of the touch screen 320. If so, the program advances to an action step 1046 and if not, the program advances to another action step 1048 that will be described hereinafter.

If the lower edge of the imaginary rectangle falls below the lower edge of the touch screen which would result in the SHUZ 200 being off screen, the process 803 executes an offset step 1046. More specifically, the program 803 offsets the coordinates of the top edge of the rectangle so its bottom edge aligns with the lower edge of the touch screen 320 to facilitate placement of the SHUZ 200 into a visible area of the touch screen 320. The program 803 then proceeds to a save step 1048 where the current coordinates for the SHUZ 200 are saved as previous SHUZ 200 coordinates.

From the save step 1048, the process 803 advances to another save step 1050 where the coordinates of the imaginary rectangle are saved as the current SHUZ 200 coordinates. Once the coordinates of the imaginary rectangle are saved and the coordinates of the SHUZ 200 are known, the system 800 advances to a call step 1052 which will cause an auto rendering SHUZ 200 process 804 to be executed. The auto render SHUZ process 804 will be described hereinafter in greater detail with reference to FIG. 8E.

Auto Render SHUZ

Considering now the auto rendering SHUZ 200 process 804 with reference to FIG. 8E, the process 804 is initiated at a start step 1060 in response to the call step 1052. From the start step 1060, the auto render SHUZ process 804 advances to a decision step 1062 to determine whether either a SHUZ-DT 333 or a SHUZ-AI 335 is visible on the touch screen 320. If neither the SHUZ-DT 333 nor a SHUZ-AI 335 is visible, the process 804 proceeds to an exit step 1068. However, if either the SHUZ-DT 333 or a SHUZ-AI 335 is visible on the touch screen 320, the process 804 proceeds to a rendering step 1064 to render the current SHUZ content at a new SHUZ location. After this rendering, the process 804 goes to a restore step 1066, which restores the previous SHUZ location with the previously backed up data and then immediately exits the process 804 at the completed step 1068.

Request for SHUZ-DT from User

Referring now to the drawings and more particularly to FIG. 8F there is shown a high level flowchart depicting a user request process 805 for a SHUZ-DT 333 while the user is currently operating within a particular app on the 310. The request process 805 begins at a start step 1070 advancing to a verify step 1072 confirming that the user is currently operating with an app with the SHUZ-AI 335 being displayed on the touch screen 320. The process 805 waits for an interaction from the user in this regard, such as a double tap of the thumb of the user at a detection step 1074. If no interaction is detected, the request process 805 continues to the normal operation of an app step 1072 and proceeds as described previously. If an interaction, such as a double tap of the thumb of the user is detected however, the process 805 advances to an execute step 1076, where the SHUZ-OS 931 causes the SHUZ-DT 333 process 802 as described previously to be executed as best seen in FIGS. 8B-C. The process 805 then exits at a done step 1078.

Return to Prior App

Referring now to the drawings and more particularly to FIG. 8G there is shown a high level flowchart depicting a user request to return to a prior app process 806. The return process begins with a start step 1080 and advances to an action or restore step 1082, where the user restores focus to an app that was previously put on hold or was on defocus. When this action is detected the program 806 advances to a switch step 1084 where the SHUZ-OS 931 hides the SHUZ-DT 333 and restores the SHUZ with the backed up graphics and text corresponding to the app. The process 806 in this regard, returns control to the app at step 1086 causing the SHUZ-AI 335 to be displayed in the SHUZ 200 area. The process 806 exists at a done or end step 1088.

Request to Open SHUZ-AI from App

Referring now to the drawings and more particularly to FIG. 8H there is shown a high level flowchart depicting an open SHUZ-AI 335 process 807. The request in this case is initiated from an app and begins at a start step 1090. From step 1090 the open process 907 advances to a backup step 1092, where the content of the current SHUZ 200 is backed up. This content could be the content of the SHUZ-DT 333 or another SHUZ-AI from the user interacting with a different app. After the content of the SHUZ 200 is backed up at backup step 1092, process 807 goes to a forward step 1094, where the process 807 forwards app-provided content for the SHUZ-AI 335 to the appropriate rendering subsystem within the SHUZ-OS 931. Once this forwarding step 1094 is completed, the process 807 proceeds to a return control step 1096. At the return control step 1096, the control of the device 310 is restored to the app. After the return control step 1096 has been executed, the request process 807 is terminated at an end or done step 1098 where the SHUZ-OS 931 now waits for interaction from the user.

An App Request to Close the SHUZ-AI

Referring now to the drawings and more particularly to FIG. 8 I, there is shown a high level flowchart depicting a close SHUZ-AI 335 process 808. The close SHUZ-AI 335 request process 808 begins at a start step 1110 and advances to a restore step 1112. At the restore step 1112, the process 807 restores the previously backed up content of the SHUZ 200. Next the process 807, at a return step 1114, returns control to the app. The process 807 exits at a done step 1116.

Personalization of the SHUZ

Considering now a personalization process 820 for the personalization of the SHUZ 200, FIGS. 8J-N show conceptually the OS functions needed to allow a user to personalize a SHUZ 200 on a mobile device, such as the mobile device 310. These utilities can be made available to the user as part of a SHUZ setup process.

Figure 8J:
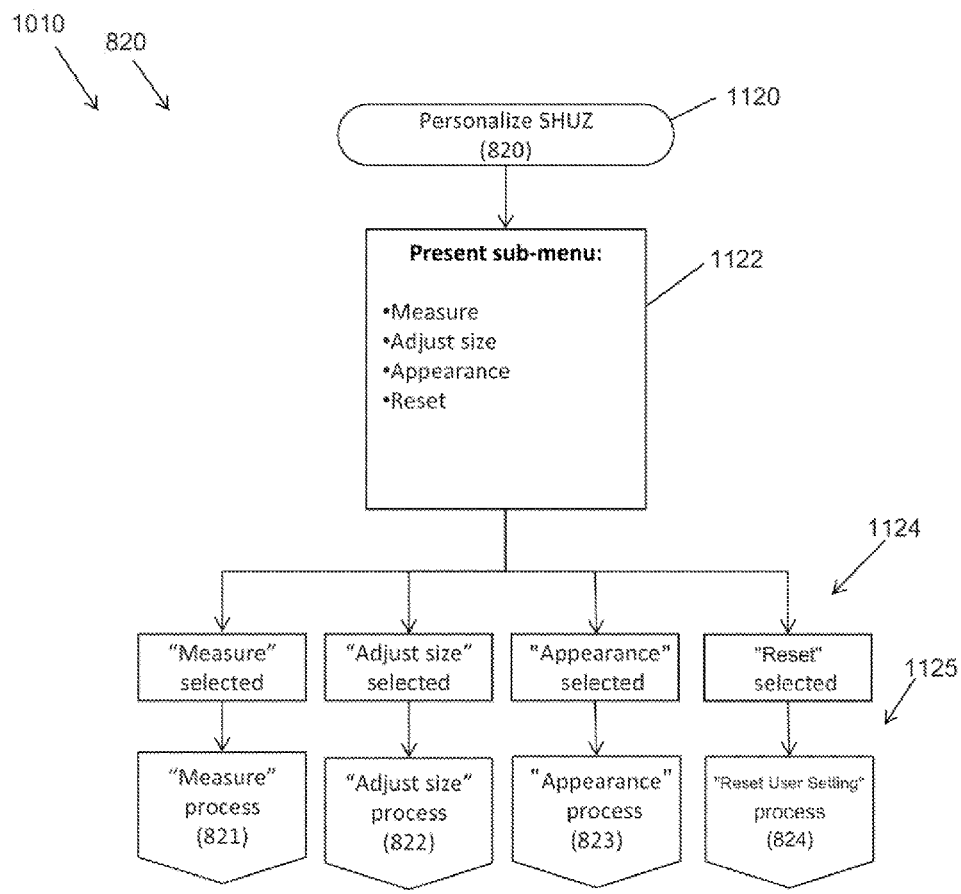

Referring now to FIG. 8J, the personalization process 820 is initiated at a start step 1120 and proceeds to a present sub-menu step 1122, where a selection is presented to the user that includes: (1) measure; (2) adjust size; (3) appearance; and (4) reset. The user by tapping his thumb on one of the selections presented in the sub-menu step 1122 advances the process 820 to one of the selected processes indicated generally at step 1124, which in turn, causes the selected process to be activated by initiating an appropriate call step. Each of these processes, (1) a measure process 821, (2) an adjust size process 822, (3) an appearance process 823; and a reset user settings process 824 will now be described in greater detail.

The Measure Process

Figure 8K:
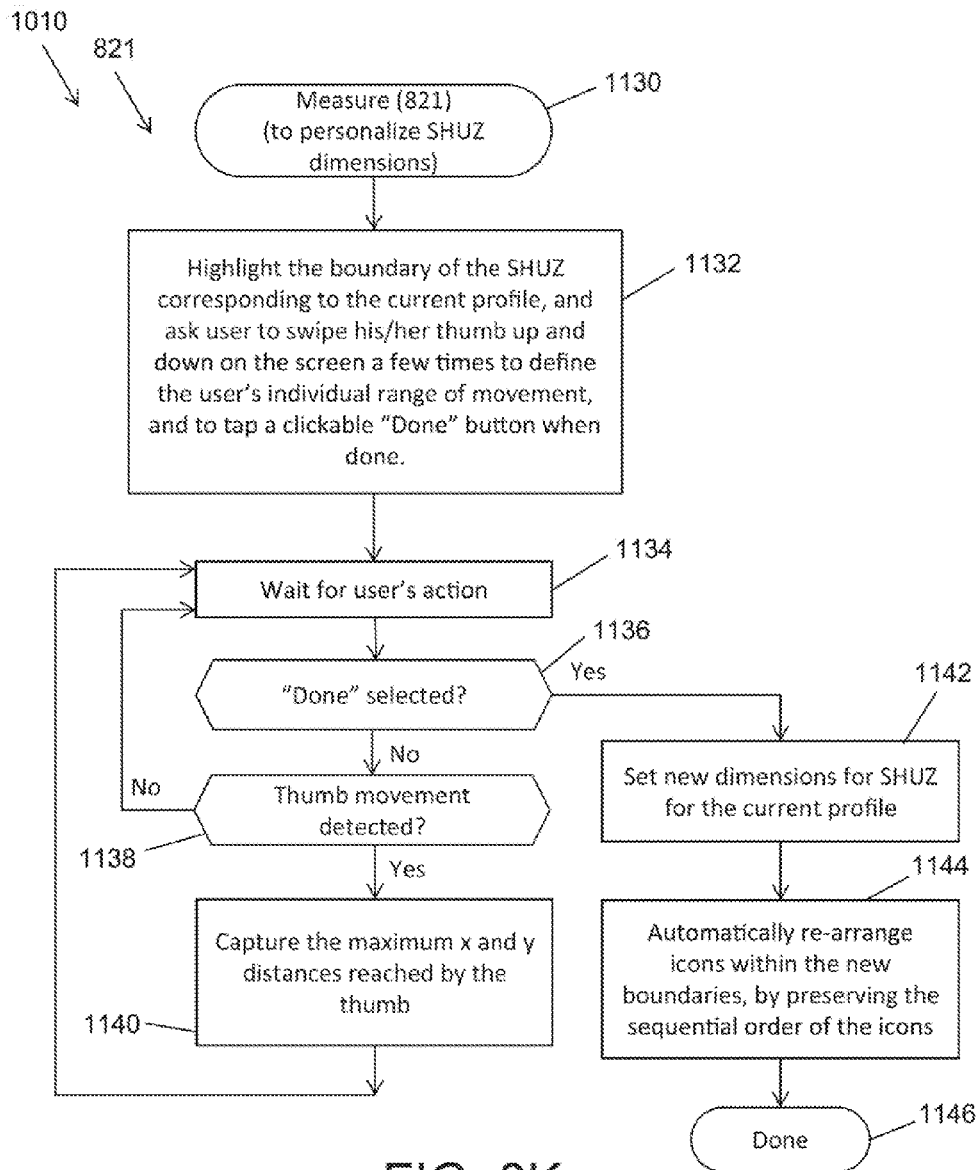

Considering now the measure process 821 in greater detail with reference to FIG. 8K, the measure process 821 begins at a start step 1130 and proceeds to a highlight step 1132. At the highlight step 1132, the process 821 highlights the boundary of the SHUZ 200 corresponding to the current profile of the user and asks the user to swipe his or her thumb up and down on the touch screen 320 a few time to define the range of movement for this user and to tap a clickable "Done" button when this process has been completed. The process 821 than advances to a wait step 1134, where the process 821 waits for the user to provide the done indication. In this regard, the process 821 goes to a decision step 1136 to determine if "done" has been selected. If not, the process 821 advances to a decision step 1138 to determine if a thumb movement has been detected. If not, the process returns to the wait step 1134 and proceeds as previously described. I If at the decision step 1138 a determination is made that a thumb movement has been detected, the program 821 advances to an action step 1140 and captures the maximum x and y distances reached by the thumb of the user. When the capture step 1140 is completed, the process 821 returns to the wait step 1134 for the user to provide an indication that he or she is "done" so the program may proceed as previously described.

If "done" was selected at decision step 1136, the process 821 proceeds to an action step 1142 and set new dimensions for the SHUZ 200 for the current user profile. The process 821 then goes to another action step 1144 and automatically re-arranges the icons within the new boundaries, by preserving the sequential order of the icons. After the action step 1144 is completed, the measure process 821 exits at a completed or done step 1146.

The Adjust SHUZ Dimensions Process

Figure 8L:
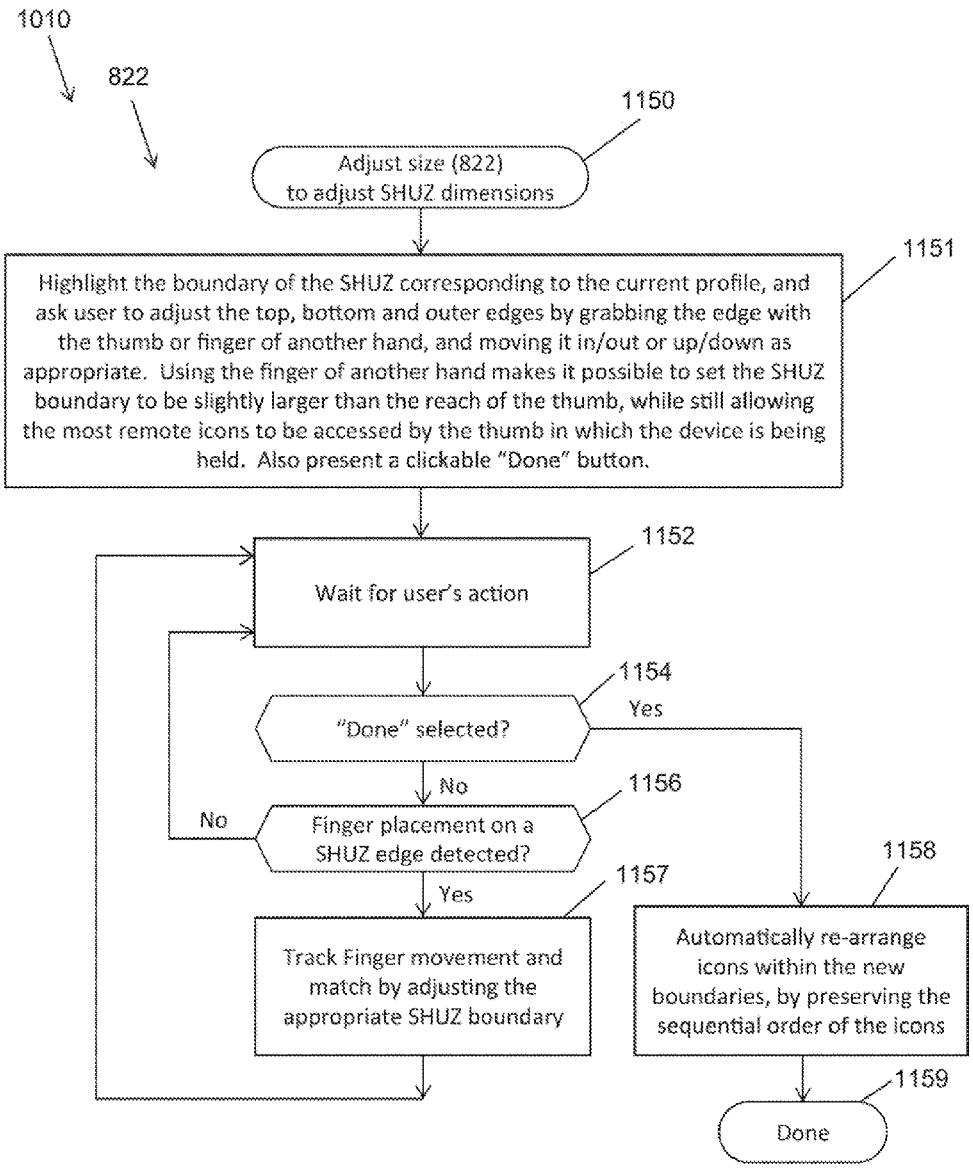

Considering now the adjust size process 822 in greater detail with reference to FIG. 8L, the adjust size process 822 begins at a start step 1150 and proceeds to a highlight step 1151 where the process 822 causes the boundary of the SHUZ 200 corresponding to the current profile to be highlighted and asks the user to adjust the top, bottom, and outer edges by grabbing a selected edge with the thumb or finger of the other hand of the user and to move the edge in and out or up and down as the case may be. The user using the finger of his or her other hand makes it possible to set the SHUZ 200 boundary to be slightly larger than the reach of the thumb, while still allowing the most remote icons within a SHUZ area to be accessed by the thumb in which the device is being held. The process 822 at this highlight step 1151 also presents a "done" button for activation by the user when he or she has completed the edge moving process.

Next, the process 822 advances to a wait step 1152 to wait for user action. In this regard, the process 822 proceeds to a "done" selected decision step to determine whether the user has engaged the "done" button. If the "done" button has not been selected the process 822 goes to another determination step 1156. At the determination step 1156, the process 822 determines whether the finger placement of the user has been detected on a SHUZ 200 edge. If the finger placement has not been detected the process 822 returns to the wait step 1152 and continues as previously described. On the other hand, if the finger placement has been detected, the process advances to an action step 1154 for tracking finger movement and match by adjusting the appropriate SHUZ 200 boundary. The process 822 then returns to the wait step 1152 and proceeds as described previously.

If the "done" button was selected by the user, the process advances from the determination step 1154 to an action step 1158 which automatically re-arranges the icons within the new SHUZ boundaries, by preserving the sequential order of the icons. When this action step 1158 is completed, the process goes to an exit or done step 1159 to terminate the adjust SHUZ dimensions process 822.

Adjust SHUZ-DT Appearance

Figure 8M:
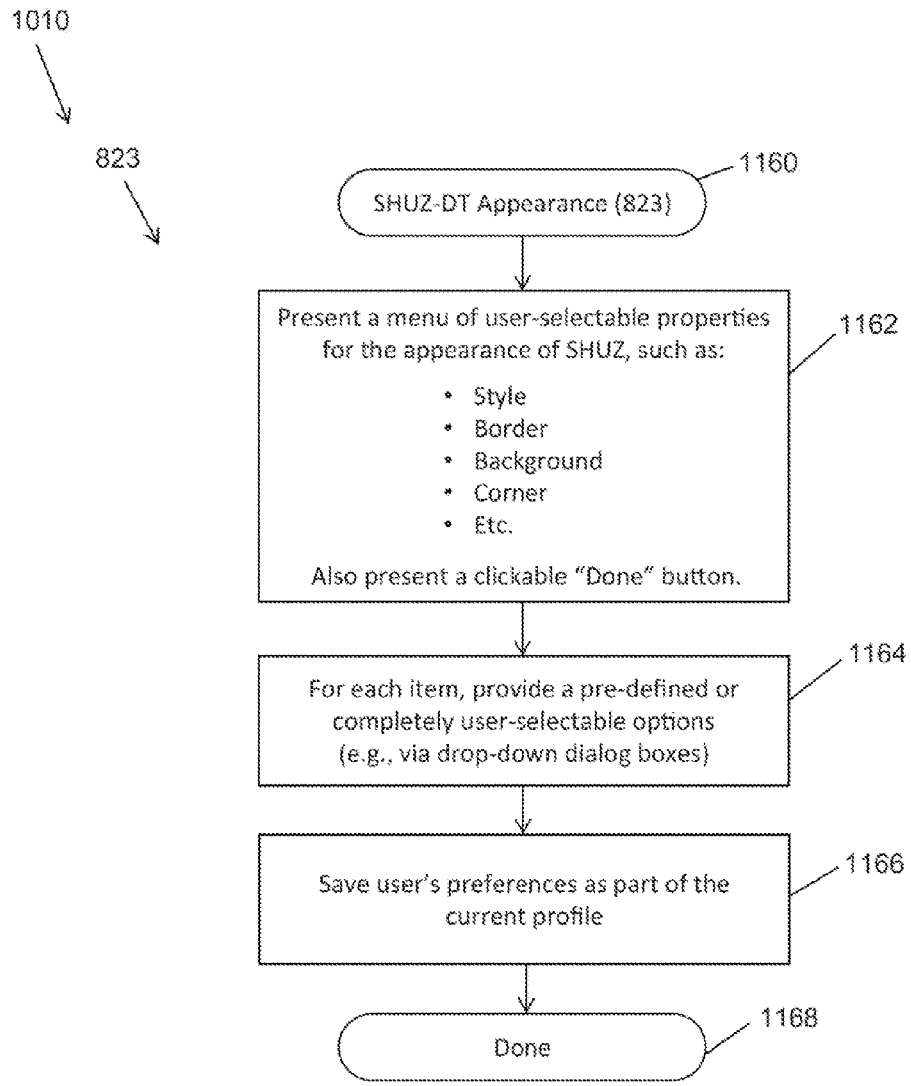

Considering now the adjust SHUZ-DT 333 appearance process 823 in greater detail with reference to FIG. 8M, the adjust appearance process 823 is initiated at a start step 1160 and proceeds to an action step 1162. At the action step 1162, the process 823 causes a menu to be present for the user to select certain properties associated with the SHUZ such as (1) the style, (2) the border type, (3) the background color, (4) the corner style, and so forth. The process 823 also generates a "done" button for user activation once the user has completed the selection process.

Next, the process advances to an action step 1164. At the action step 1164, for each item, the process 823 provides a pre-defined or completely user-selectable options via for example one or more drop-down dialog boxes. The process 823 at a save step 1166 saves the preferences selected by the user as part of the current profile for the user. After saving the preferences, the process 823 goes to an exit step 1168 where the adjust SHUZ-DT appearance process 823 is terminated.

Reset User Profile Settings

Figure 8N:
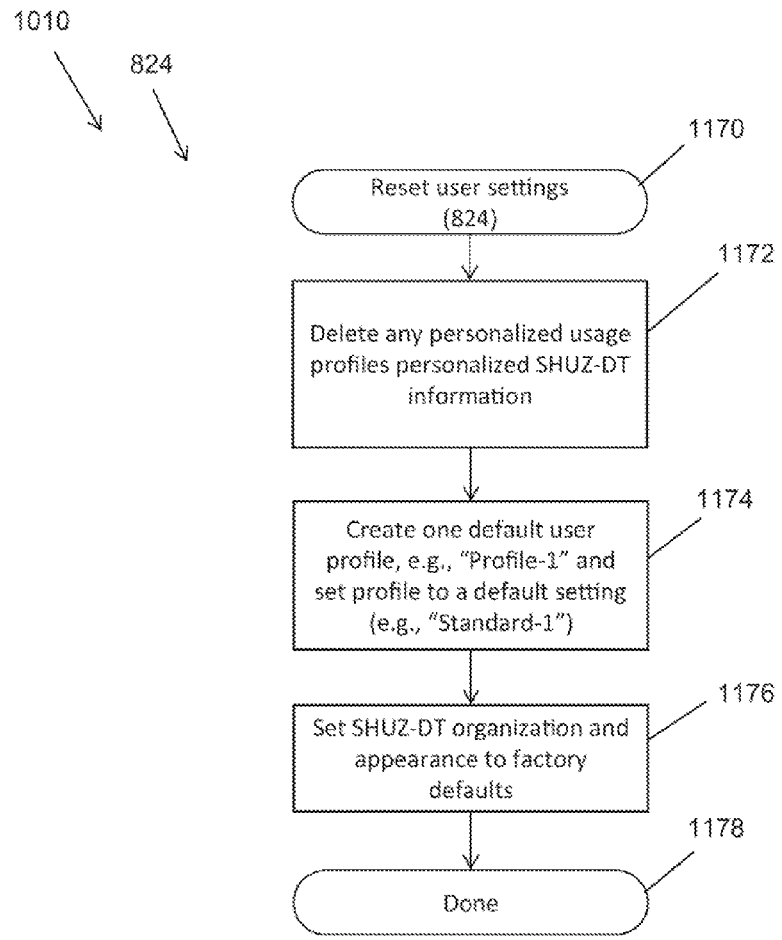
Figure 8:
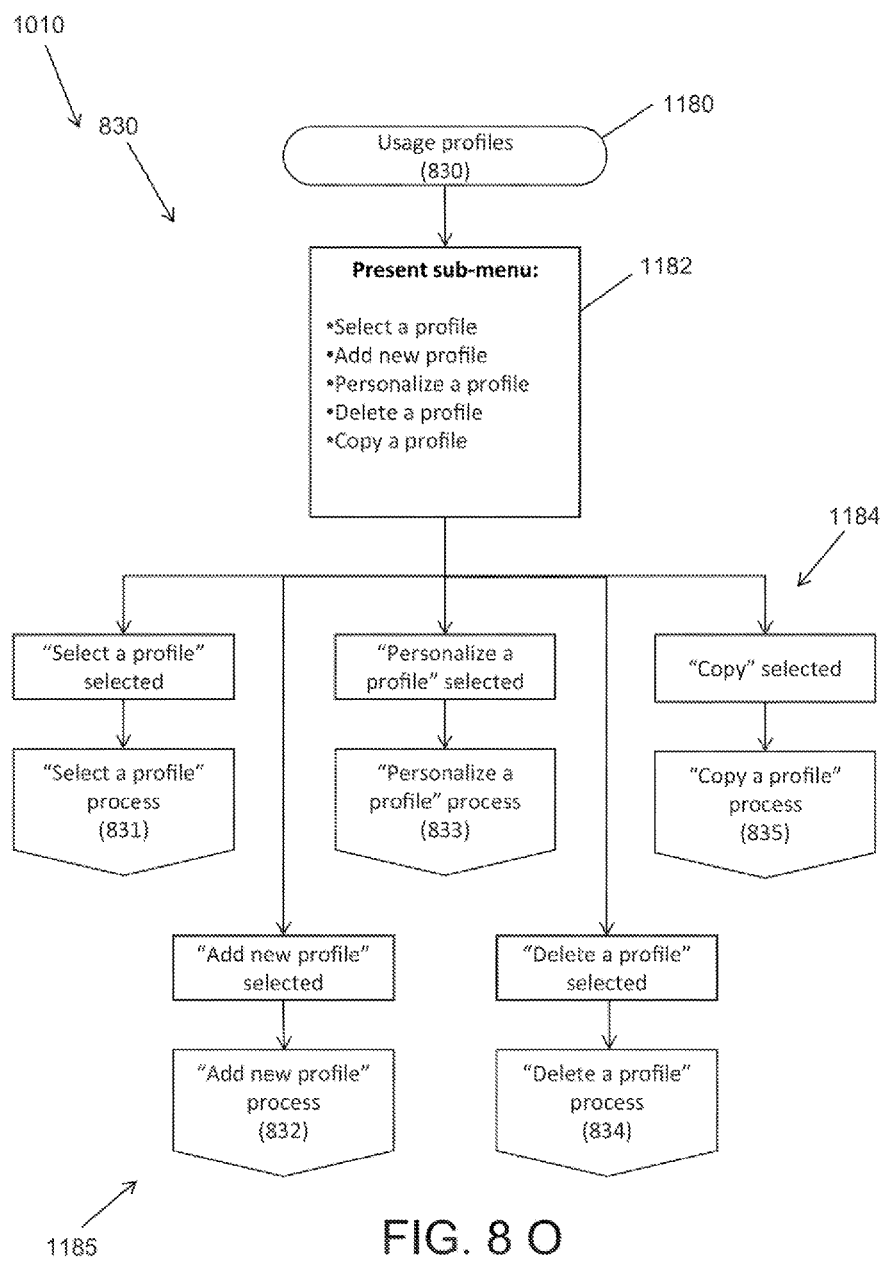

Considering now the reset user settings process 824 in greater detail with reference to FIG. 8N, the process 824 begins with a start step 1170 and proceeds to a delete step 1172. At the delete step 1172, the process 824 deletes any personalized usage profiles of personalized SHUZ-DT information. Once this information is deleted, the process 824 advances to an action step 1174. At the action step 1174, the process 824 creates one default user profile; e.g. profile "1" and sets profile to a default setting (e.g. "standard-1"). The process 824 than goes to an action step 1176 and set SHUZ-DT organization and appearance to the factory default setting established within the SHUZ-OS 931. The process 824 ends at an exit step 1178.

Usage Profiles

Considering now a user profile process 830 with reference to FIGS. 8 O-U, the user profile processes illustrated by FIGS. 8 O-U show conceptually the OS functions needed to allow a user to manage user profiles on a mobile device, such as the mobile device 310. These utilities can also be made available to the user as part of a SHUZ setup process.

Referring now to FIG. 8 O, the user profiles process 830 is initiated at a start step 1180 and proceeds to a present sub-menu step 1182, where a selection menu is presented to the user that includes: (1) select a profile; (2) add a new profile; (3) personalize a profile: (4) delete a profile; and (5) copy a profile. The user by tapping his or her thumb on one of the selections at a selection step 1184 causes the process to advance to a call step 1185 which calls the selected item or process, which in turn causes the selected process to be activated. Each of these processes, (1) a select a profile process 831, (2) a add a new profile process 832; (3) a personalize a profile process 833, (4) a delete a profile process 834; and (5) a copy profile process 835 will now be described in greater detail.

Select a User Profile

Figure 8P:
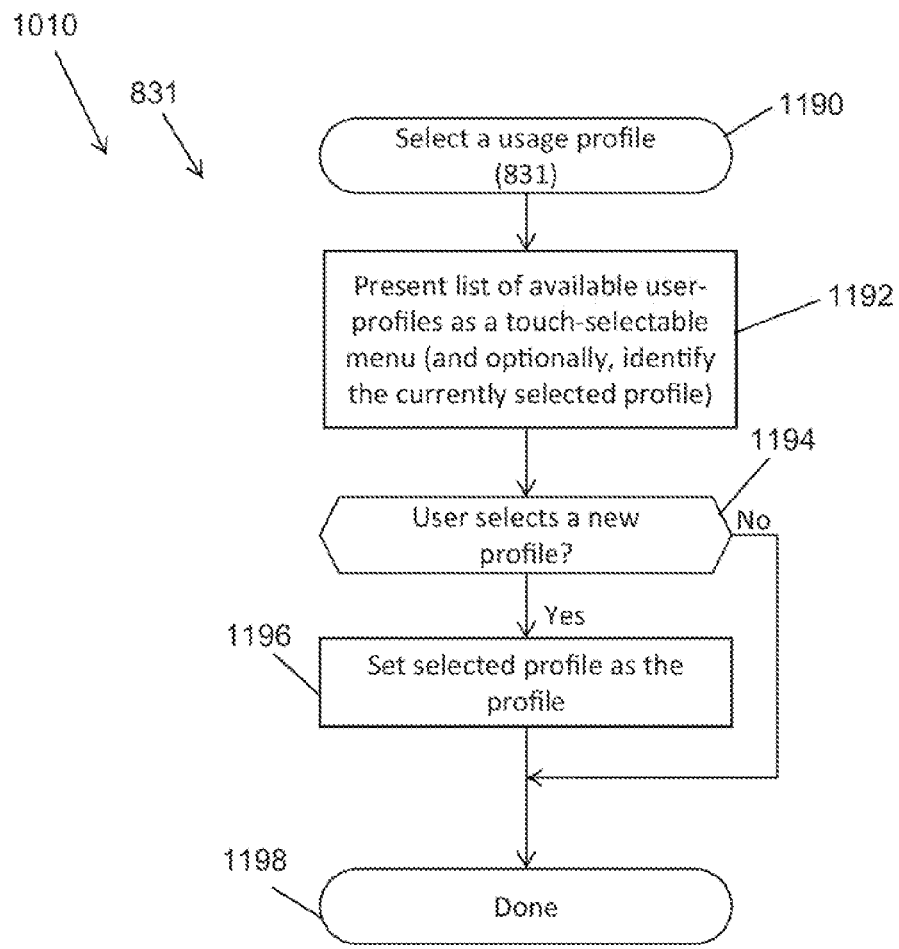

Considering now the select a user profile process 831 in greater detail with reference to FIG. 8P, the select a user profile process 831 begins at a start step 1190 and proceeds to an action step 1192 to present a list of available user-profiles as a touch-selectable menu. Optionally, the action step may identify the currently selected profile to better inform the user. Next the process 831 goes to a decision step 1194 to determine whether the user has selected a new profile or not. If the user has not selected a new profile, the program ends at a done step 1198. On the other hand, if a profile has been selected by the user from the list, the process 831 proceeds to an action step 1196 and sets the selected profile as the current user profile. The select a user profile process 831 then terminates at the done step 1198.

Add New Profile

Figure 8Q:
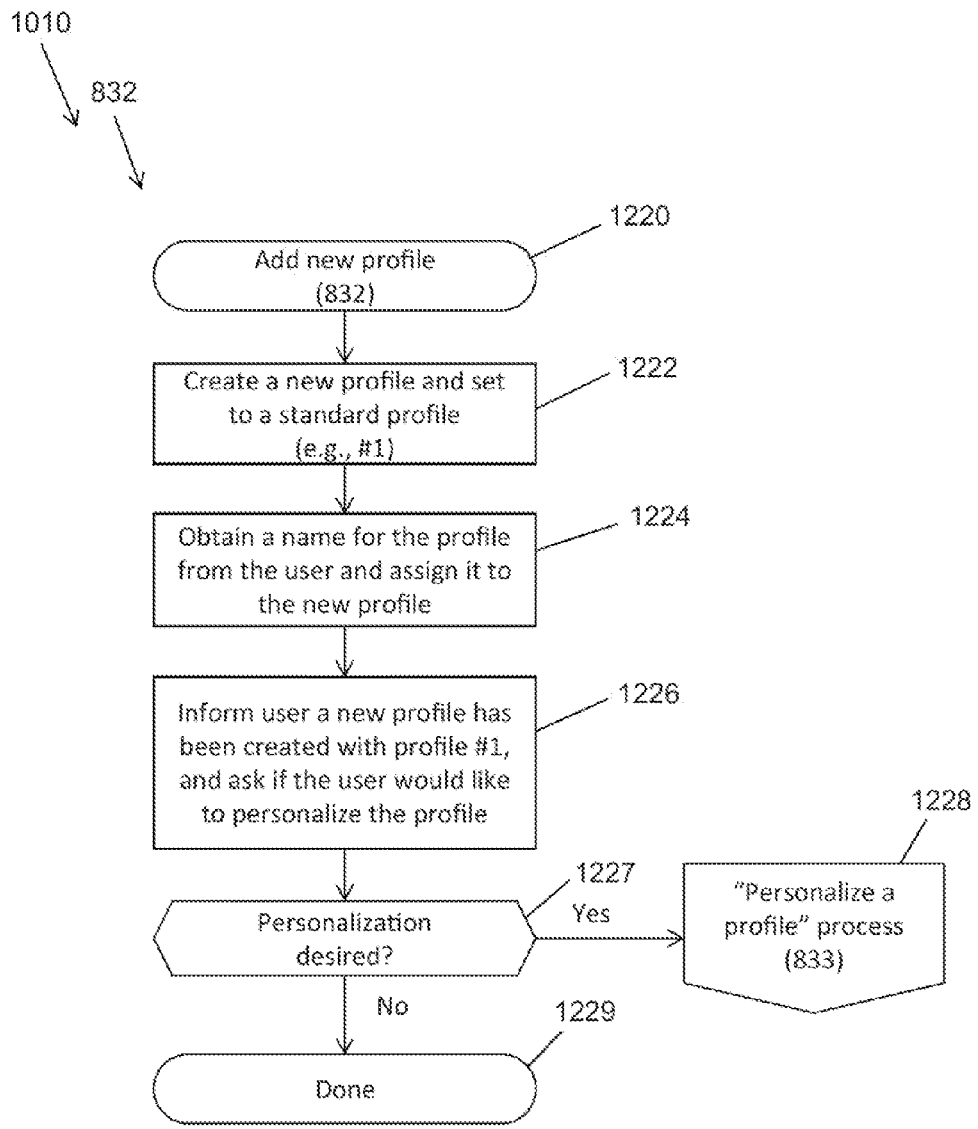

Considering now the add a new user profile process 832 in greater detail with reference to FIG. 8Q, the add a new user profile initiates at a start step 1220 and immediately goes to an action step 1222. At action step 1222, the process 832 causes a new profile to be created and set the new profile to a standard profile (e.g. #1). The add new profile process 832 then advances to an action step 1224 where the process 832 obtains a name for the profile from the user and assigns that name to the new profile.

After the new profile has been assigned a name at step 1224, the process 832 proceeds to yet another action step 1226 and informs the user that a new profile has been created with profile #1, and asks if the user would like to personalize the new profile. In this regard, the process advances to a determination step 1227 to determine whether the user responded with a positive response indicating that the user would like to personalize the new profile. If there was no positive response, the process 832 goes to a stop step 1229 which ends the new profile process 832. In the alternative, should a positive response be received, the process 832 advances to a call step 1128 which calls a "personalize a profile" process 833 that will be described hereinafter in greater detail.

Personalize a Profile

Figure 8R:
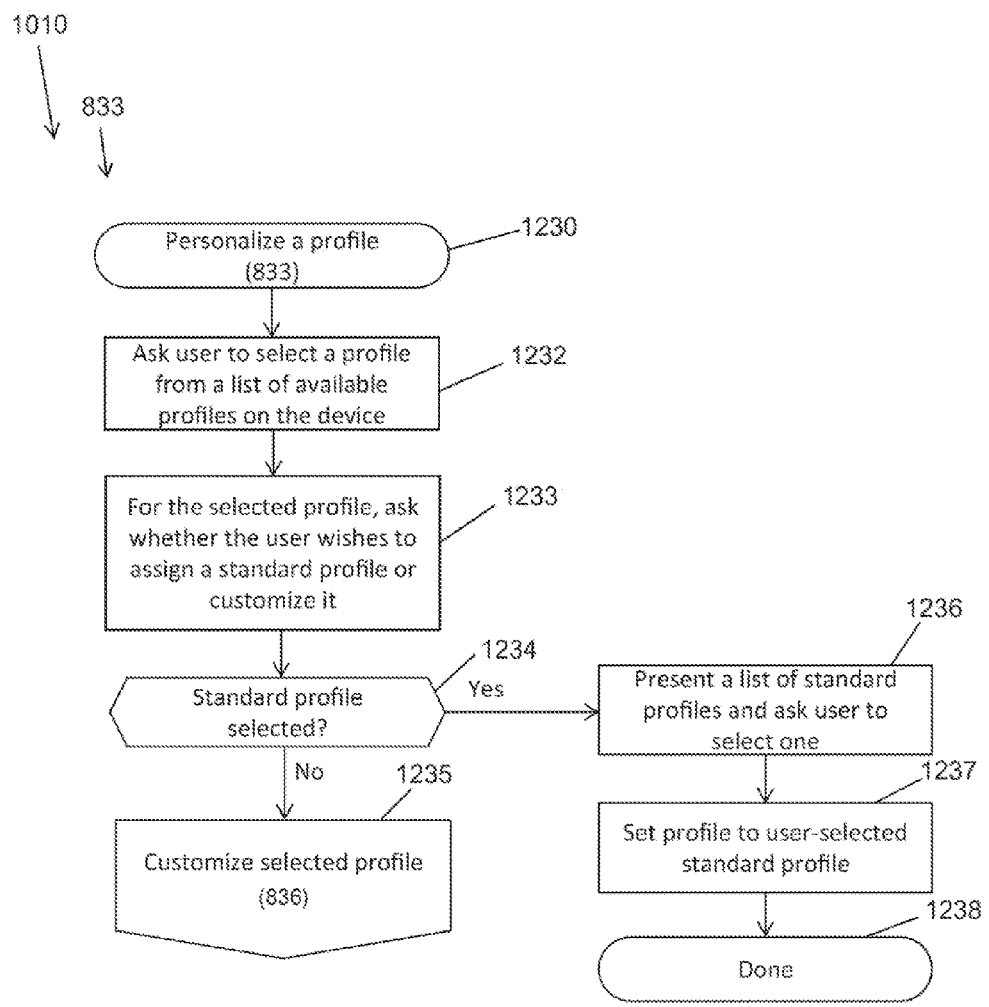

Considering now the personalize user profile process 833 in greater detail with reference to FIG. 8R, the personalize profile process 833 begins at a start step 1230 and proceeds to an action step 1232. At action step 1232, the process 833 inquires of the user and asks the user to select a profile from the list of available profiles on the mobile device 310. The user selects the desired profile and the process advances to an action step 1233 where the process 833 ask the user whether he or she wishes to assign a standard profile to the selection or prefers to customize the selected profile. The process 833 advances to a decision step 1234 where a determination is made whether the user selected the standard profile.

If the user did not select the standard profile, the process 833 deduces that the user selected the customize profile and advances to an action step 1235 which calls a "customize selected profile process 836 that will be described hereinafter in greater detail. On the other hand, if the user did select a standard profile, the program 833 from determination step 1234 goes to an action step 1236. At action step 1236 the process 833 causes a list of standard profiles to be present on the screen 320 for the user to select. Upon the user making this selection, the program proceeds to an action step 1237 where the process 833 sets the profile to the user selected standard profile. The process 833 then exits at a done step 1238.

Delete a Profile

Figure 8S:
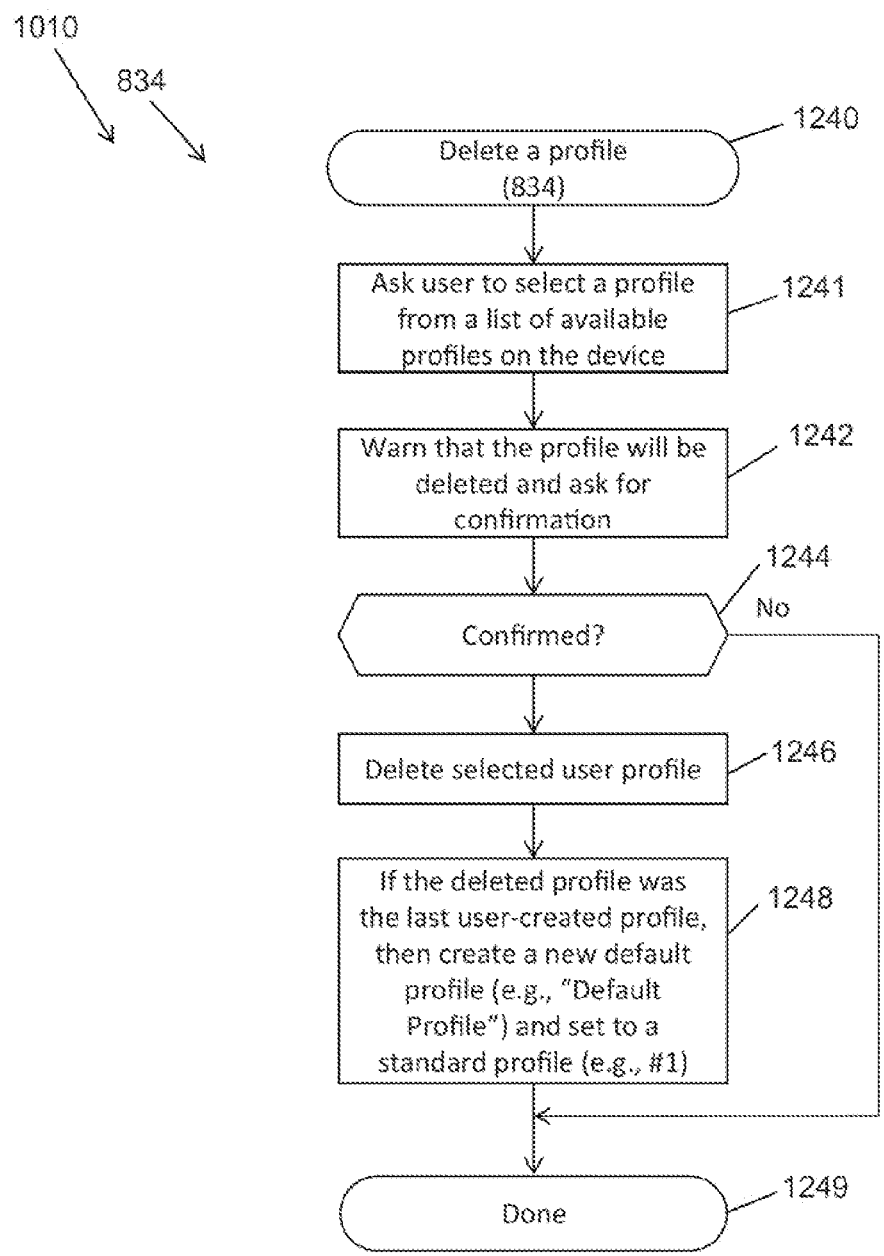

Considering now the delete a profile process 834 in greater detail with reference to FIG. 8S, the delete a profile process 834 begins at a start step 1240 and advances to an action step 1241. At the action step 1241, the process 834 asks the user to select a profile from a list of available profiles on the mobile device 310. Next at another action step 1242, the process 834 warns the user that the selected profile will be deleted and asks the user to confirm the deletion of the selected profile. The process then advances to a determination step 1244.

At the determination step 1244, the process 834 makes a determination as to whether or not the user confirmed the deletion. If the deletion was not confirmed the deletion process 834 is terminated at a done step 1249. On the other hand, if the process determines that the selected profile is to be deleted, the process 834 advances to an action step 1246 and deletes the selected user profile. After the selected profile has been deleted, the process 834 goes to an action step 1248.

At the action step 1248, the process 834 creates a new default profile (e.g. "Default Profile") if the deleted profile was the last user-created profile and sets it to a standard profile (e.g. profile #1). The process 834 then ends at the done step 1249.

Copy a Profile

Figure 8T:
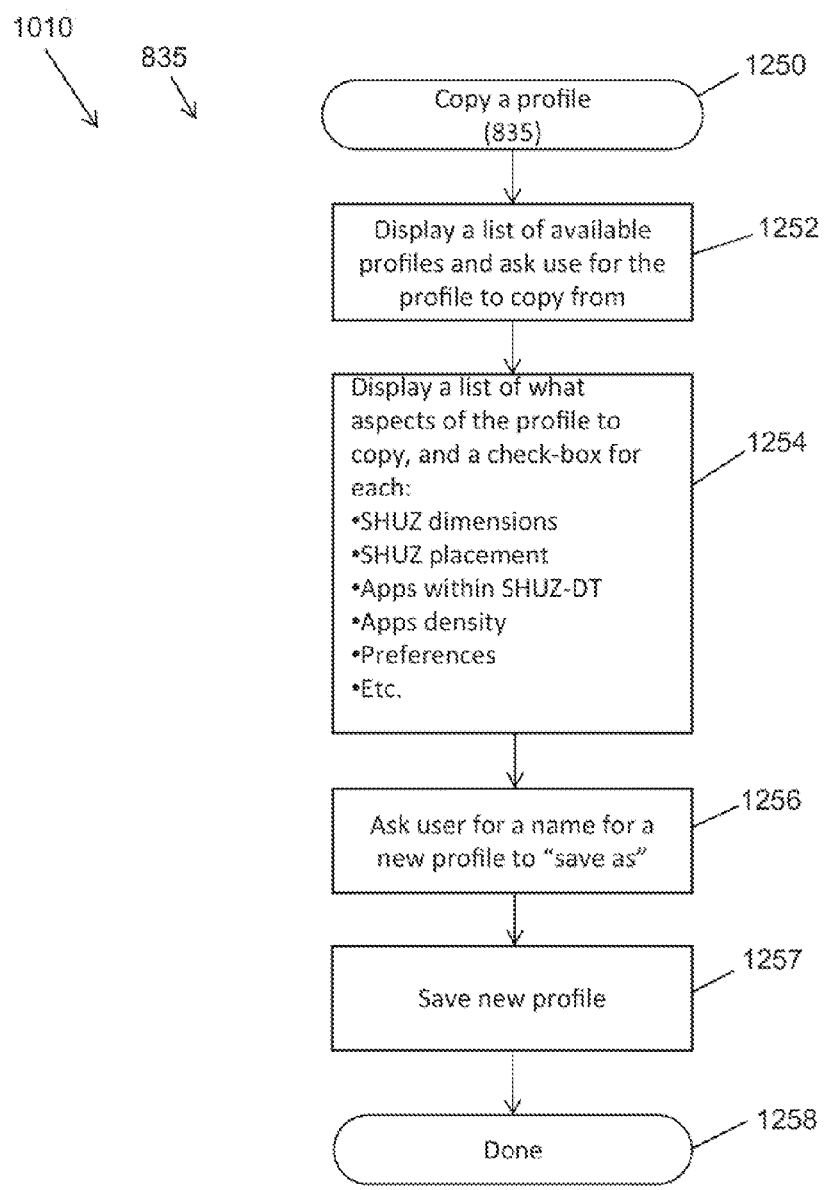

Considering now the copy a user profile process 835 in greater detail with reference to FIG. 8T, the copy a user profile process 835 begins at a start step 1150 and proceeds to an action step 1152 which results in the display of a list of available profiles and the process 835 asking the user to identify the profile that is to be copied. From step 1152, the process 835 goes to another action step 1152 which causes the display of a list of what aspects of the profile should be copied, where a check-box is provided for each. For example: the SHUZ dimensions, the SHUZ placement, Apps within the SHUZ-DT, Apps density, preferences and the like.

Next the process 835 asks, at an action step 1156, the user for a name by which to identify the copied profile, for example by making a "save as" inquiry. When the user responds the process 835 goes to the action step 1157 and save the copied profile. Once the profile has been saved, the process 835 will exit at a done step 1158.

Customize a Selected Profile

Figure 8U:
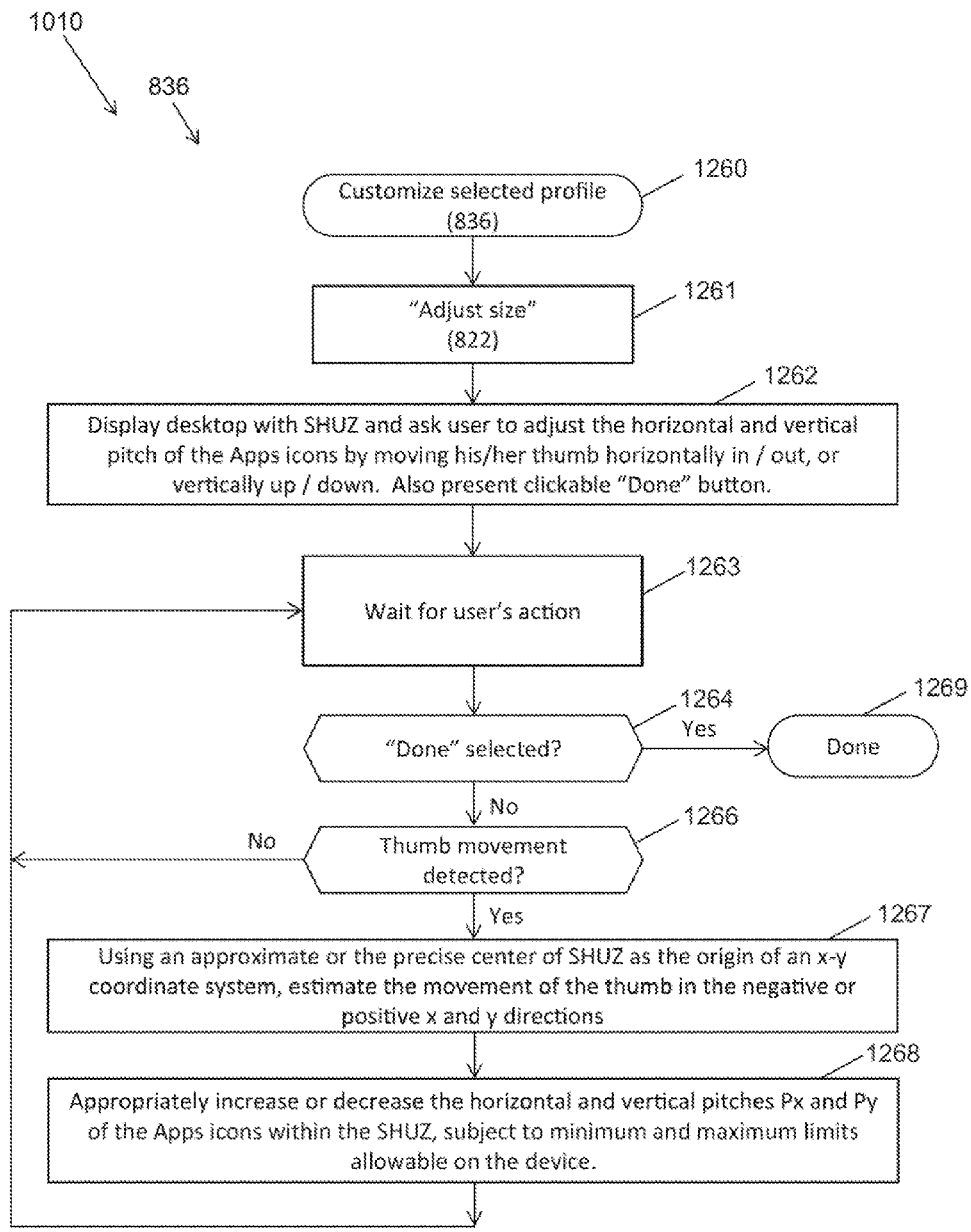

Considering now the "customize a selected profile" process 836 in greater detail with reference to FIG. 8U, the customize process 826 begins at a start step 1260 and proceeds to an action step 1261 which advances the system to the adjust size process 822 with instructions to return to an action step 1262 when the process 822 is completed. The process 836 then goes to the adjust size process 822 and proceeds as described previously. When the adjust size process 822 is completed the process returns to the action step 1262.

At action step 1262, the process 832 initiates a display action and causes the screen desktop with a SHUZ 200 and asks the user to adjust the horizontal and vertical pitch of the apps icons by moving his or her thumb horizontally in and out or vertically up and vertically down. The process 836 also causes a done button to be generated. Next the process goes to an action step 1263 to wait for user action and the selection of the done button. In this regard, the process 826 advances to a decision step 1264 to determine whether the "done" button has been selected. If so the process 836 exits at a done step 1269. If not, the process 836 goes to a determination step 1266 in order to track thumb movement. That is, at decision step 1266, if no thumb movement is detected the process 836 returns to the wait step 1263 where the process continues as described previously. If thumb movement is detected, the process 836 goes to an action step 1267.

At action step 1267, the process 836 using an approximate or the precise center of the SHUZ 200 as the origin of an x-y coordinate system, estimates the movement of the thumb of the user in the negative or positive x and y directions. The process 836 then goes to action step 1268. At step 1268 the process 836 appropriately increases or decreases the horizontal and vertical pitches Px and Py of the apps icons within the SHUZ, subject to minimum and maximum limits allowable on the device 310. After completing step 1268, the process 836 returns to step 1263 and continues as described earlier.

Organize Apps in SHUZ-DT

Considering now an organize apps in SHUZ-DT 333 process 840 in greater detail, with reference to FIGS. 8V-Z, will show conceptually the OS functions needed to allow a user to optimally organize the content of a SHUZ-DT 333, including anchoring apps, creating groups and creating folders, as well as navigating groups and folders.

Figure 8V:
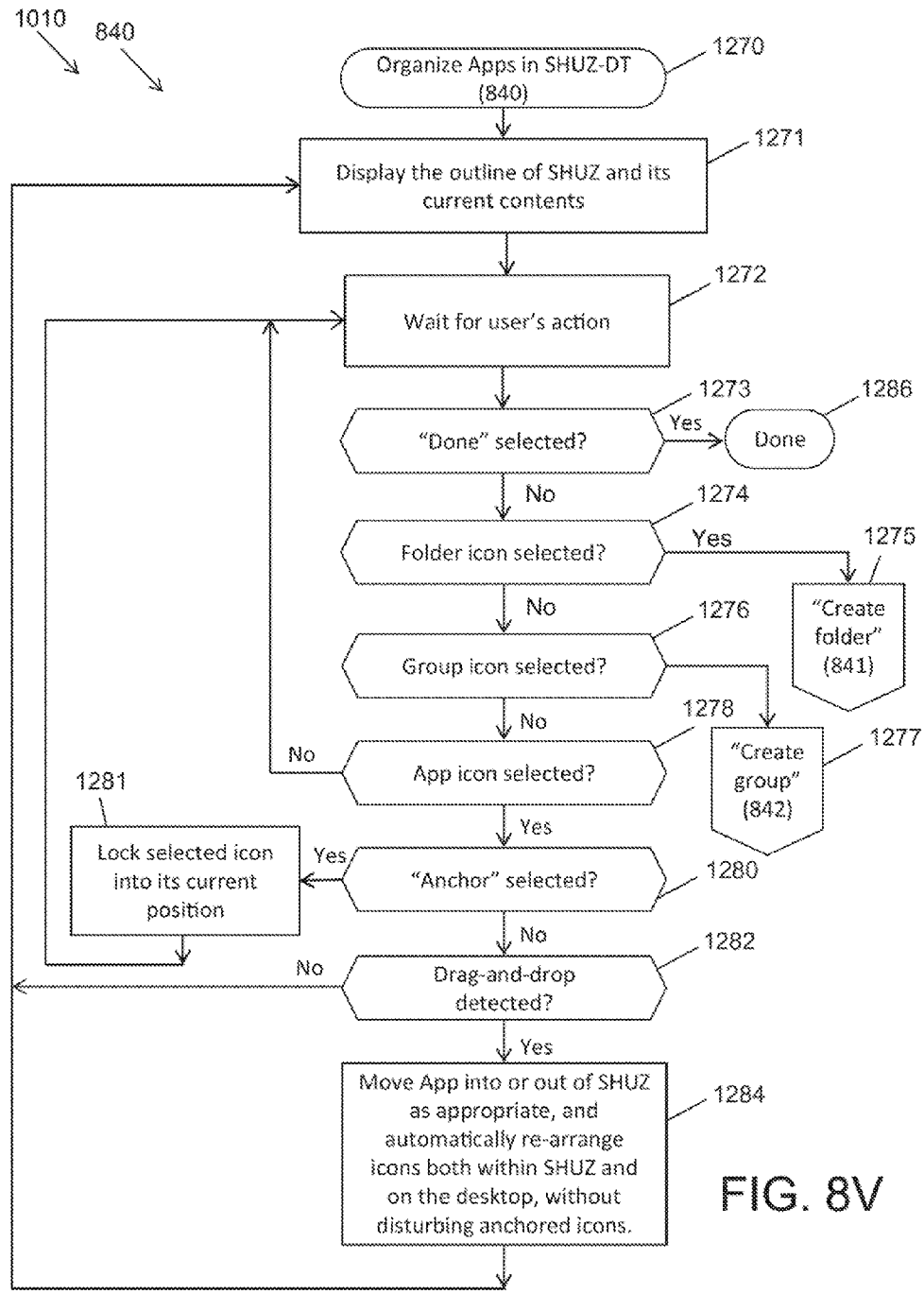

Considering now the organize process 840 as best seen in FIG. 8V, the process 840 begins at a start step 1270 and advances to an action step 1271 where the process 840 displays an outline of the SHUZ 200 and its current content. Next the process 840 proceeds to a wait step 1272 waiting for specific user action as will be explained. In this regard, the process 840 goes to a decision step 1272 to determine whether the user has provided an indication that he or she is one with the organize process 840. If so, the process 840 advances to a done step 1286 ending process 840. If not, the process 840 continues and proceeds to another determination step 1274 to determine whether the user has selected to organize the SHUZ-DT folder icons. If the user made this selection, the process 840 calls, at a call step 1275, a create folder icons process 841 that will be described hereinafter in greater detail. If not, the process 840 continues to yet another determination step 1276.

At the determination step 1276, the process 840 determines whether the user selected to organize the SHUZ-DT group icons. If the user made this selection, the process 840 calls, at a call step 1277, a create group icons process 842 that will be described hereinafter in greater detail. If not, the process 840 continues to still yet another determination step 1278 which makes a determination as to whether the user selected an app icon. If the user did not select the app icon the process 840 will return to the wait for user action step 1272, where the process 840 continues as described earlier.

Should a determination be made at decision step 1278 that the user did select an app icon, the process 840 advances to yet another decision step 1280 to determine if the user selected to anchor a selected app icon. If the user did select to anchor, the process 840 goes to an action step 1281 which locks the selected icon into its current position in the SHUZ-DT 333. If the user did not select to anchor, the process instead goes to one more decision step 1282 to determine whether a drag and drop action has been detected via the touch screen 320.

If it is determined at decision step 1282 that no drag-and-drop action has occurred, the organize process 840 returns to the wait for user action step 1272 where the process 840 continues as described earlier. On the other hand, should a determination be made at the decision step 1282 that a drag-and-drop action has occurred, the organize process 840 advances to an action step 1284 which moves the app into or out of the SHUZ 200 as appropriate, and automatically re-arranges icons both within the SHUZ 200 and on the SHUZ-DT 333 without disturbing the anchored icons. After executing this action step 1284, the process 840 returns to action step 1271 where process 840 continues as described earlier.

Create a Folder

Figure 8W:
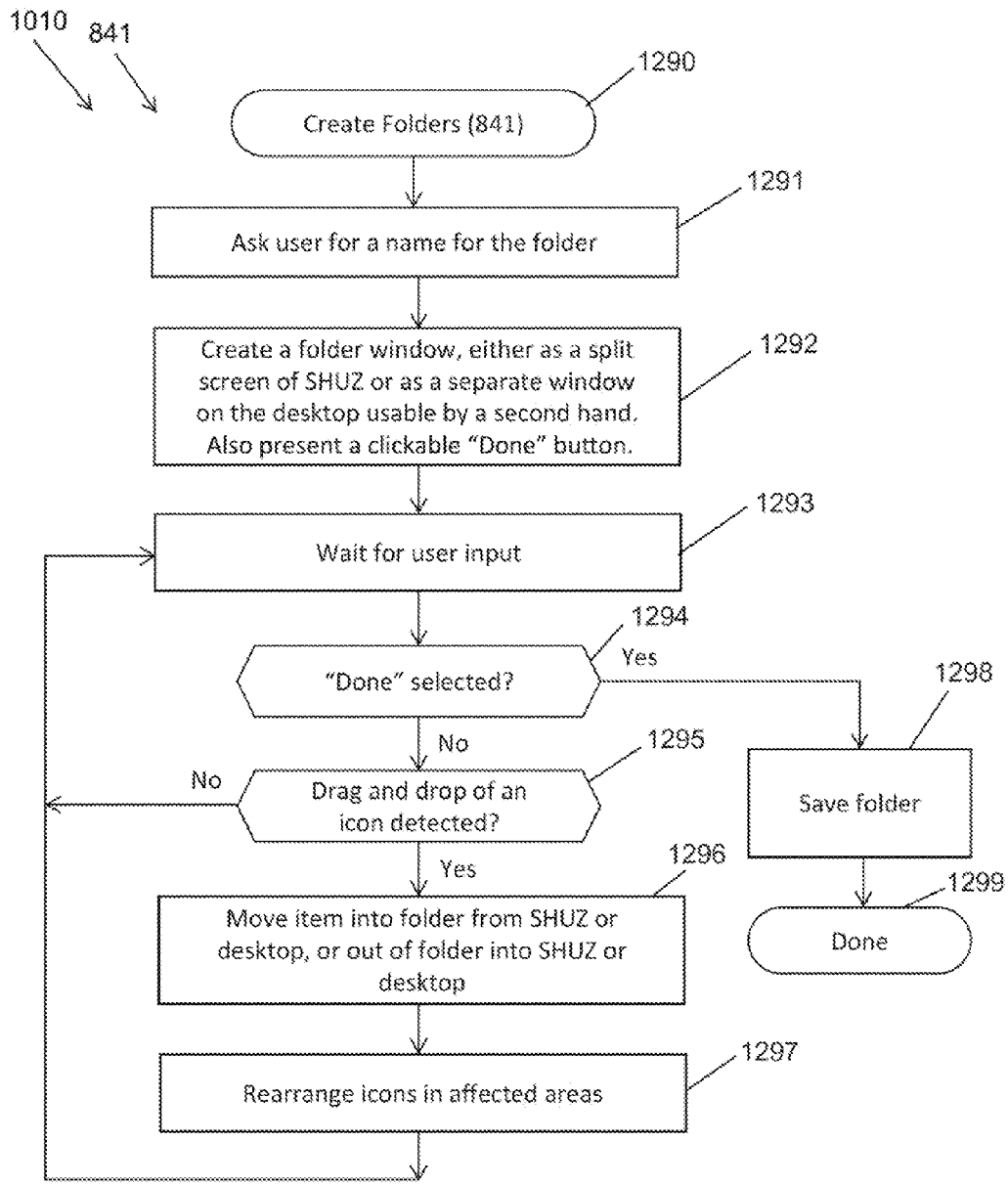

Considering now the create folder process 841 in greater detail with reference to FIG. 8W, the create folder process 841 begins at a start step 1290 which is initiated in response to the call step 1275 (FIG. 8V). From the start step 1290, the process 841 goes to an action step 1291 and asks the user to identify the name for the folder to be created. Next, the process 841 advances to an action step 1292 and creates a folder window, either as a split screen of SHUZ 200 or as a separate window on the device desktop which is usable by the other hand of the user. The action step 1292 also creates a done button for selection by the user clicking the button with his or her thumb when done with the create folders process 841.

From the action step 1292, the process 841 goes to a wait step 1293 to wait for further user action. In this regard, the process proceeds to determine if a user action is detected by advancing to a decision step 1294 to determine whether the user selected the done button created at step 1292. If the done button has been activated, the process 841 goes to an action step 1298 and saves the folder and then proceeds to an exit step 1299 to end the create folder process 841. On the other hand, if the done button has not been selected by the user, the process 841 goes to another determination step 1295.

At the determination step 1295, the process 841 determines whether a drag-and-drop of an icon action has been detected by the touch screen 320. If no action has been detected, the process 841 returns to the wait step 1293 to wait for further user action as described earlier. If a drag-and-drop of an icon action has been detected however, the process 841 goes to an action step 1297 and rearranges the icons in the affected areas of the SHUZ-DT 333. Once the icons have been rearranged, the process 841 once again returns to the wait for user action step 1293 and proceeds from step 1293 as described earlier.

Create Group

Figure 8X:
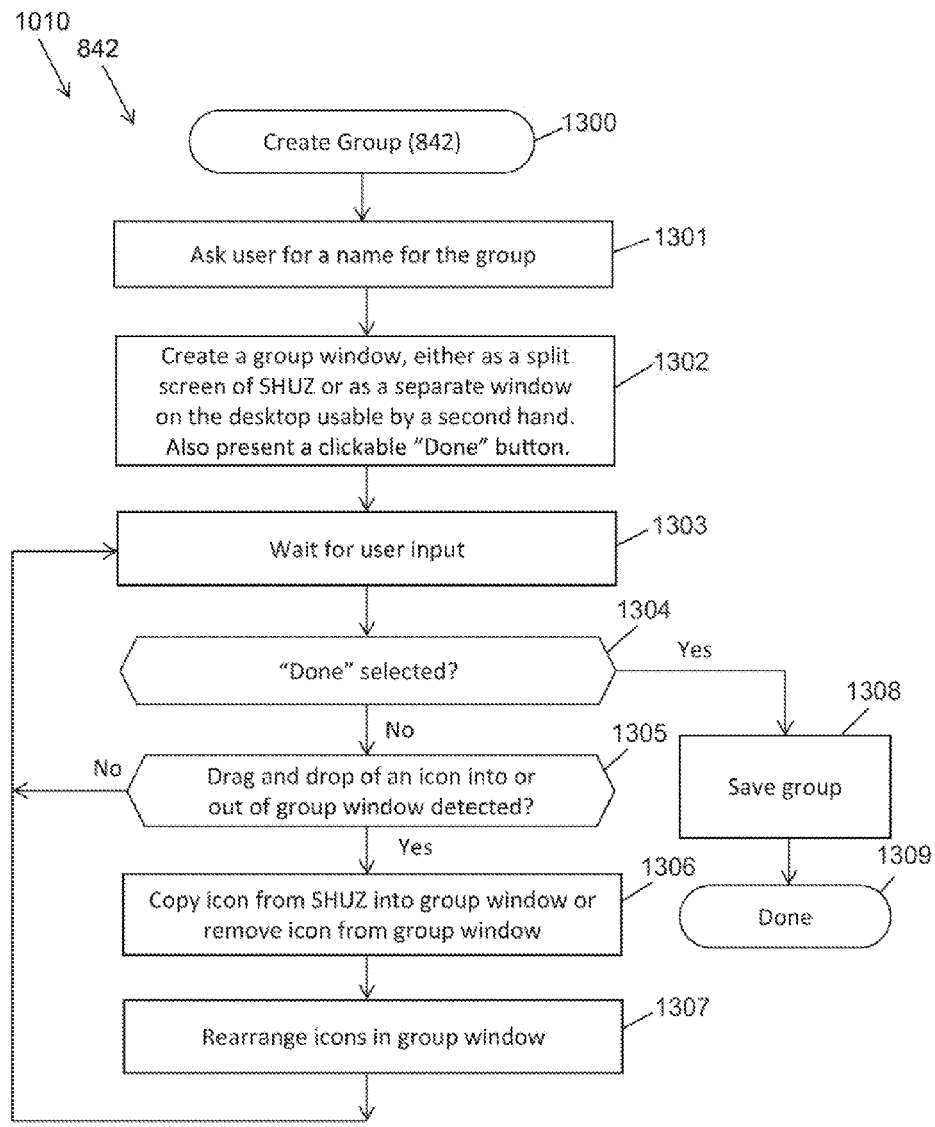

Considering now the create group process 842 in greater detail with reference to FIG. 8X, the create group process 842 begins at a start step 1300 in response to the call action at step 1277 (FIG. 8V). From the start step 1300, the create group process 842 advances to an action step 1301 where the user is asked to provide a name for the group to be created. Next, in response to the user providing the name, the process 842 goes to another action step 1302 and creates a group window, either as a split screen of SHUZ 200 or as a separate window on the device desktop which is usable by the other hand of the user. The action step 1302, also presents a thumb clickable "done" button for selection by the user when he or she is done with the process 842.

Next the process 842 goes to a wait step 1303 to wait for further action by the user. In this regard, the process 842 advances to a done step 1304 to determine whether the user clicked the done button created at step 1302. If the "done" button was selected the process 842 proceed to a save step 1308 and saves the group. Once the group has been saved, the process 842 goes to a done step 1309 to terminate its operation. If on the other hand, at the decision step 1304, the process 842 determines that the user did not click the "done" button created at step 1302, the process 842 proceeds to another decision step 1305 to determine whether a drag-and-drop of an icon into or out of the group window has been detected. If no such drag-and-drop action has been detected, the process 842, returns to the wait step 1303 and proceeds as described earlier.

If a drag-and-drop icon action has been detected via the touch screen 320, the process 842 proceeds to another action step 1306 and copies the icon from SHUZ 200 into the group window or in the alternative removes the icon from the group window depending upon the drag-and-drop action of the user. After step 1306 has been executed, the process 842 goes to an action step 1307 and rearranges the icons in the group window. Then the process 842 returns to the wait for user action step 1303 and proceeds as described earlier.

Folder Usage

Figure 8Y:
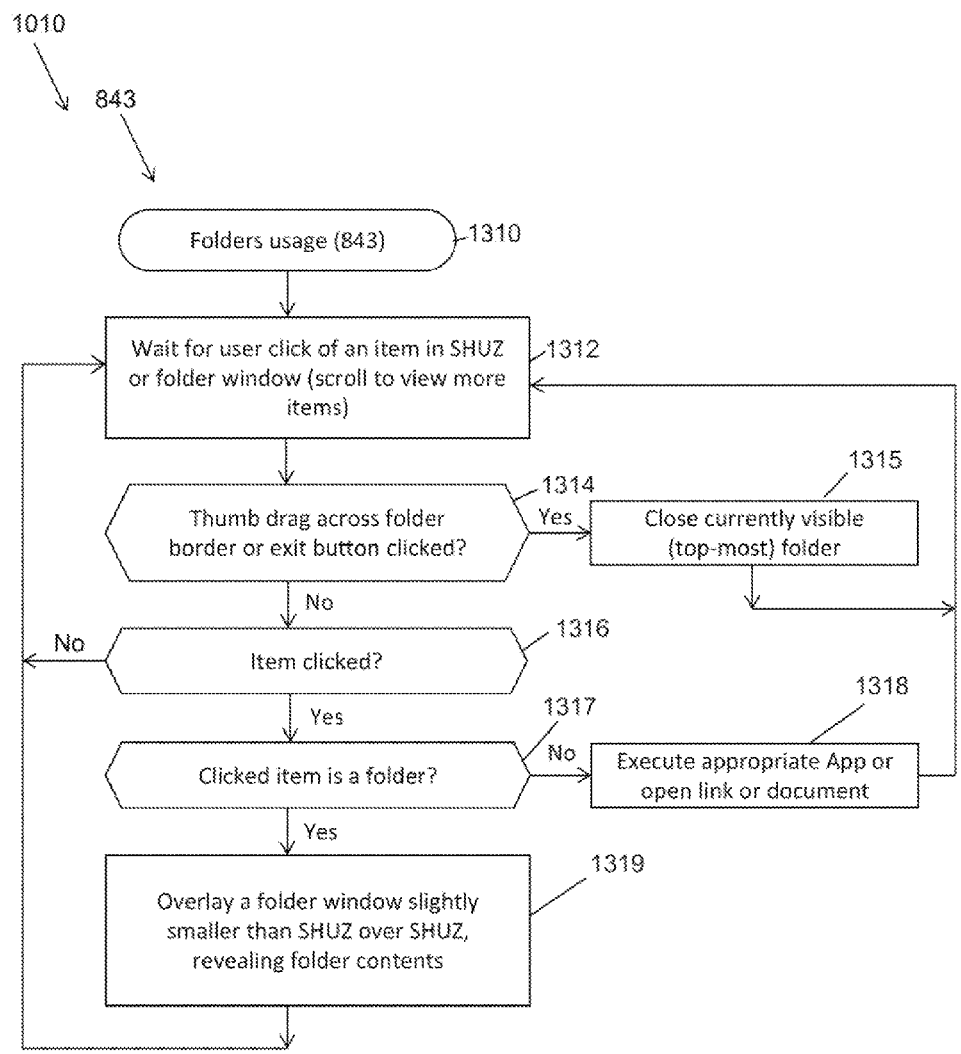

Referring now to the drawings and more particularly referring to FIG. 8Y a high level flowchart depicting a folder usage process 843 is shown. The folder usage process 843 is initiated whenever a user has access to a SHUZ-DT 333 and the user taps an icon that is a folder within the SHUZ-DT 333. Upon detecting this action, a start step 1310 is executed. From the start step 1310, the process 843 proceeds to an action step 1312 to wait for the user to click an item in SHUZ 200 or in the folder window (scroll to view more item).

To facilitate the wait for user action, the process 843 advances to a decision step 1314 to determine if the thumb of the user has dragged across a folder border or whether the user has tapped the exit button. If such a user action has been detected by the touch screen 320, process 843 advances to an action step 1315. The action step 1315 causes the top most visible folder in the SHUZ 200 or in the folder window to dose. From step 1315 the process returns to step 1312 to wait for further user action.

If no user action was detected by the touch screen at step 1314, the process advances to a determination step 1316 to determine whether the user has clicked any item with his or her thumb. If no user action has been detected via the touch screen 320, the process returns to step 1312 and proceeds as described earlier. However, if a user action has been detected at step 1316, the process advances to a determination step 1317 to establish whether the item selected by the user was a folder.

If a folder item was selected and detected at step 1317, the process 843 goes to an action step 1319 where a folder window slightly smaller than SHUZ 200 is overlaid on SHUZ 200 in order to reveal the folder contents. After executing this action, the process 843 returns to step 1312 and proceeds as described earlier.

If a folder item was not selected and detected at step 1317, the process 843 proceeds to an action step 1318 and executes an appropriate app or opens a link or document as the case may be. After completing this action step 1318, the process returns to step 1312 and continues as previously described.

Group Usage

Figure 8Z:
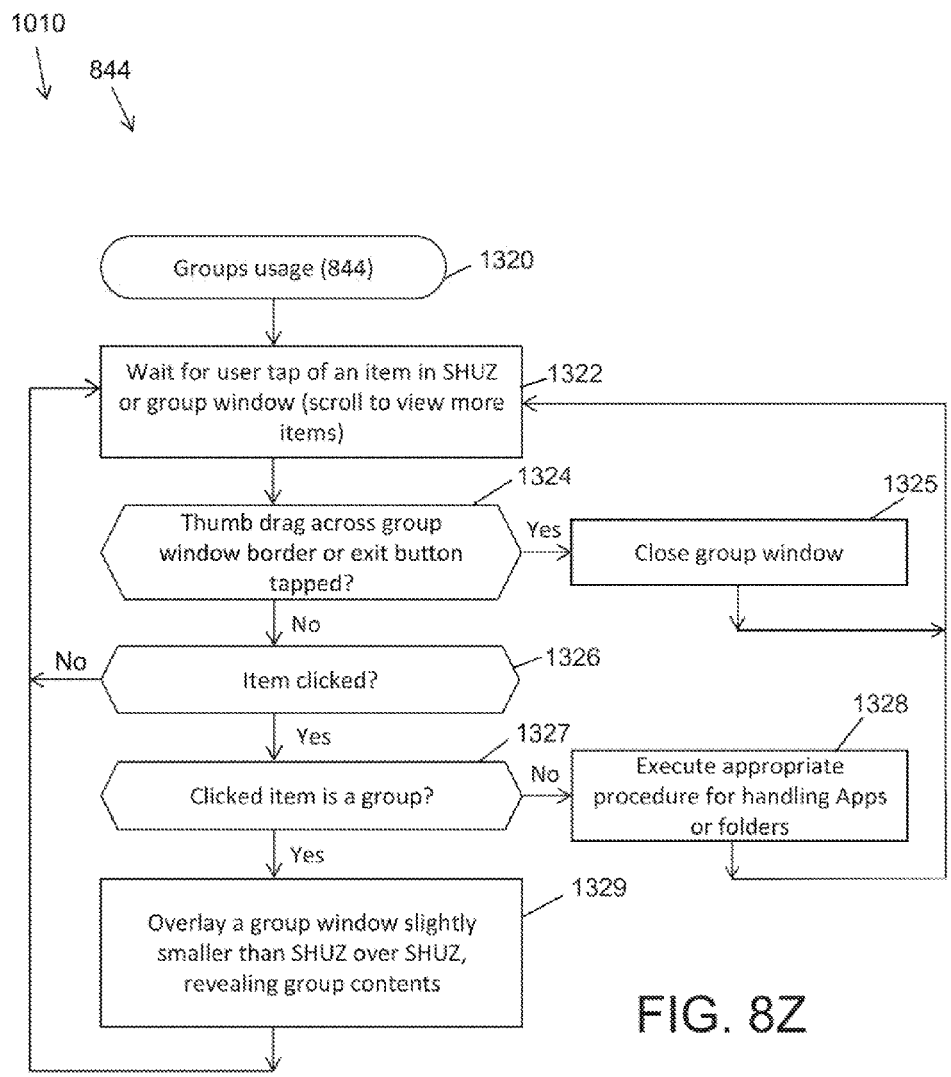

Considering now a group usage process 844 in greater detail with reference to FIG. 8Z, whenever a user has access to a SHUZ-DT 333 and the user taps an icon that is a group within the SHUZ-DT 333, the group usage process 844 begins at a start step 1220. From the start step 1320, the process 844 proceeds to an action step 1322. From action step 1322 the process 844 waits user action; e.g. for the user to tap an item in SHUZ or in the group window (scroll to view more item).

To facilitate the wait for user action, the process 844 advances to a decision step 1324 to determine if the thumb of the user has dragged across a group window or whether the user has tapped the exit button. If such a user action has been detected by the touch screen 320, process 844 advances to an action step 1325. The action step 1325 causes the group window to close. From step 1325 the process returns to step 1322 to wait for further user action.

If no user action was detected by the touch screen at step 1324, the process 844 advances to a determination step 1326 to determine whether the user has clicked any item with his or her thumb. If no user action has been detected via the touch screen 320, the process 844 returns to step 1322 and proceeds as described earlier. However, if a user action has been detected at step 1326, the process 844 advances to a determination step 1327 to establish whether the item selected by the user was a group.

If a group item was selected and detected at step 1327, the process 844 goes to an action step 1329 where a group window slightly smaller than SHUZ 200 is overlaid on SHUZ 200 in order to reveal the group contents. After executing this action step 1329, the process 844 returns to step 1322 and proceeds as described earlier.

If a group item was not selected and detected at step 1327, the process 844 proceeds to an action step 1328 and executes an appropriate procedure for handling apps or folders as the case may be. After completing this action step 1328, the process 844 returns to the wait step 1322 and continues as previously described. Multi-Level Menu Handling Considering now a multi-level menu app handling process 850 in greater detail with reference to FIG. 9, it will be shown conceptually how an app would present a multi-level menu to a user and manage the interaction. An app could use the same flow for single-level user interactions, e.g., dialog boxes. With the right infrastructure and services added to the OS, there is really not a lot that an app needs to do in real-time to take advantage of the SHUZ paradigm.

Figure 9:
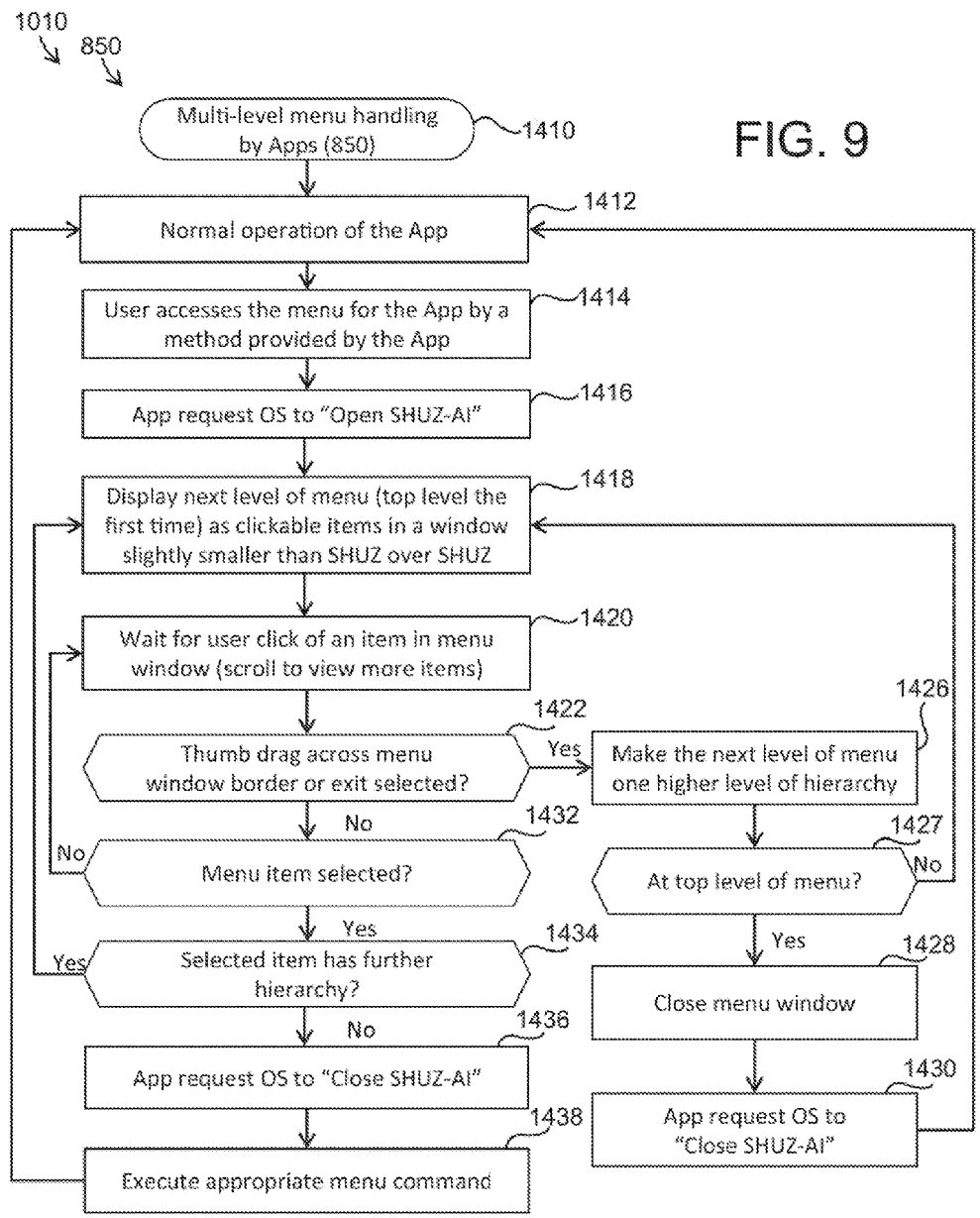
FIG. 9 is a high level flowchart illustrating a SHUZ enabling software process for multi-level menu handling by application software.

Referring now to FIG. 9, process 850 begins at a start step 1410 and proceeds to an action step 1412. At action step 1412 the normal operation of the app is established. From action step 1412 the process 850 goes to an action step 1414 where the process 850 detects, via the touch screen 320, when a user accesses the menu for the running application. User access of the running application program for example could be accomplished by the user merely tracing an "M" shape in an app window. Once such an action is detected, the process 850 advances to an action step 1416.

At action step 1416, the process 850 requests the OS 331 to open SHUZ-AI 335. Next, the process 850 goes to a wait step 1420 to wait for the user to click an item in the menu window (scroll to view more items). To facilitate this wait and detect action, the process 850 proceeds to a determination step 1422 where the process 850 via the touch screen 320 detects if the thumb of the user drags across the menu window border or whether the user has selected an exit action. If nothing is detected, the process 850 advances to another determination step 1432 to determine whether the user has selected a menu item. On the other hand if a user action was detected at the determination step 1422, the process 850 goes to an action 1426 which makes the next level of the menu one higher level of hierarchy.

After action step 1426 is executed the process 850 advances to a determination step 1427 to determined whether the top level of the menu has been reached. If the top level has been reached, the process 850 goes to a close menu window step 1428, where the process 850 causes the menu window to close. After the menu window has been closed at action step 1428, the process 850 advances to an action step 1430. At action step 1430, process 850 sends a notification signal to the SHUZ-OS 931 to inform the SHUZ-OS 931 that the process 850 is finished with SHUZ 200. From step 1430, the process 850 proceeds to step 1412 where the process 850 continues as previously described.

At determination step 1427 if a determination is made that the top level of the menu has not been reached, the process 850 returns to action step 1418 to display the next level of the menu. The process 850 continues from step 1418 as described previously.

At determination step 1432, if the process 850 determines that a menu was selected, the process 850 goes to another determination step 1434 that will be described hereinafter in greater detail. If at step 1432 the process determines that a menu item was not selected, the process 850 returns to wait step 1420 and continues as previously described.

Considering now the determination step 1434, a determination is made if the selected menu item is a menu command with further hierarchy. If this determination is positive, the process 850 returns to the action step 1418 and continues as described earlier. If this determination is negative, the process 850 goes to an action step 1436 and requests the OS 331 to close SHUZ-AI 335. When the action step 1436 has been completed, the process 850 proceeds to another action step 1438 and executes the appropriate menu command. Following execution of the menu command at step 1438, the process 850 returns to step 1412 and continues as previously described.

CONCLUSION

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

The written description portion of this patent includes all claims. Furthermore, all claims, including all original claims as well as all claims from any and all priority documents, are hereby incorporated by reference in their entirety into the written description portion of the specification, and applicant reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the following claims.

PARTS LIST

The following is a parts list for each of the component parts identified in the detailed specification and drawings:
10 a small form factor mobile device 10
30 hardware of the small form factor device
40 software of the small form factor device
105 processors forming part of hardware
106 storage devices forming part of hardware
107 network interfaces forming part of hardware
108 peripheral device interfaces forming part of hardware
110 a master control program or operating system 110
111 a third party application program or a variety of programs 111
112 other files used by the operating system
113 user-specific data and document files 113
114 a hand or palm of a user
115 fingers of a user
116 thumb of a user
118 an actionable icon
119 an actionable icon
121 a wider desktop area
124 a touch screen
200 a single-handed usability zone 200 or SHUZ 200
210 a large form factor electronic device 210
301 an icon 301
302 an icon 302
306 a top area
307 a middle area
308 a bottom area
309TR a top right side
309MR a middle right side
309BR a bottom right side
310 a large form factor electronic device constructed to invention
312 a device portrait mode 312 (FIG. 3K)
313 a device landscape mode 313 (FIG. 3L)
314 a large form factor electronic device touch screen 314
316 a left thumb of the user
320 a regular desktop area
320B a start button
321 a right thumb of the user
323 a call to action app interface
324 a direction line 324 (FIG. 3O)
325 a portrait mode left hand holding the device 310 (FIG. 3Q)
326 a landscape mode left hand holding the device 310 (FIG. 3)
327 a portrait mode—right hand holding the device 310
328 a landscape mode—right hand holding the device 310
329A a SHUZ placement region edge
329B a SHUZ placement region edge
329C a SHUZ placement region edge
329V a SHUZ placement region edge (variable)
331 an operating system 331
332 any available program or app 332
333 a miniaturized desktop or a SHUZ-DT 333
334 an app 334
335 a single-handed utilization application interface or SHUZ-AI 335
341 SHUZ-related OS services 341
401 a drag and drop line 401
402 another drag and drop line 402
404 a menu of options 404
405 a group window 405
405A a folder 405A
405B a folder 405B
406 a hierarchical 406
410 a large form factor electronic device 410
420 a regular desktop area of device 410
433 a SHUZ-DT 433
501 a scroll line 501
502 a folder icon 502
503 a group icon 503
506 a folder window 506
507 a folder content 507
508 a directory listing
510 a large form factor electronic device 510
511 a handle icon
520 a desktop screen area
601 an app 601
602 an app 602

603 a pop up window 603 of a rendered SHUZ-DT
604 a pop up window 604 of a rendered SHUZ-AI
605 a program's menu 605
606 a main menu
606F a file indicator in the main menu
607 a file menu
608 a print menu
610 a large form factor electronic device 610
620 a desktop screen area
635 a SHUZ-AI 635
701 a graphic symbol icon (FIG. 7A)
702 a graphic icon (FIG. 7A)
703 a combination graphic and text embedded icon (FIG. 7A)
704 a standardized thumb profile (FIG. 7C)
705 a default factory set thumb profile (FIG. 7D)
706 a plurality of standard thumb profiles 706 (FIG. 7E)
707 a plurality of personalized thumb profiles 707 (FIG. 7F)
708 a default content set (FIG. 7G)
709 content (FIG. 7H)
710 a default SHUZ-DT appearance (FIG. 7 I)
711 a personalized SHUZ-DT appearance (FIG. 7J)
712 an OS setup control panel 712 (FIG. 7K)
713 a single-handed item 713 (FIG. 7K)
714 specific SHUZ-related options (FIG. 7L)
715 a preference menu 715 (FIG. 7M)
910 a device 910
912 development tools 912
913 real time context
915 application program development
916 a user 916
918 operating system software-user interactions
920 application program software-user interactions
931 a SHUZ-OS 931
933 a SHUZ-DT
934 an app 934
935 a SHUZ-AI
941 SHUZ personalization
949 middleware
1010 an enabling and customizing method 1010

Initiate Enabling Methods—Process 801

1012 a start step
1014 a normal operations of the OS step
1016 a user dialog step—login screen
1018 a query step
1020 a rendering step—render normal desktop Render and Display SHUZ-DT process 802 (FIG. 8C)

1022 a call step—initiate the display or rendering of the SHUZ-DT 333
1023 a start step
1024 an action step—obtain current SHUZ location and dimensions
1026 a backup step
1028 a render step—render text and graphics for SHUZ-DT in the SHUZ
1030 a stop or done step ending the render and display of the SHUZ-DT in the SHUZ Auto-Placement of SHUZ process 803 (FIG. 8D)

1032 a start step
1034 an action step—normal operating system processing—waiting for thumb input
1036 finger or thumb input detected
1038 confirm detection of thumb input
1040 check holding mode—landscape or portrait—right hand or left hand
1042 place SHUZ at thumb location
1044 a determination step—off screen
1046 an action step—offset coordinates
1048 an action step—save coordinates as previous
1050 an action step—save coordinates as current
1052 a call step—call auto render SHUZ process 804

Auto Render SHUZ process 804 (FIG. 8E)

1060 a start step—initiated in response to the call step 1052
1062 a determination step—SHUZ-AI or SHUZ-DT visible on screen
1064 an action step—render current SHUZ content
1066 an action step—restore previous SHUZ location
1068 an end or stop step Request for SHUZ-DT process 805 (FIG. 8F)

1070 a start step
1072 an action step normal operations of an app
1074 a determination step—a double tap detected
1076 a call step—call the display SHUZ-DT process 802

A Return to Prior App process 806 (FIG. 8G)

1080 a start step
1082 a user request step—restore app
1084 an action step—hide SHUZ-DT and restore SHUZ with app data
1086 an action step—return control to app
1088 a stop or end step 1088

An App Request to Open SHUZ-AI process 807 (FIG. 8H)

1090 a start step
1092 an action step—backup current SHUZ content
1094 an action step—forward app content for rendering
1096 an action step—return control to app
1098 a stop or end step 1098

An App Request to Close SHUZ-AI 1110 a start step
1112 an action step—restore previously backed up content
1114 an action step—return control to app
1116 a stop or end step 1116

Personalization of the SHUZ process 820 (FIG. 8J)

1120 a start step
1122 a present sub-menu step
1124 a select step—select a process
1125 a call step—call the selected process A Measure Process—Personalizing SHUZ dimensions 821 (FIG. (FIG. 8K)

1130 a start step initiated in response to the call step 1125 (FIG. 8J)
1132 an action step—highlight SHUZ
1134 a waiting action
1136 a determination step 1138 a determination step
1140 an action step—a capture step
1142 an action step—set new dimensions
1144 an action step—rearrange icons automatically
1146 an end or done step 1146

The Adjust SHUZ Dimensions Process 822 (FIG. 8L)

1150 a start step 1150
1151 an action step—highlight boundaries
1152 a waiting step
1154 a determination step—done selected
1156 another determination step—finger placement on edge
1157 an action step—track finger movement
1158 an action step—automatically rearrange icons
1159 a completed or done step Adjust SHUZ-DT Appearance Process 823 (FIG. 8M)

1160 a start step
1162 an action step—present a menu
1164 an action step—provide options for selected item
1166 an action step—save as part of current profile
1168 a completed or done step Reset User Profile Settings Process 824 (FIG. 8N)

1170 a start step
1172 an action step—delete profiles
1174 an action step—create default user profile
1176 an action step—set SHUZ-DT organization and appearance
1178 a completed of done step Usage Profile Process 830 (FIG. 8O)

1180 a start step
1182 an action step—present sub-menu
1184 an action step—selected an action
1185 a call step—call the selected action Select a User Profile Process 831 (FIG. 8P)

1190 a start step
1192 an action step—present list
1194 a determination step—new profile selected
1196 an action step—set selected profile
1198 a completed or done step Add New Profile Process 832 (FIG. 8Q)

1220 a start step
1222 an action step—create a new profile
1224 an action step—obtain a profile name
1226 an action step—inform user profile created
1227 a determination step—personalization desired
1228 a call step—call personalize a profile process 833
1229 a completed or done step Personalize a Profile Process 833 (FIG. 8R)

1230 a start step
1232 an action step—ask user
1233 an action step—ask user
1234 a determination step—standard profile selected
1235 a call step—call customize selected profile process 836
1236 an action step—present a list
1237 an action step—set profile
1238 a stop or done step 1238

Delete a Profile Process 834 (FIG. 8S)

1240 a start step 1240
1241 an action step—ask user
1242 an action step—a warning step
1244 a determination step—confirmed
1246 an action step—delete selected user profile
1248 an action step—if, create step
1249 a completed or done step Copy a Profile Process 835 (FIG. 8T)

1250 a start step
1252 an action step—display a list
1254 an action step—display another list
1256 an action step—ask user
1257 an action step—save new profile
1258 a completed or done step Customize a Selected Profile Process 836 (FIG. 8U)

1260 a start step
1261 a call return step—call "adjust size" process 822 and return
1262 an action step—display
1263 an action step—waiting for user action
1264 a determination step—done selected
1266 a determination step—thumb movement detected
1267 an action step—estimate
1268 an action step—increase or decrease
1269 a done or completed step Organize Apps in SHUZ-DT Process 840 (FIG. 8V)

1270 a start step
1271 an action step—display
1272 an action step—wait for user action
1273 a determination step—done selected
1274 a determination step—folder icon selected
1275 a call step—call create a folder process 841
1276 a determination step—group icon selected
1277 a call step—call create a group process 842
1278 a determination step—app icon selected
1280 a determination step—anchor selected
1281 an action step—lock selected icon into current position
1282 a determination step—drag-and-drop selected
1284 an action step—move app
1286 an end or done step Create a Folder Process 841 (FIG. 8W)

1290 a start step
1291 an action step—ask user
1292 an action step—create a folder
1293 an action step—wait for user input
1294 a determination step—done selected
1295 a determination step—drag-and-drop icon detected
1296 an action step—move item into folder
1297 an action step—rearrange icons 1298 an action step—save folder
1299 an end or done step Create Group Process 842 (FIG. 8X)

1300 a start step
1301 an action step—ask user
1302 an action step—create group window
1303 an action step—wait for user input
1304 a determination step—done selected
1305 a determination step—drag-and-drop icon
1306 an action step—copy icon
1307 an action step—rearrange icons in group window
1308 an action step—save group
1309 a completed or done step 1309

Folder Usage Process 1310 (FIG. 8Y)

1310 a start step
1312 an action step—wait for user to click
1314 a determination step—thumb drag
1315 an action step—close folder
1316 a determination step—item clicked
1317 a determination step—click item folder
1318 an action step—execute app
1319 an action step—overlay folder window Group Usage Process 844 (FIG. 8Z)

1320 a start step
1322 an action step—wait for user to click
1324 a determination step—thumb drag
1325 an action step—close group window
1326 a determination step—item clicked
1327 a determination step—clicked item is group
1328 an action step—execute app
1329 an action step—overlay group window Multi-Level Menu Handling Process 850 (FIG. 9)

1410 a start step
1412 an action step—normal operation of the app
1414 an action step—user accesses
1416 an action step—request OS to open SHUZ-AI
1418 an action step—display next level menu
1420 an action step—wait for user input
1422 a determination step—thumb drag detected
1426 an action step—adjust menu hierarchy
1427 a determination step—at top level of menu
1428 an action step—close menu window
1430 an action step—inform OS done with SHUZ
1432 a determination step—menu item selected
1434 a determination step—further hierarchy
1436 an action item—request OS to close SHUZ-AI
1438 an action item—execute menu command

I claim:

1. In a large form-factor mobile electronic device having a touchscreen for receiving user thumb input actions via an operating system desktop to facilitate user-software interactions, a method of enabling single-handed user-software interactions, comprising the steps of:
    generating a designated dynamic area on the touchscreen for defining a single-handed utilization zone;
    positioning said single-handed utilization zone in real time at a currently detected thumb location on the touchscreen;
    rendering a proxy desktop within said zone at a native resolution of the touchscreen, said proxy desktop providing at least some of the same functionality of the operating system desktop of the large form-factor mobile electronic device;
    wherein said currently detected thumb location is tracked in real time on the touchscreen and updated to provide another currently detected thumb location each time the thumb of a user is relocated on the touchscreen to automatically position said single-handed utilization zone at about said another currently detected thumb location with context-aware intelligence;
    wherein said proxy desktop is populated with a plurality of actionable icons arranged within said zone to facilitate easy thumb access;
    wherein the actionable icons are further arranged in a horizontal pitch and a vertical pitch determined based on a usage profile and the single-handed utilization zone size; and
    wherein said usage profile is a thumb profile based on one or more thumb size demographics including at least a thumb length, a thumb thickness and a thumb range of motion.

2. The method of enabling according to claim 1, wherein said single-handed utilization zone is an invisible single-handed utilization zone; and
    wherein said step of rendering includes:
    rendering visibly within said invisible single-handed utilization zone either said proxy desktop or a software application user-interface;
    wherein said step of rendering visibly is user initiated in real time at a user selected touchscreen location anywhere on the touchscreen to confirm intentional selection by the user.

3. The method of enabling according to claim 1, wherein said proxy desktop may be customized with respect to shape, size, appearance, location anywhere on the touchscreen, content, content organization or accessibility of content to facilitate providing a personalized user experience.

4. The method of enabling according to claim 1, wherein said currently detected thumb location is tracked and updated on the touchscreen each time the thumb of a user is relocated on the touchscreen; and further comprising:
    providing a plurality of user profiles for facilitating customizing said proxy desktop for individual ones of a plurality of users;
    wherein each individual one of said plurality of user profiles is selectable by a current user via said proxy desktop and a thumb input selection action provided by the current user.

5. In a large form-factor mobile electronic device having a touchscreen for receiving user thumb input actions to facilitate user-software interactions, a method of enabling single-handed user-operating system interaction at a native resolution of the touchscreen, comprising the steps of:
    generating a single-handed utilization zone defined by an area of the touchscreen that can be accessed by the thumb of the device-holding hand of the user;
    rendering a proxy desktop within said zone at a native resolution of the touchscreen, said proxy desktop being distinct with respect to its content, appearance and organization from the operating system desktop of the larger form-factor mobile electronic device while providing at least some of the same functionality of the operating system desktop of the large form-factor mobile electronic device;

wherein the area of the touchscreen that can be accessed by the thumb of the device-holding hand of the user is determined by the size of the single-handed utilization zone and a thumb profile; and wherein said thumb profile is based on one or more thumb size demographics including at least a thumb length, a thumb thickness and a thumb range of motion.

6. The method of enabling according to claim 5, further comprising the step of:

determining in real time the position and orientation of said single-handed utilization zone at a currently detected thumb location on the touchscreen; and rendering a set of previously chosen actionable icons individually in the correct orientation for readability within said proxy desktop, said icons being rendered at the native resolution at which the icons were created to be displayed on the touchscreen.

7. The method of claim 6, wherein said step of rendering further includes presenting previously saved configuration of the content of the proxy desktop, including what actionable icons are included or excluded, the size, sequence, graphics, horizontal pitch, and vertical pitch of the icons contained therein, and further, the organization of the icons within the proxy desktop in folders or groups.

8. The method of enabling according to claim 6, further comprising:

using single-handed thumb input actions to pan vertically or horizontally or both in a virtual desktop contained within the single hand usability zone in order to access more icons.

9. The method of enabling according to claim 6, further comprising:

using single-handed thumb input actions to navigate through folders or groups by a series of overlapping stacked virtual desktops, all contained within the single handed usability zone.

10. The method of enabling according to claim 6, further comprising:

continually tracking the location of the thumb and orientation of the device in real time; and responding to a predefined single-handed thumb input action to display on the touchscreen either the proxy desktop or an application software user-interface.

11. The method of enabling according to claim 6, further comprising:

providing application program interfaces and operating system support services to enable operating system functions to operate in said single handed usability zone.

12. The method of enabling according to claim 5, wherein said step of rendering includes presenting the proxy desktop in accordance with previously saved appearance attributes with respect to shape, size, aspect ratio, orientation, border, and other stylistic effects.

13. In a large form-factor mobile electronic device having a touchscreen for receiving user thumb input actions to facilitate user-software interactions, a method of enabling single-handed user-software interaction at a native resolution of the touchscreen, comprising the steps of:

generating a single-handed utilization zone defined by an area of the touchscreen that can be accessed by the thumb of the device-holding hand of the user;

determining in real time the position and orientation of said single handed utilization zone at a currently detected thumb location on the touchscreen; and rendering at least a subset of an application software user-interface within said single-handed utilization zone, said subset being rendered at the native resolution of the touchscreen at which the software user-interface was designed to be displayed to facilitate single-handed thumb input actions using only the thumb of the device-holding hand of the user;

wherein the area of the touchscreen that can be accessed by the thumb of the device-holding hand of the user is determined by the size of the single-handed utilization zone and a thumb profile; and wherein said thumb profile is based on one or more thumb size demographics including at least a thumb length, a thumb thickness and a thumb range of motion.

14. The method of enabling according to claim 13, further comprising:

providing application software for single-handed user software interactions; and enabling said application software to present a complex, hierarchical menu tree via overlapping stacked windows contained within the single handed utilization zone.

15. The method of enabling according to claim 13, further comprising:

continually tracking the location of the thumb and orientation of the device in real time; and responding to a predefined single-handed thumb input action to display on the touchscreen either the proxy desktop or an application software user-interface.

16. The method of enabling according to claim 13, further comprising:

providing applications program interfaces and operating system support services to enable applications to operate in said single handed usability zone.

* * * * *